US006292194B1

(12) United States Patent
Powell, III

(10) Patent No.: US 6,292,194 B1
(45) Date of Patent: Sep. 18, 2001

(54) IMAGE COMPRESSION METHOD TO REDUCE PIXEL AND TEXTURE MEMORY REQUIREMENTS IN GRAPHICS APPLICATIONS

(75) Inventor: William Chambers Powell, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/365,605

(22) Filed: Jul. 29, 1999

Related U.S. Application Data

(63) Continuation of application No. 08/672,102, filed on Jun. 27, 1996, now Pat. No. 5,999,189, which is a continuation-in-part of application No. 08/560,114, filed on Nov. 17, 1995, now abandoned, which is a continuation of application No. 08/511,553, filed on Aug. 4, 1995, now abandoned.

(51) Int. Cl.[7] .................................................... G06F 15/00
(52) U.S. Cl. ............................................................ 345/430
(58) Field of Search ..................................... 345/419, 420, 345/421, 430, 433, 113, 114

(56) References Cited

U.S. PATENT DOCUMENTS

| 4,631,690 | 12/1986 | Courthout et al. ................... 364/518 |
| 4,645,459 | 2/1987 | Graf et al. ............................... 434/43 |
| 5,295,235 | 3/1994 | Newman ............................... 395/133 |
| 5,363,475 | 11/1994 | Baker et al. .......................... 395/122 |
| 5,522,018 | 5/1996 | Takeda et al. ........................ 395/122 |
| 5,563,989 | 10/1996 | Billyard ................................ 395/126 |
| 5,586,234 | 12/1996 | Sakuraba et al. .................... 395/130 |
| 5,596,686 | 1/1997 | Duluk, Jr. ............................. 395/122 |
| 5,598,517 | 1/1997 | Watkins ................................ 395/141 |
| 5,630,043 | 5/1997 | Uhlin .................................... 395/174 |
| 5,634,850 | 6/1997 | Kitahara et al. ....................... 463/33 |
| 5,651,104 | 7/1997 | Cosman ................................ 395/125 |
| 5,673,401 | 9/1997 | Volk et al. ............................ 395/327 |
| 5,684,935 | 11/1997 | Demesa, III et al. ................ 395/119 |
| 5,729,669 | 3/1998 | Appleton .............................. 395/122 |
| 5,808,617 | 9/1998 | Kenworthy et al. .................. 345/431 |
| 5,852,443 | 12/1998 | Kenworthy ........................... 345/421 |
| 5,864,342 | 1/1999 | Kajiya et al. ......................... 345/418 |
| 5,867,166 | 2/1999 | Myhvold et al. ..................... 345/419 |
| 5,870,097 | 2/1999 | Snyder et al. ........................ 345/426 |
| 5,880,737 | 3/1999 | Griffin et al. ......................... 345/430 |
| 5,886,701 | 3/1999 | Chauvin et al. ...................... 345/418 |
| 5,949,428 | 9/1999 | Toelle et al. ......................... 345/431 |
| 5,999,189 | * 12/1999 | Kajiya et al. ......................... 345/430 |

OTHER PUBLICATIONS

*The Data Compression Book*, by Mark Nelson, Chapter 11, pp. 347–373, 1992.

*JPEG Still Image Data Compression Standard*, by William B. Pennebaker and Joan L. Mitchell, Chapter 5–7, pp. 65–134, 1993.

(List continued on next page.)

*Primary Examiner*—Phu K. Nguyen
(74) *Attorney, Agent, or Firm*—Klarquist, Sparkman, Campbell, Leigh & Whinston, LLP

(57) ABSTRACT

A method for still image compression reduces pixel and texture memory requirements in graphics rendering and other applications. The image compression method divides an image into blocks and stores a quantization index (QIndex) for each block that reflects the level of quantization applied to the block. The QIndex is an index into a table of QFactors. The method performs an invertable transform on a block to generate coefficients for spatial frequency components in the block. It then quantizes coefficients in the block by dividing them by the QFactor in the table corresponding to the QIndex for the block. The QIndex enables the compression ratio of an image to vary across blocks and within each block. A control structure associated with the image stores a pointer to each of the blocks in an image. This control structure allows each block to be accessed and decompressed independently.

11 Claims, 33 Drawing Sheets

OTHER PUBLICATIONS

Chapter 18: "Advanced Raster Graphics Architecture", by S. Molnar and H. Fuchs, *Computer Graphics: Principles and Practice*, Second Edition, Foley, vanDam, Feiner and Hughes, pp. 855–923, 1996.

"Pixel–Planes 5: A Heterogeneous Multiprocessor Graphics System Using Processor–Enhanced Memories", by H. Fuchs, J. Poulton, J. Eyles, T. Greer, J. Goldfeather, D. Ellsworth, S. Molnar, G. Turk, B. Tebbs and L. Israel, *Computer Graphics*, vol. 23, No. 3, Jul. 1989, pp. 79–88.

"A Characterization of Ten Rasterization Techniques", by N. Gharachorloo, S. Gupta, R.F. Sproull and I.E. Sutherland, *Computer Graphics*, vol. 23, No. 3, Jul. 1989, pp. 355–368.

Slater, Mel, "An Algorithm to support 3D Interaction on Relatively Low Performance Graphics Systems", *Compute. & Graphics*, vol. 161, No. 3, pp. 311–315, 1992.

Slater, Mel, "Segments on Bit–mapped Graphics Displays", *Software–Practice and Experience*, vol. 16(II), pp. 965–980, Nov. 1986.

Chrysanthou, Y and Slater, M., "Computing Dynamic Changes to BSP Trees", *Computer Graphics Forum*, pp. C–321–C342, Sep. 7–11, 1992.

Slater, Mel et al., "Liberation from Rectangle: A Tiling Method for Dynamic Modification of Objects on Raster Displays": Euro*graphics* 88, Conference date, Sep. 12–16, 1988, pp. 381–392, 1988.

Slater, Mel et al., "Liberation from Flatland: 3D Interaction Based on the Desktop Bat", *Eurographics* 91, pp. 209–221, 1991.

Deering, "Explorations of Display Interfacers for Virtual Reality", *IEEE Virtual Reality*, 1993 International Symposium, pp. 141–147, 1993.

Reichlen, "Sparcchair: A One Hundred Million Pixel Display", *IEEE Virtual Reality*, 1993 International Symposium, pp. 300–307, May 28, 1993.

Foley, James D., et al., "Computer Graphics: Principles and Practices,", Addison–Wesley Publishing Co., $2^{nd}$ ed., pp. 806–813, 855–921, 1990.

Collaborative work, "Pixel–Planes", Pixel Planes Home Page, url–http://www.cs.unc.edu/, University of North Carolina, pp. 1–25, update Sep. 26, 1995.

Oak Technology WARP5 Press Releases, "Oak Technology Sets New Standard for 3D Realism with Breakthrough WARP5 Chip Architecture," Atlanta, GA, Jun. 19, 1997.

Bergman et al., "Image Rendering by Adaptive Refinement," *ACM Siggraph* 86, vol. 20, No. 4, pp. 29–37, Aug. 18–22, 1986.

Chen, Chein–Liang, et al., "A Raster Engine for Computer Graphics and Image Compositing," Abstract, APCCAS 94, IEEE, pp. 103–108, Dec. 5–8, 1994.

Yoo, Terry S., et al., "Direct Visualization of Volume Data," *IEEE Computer Graphics and Applications Magazine*, vol. 12, No. 4, pp. 63–71, Jul. 92.

Bove, Jr., V. Michael, et al., "Real–Time Decoding and Display of Structured Video," IEEE Multimedia, 1994 International Conference, pp. 456–462, 1994.

Heb, Andreas, et al., "Three Dimensional Reconstruction of Brains from 2–Deoxyglucose Serial Section Autoradiographs," *Image Processing*, 1994 Internation Conference, vol. 3, pp. 290–294, 1994.

Hu, Lincoln, "Computer Graphics in Visual Effects," COMPCON Spring 92, IEEE Computer Society International Conference, pp. 472–474, 1992.

Runyon, Kenneth R., "Advanced Graphics Processor," *Digital Avionics Systems*, 1993 Conference, pp. 394–399, 1993.

Crawfis, Roger A., et al. "A Scientific Visualization Synthesizer," Visualization, 1991 Conference, pp. 262–267, 1991.

Haeberli, Paul, et al., "The Accumulation Buffer: Hardware Support for High–Quality Rendering," *ACM Computer Graphics*, vol. 24, No. 4, pp. 309–318, Aug. 1990.

Regan, Matthew and Ronald Pose, "Priority Rendering With a Virtual Reality Address Recalculaion Pipeline", ACM SIGGRAPH 94, Computer Graphics Proceedings, Annual Conference Series, pp. 155–163, 1994.

Regan, Matthew and Ronald Pose, "Low Latency Virtual Reality Display System", *Technical Report* No. 92/166, Monash University, Victoria, Australia, pp. 1–13, Sep. 1992.

Regan, Matthew and Ronald Pose, "A Interactive Graphics Display Architecture", *IEEE Virtual Reality*, 1993 International Symposium, pp. 293–299, 1993.

Toborg, Jay, et al., "Talisman: Commodity Realtime 3D Graphics for the PC", ACM SIGGRAPH, Conference Proceedings, pp. 353–373, Aug. 4–9, 1996.

Deering, Michael, et al., "Leo: A System for Cost Effective 3D Shaded Graphics", ACM SIGGRAPH, Conference Proceedings, pp. 101–108, Aug. 1–6, 1993.

Akerly, Kurt, "RealityEngine Graphics", ACM SIGGRAPH, Conference Proceedings, pp. 109–116, Aug. 1–6, 1993.

Mcmillan, Leonard, et al., "Pienoptic Modeling: An Image––Based Rendering System", ACM SIGGRAPH, Conference Proceedings, pp. 39–46, Aug. 6–11, 1995.

Tan, Wee–Chiew et al., "Low–Power polygon Renderer for Computer Graphics", Application Specific Array Processors, 1993 International Conference, pp. 200–213, 1993.

Bae, Seong–Ok, et al., "Patch Rendering: A New Parallel Hardware Architecture for Fast Polygon Rendering", Circuits and Systems, 1991 IEEE International Symposium, pp. 3070–3073, 1991.

\* cited by examiner

548 BOUNDING BOX
546 OBJECT

552 GSPRITE
550 OBJECT
556 32x32 PIXEL CHUNK
554 32 PIXEL CHUNK BOUNDARY

32x32 PIXEL CHUNK 568
558
560 OBJECT
570
32 PIXEL CHUNK BOUNDARY
564 GSPRITE
572 32x32 PIXEL SCREEN BOUNDARY
562 OBJECT
566 GSPRITE

Fig. 23

| j\i | 0 | 1 | 2 | 3 | 4 | 5 | 6 | 7 |
|---|---|---|---|---|---|---|---|---|
| 0 | 0→1 | 5→6 | 14→15 | 27→28 | | | | |
| 1 | 2→3 | 4 | 7 | 13 | 16 | 26 | 29 | 42→43 |
| 2 | 9→10 | 8 | 12 | 17 | 25 | 30 | 41 | 44 |
| 3 | 11 | 18 | 24 | 31 | 40 | 45 | 53→54 | |
| 4 | 20→21 | 19 | 23 | 32 | 39 | 46 | 52 | 55 |
| 5 | 22 | 33 | 38 | 47 | 51 | 56 | 60→61 | |
| 6 | 35→36 | 34 | 37 | 48→49 | 50 | 57→58 | 59 | 62→63 |
| 7 | | | | | | | | |

| Has R/Y | Has G/U | Has B/V | Has α | Clr Cnv Bypass | Pixel Format | Cmprsn Type | Data Stored As |
|---|---|---|---|---|---|---|---|
| 1 | 1 | 1 | 1 | 1 | 00 | 001 | 32 bpp packed αRGB, uncompressed |
| 1 | 1 | 1 | 1 | 1 | 01 | 001 | 16 bpp packed αRGB1555, uncompressed |
| 1 | 0 | 0 | 1 | 1 | 10 | 001 | 16 bpp packed α/index, uncompressed |
| 1 | 0 | 0 | 0 | 1 | 10 | 001 | 8 bpp packed indexed, uncompressed |
| 1 | 1 | 1 | 1 | x | 01 | 010 | 16 bpp planar αRGB1555, lossless compression |
| 1 | 0 | 0 | 1 | 1 | 10 | 010 | 16 bpp planar α/index, lossless compression |
| 1 | 0 | 0 | 0 | 1 | 10 | 010 | 8 bpp planar indexed, lossless compression |
| x | x | x | x | x | 00 | 010 | planar, lossless compression |
| x | x | x | x | x | 00 | 011 | planar, lossy compression |
| x | x | x | x | x | 00 | 1xx | planar, lossy compression |

IMAGE COMPRESSION METHOD TO REDUCE PIXEL AND TEXTURE MEMORY REQUIREMENTS IN GRAPHICS APPLICATIONS

REFERENCE TO PRIOR APPLICATIONS

This is a continuation of application Ser. No. 08/672,102 filed Jun. 27, 1996, now U.S. Pat. No. 5,999,189, which is hereby incorporated by reference. Application Ser. No. 08/672,102 is a continuation-in-part of application Ser. No. 08/560,114, filed Nov. 17, 1995 (now abandoned). Application Ser. No. 08/560,114 is a continuation of application Ser. No. 08/511,553, filed Aug. 4, 1995, (now abandoned).

TECHNICAL FIELD

The invention generally relates to image compression and to the use of image compression in real-time image generation systems.

BACKGROUND

Graphics rendering refers generally to the process of generating a two-dimensional image from graphical models. These graphical models define attributes of real or imaginary objects such as the color, shape, and position. A sophisticated three-dimensional model, for example, may describe the surface of an object in terms of its color and shape, and may also specify lighting and shading attributes to be applied to the surface. To add even further surface detail, an image referred to as a texture can be mapped onto the surface of the object. To render this type of object, a graphics system processes the model of the object and generates an array of pixel data, which represents a two-dimensional image of the object.

There is an increasing demand for applications that employ graphics or animation. Computer generated graphics and animation, for example, are used in a variety of applications including games, educational tools, office automation and film making. As the performance of the typical desk-top personal computer continues to increase, more applications are developed to exploit this performance and generate more interesting and interactive graphical interfaces. Despite this increase in performance, rendering of 3-D graphical objects and especially 3-D animation is still difficult to achieve without expensive, special purpose hardware.

Today's real-time graphics rendering systems are particularly costly due to the vast amount of specialized memory and processing resources required to achieve visual realism. To achieve truly interactive and realistic effects, graphical objects must be rendered to generate a new display image every fraction of a second so that the user perceives continuous motion of objects in the scene. In addition, the system must respond with minimal delay to user input so that the reaction to the inputs represented in the display images appears realistic.

Consider, for example, an interactive video game including three-dimensional monsters moving about in a changing environment. To achieve realistic and interactive effects, the graphics rendering system has to generate a new display image at least 12 times a second, and preferably at video rates which range from 60 to 75 frames a second. The delay between the user moving a joystick and the display of the response must be kept to a minimum.

In some graphics rendering systems, the surfaces of the graphical objects are modeled with a mesh of planar polygons. Graphical attributes such as color and texture data are stored at the vertices of the polygon. The process of generating each frame of image data includes a number of steps. First, the system has to compute which objects are potentially visible in the scene. To make this computation, the system typically performs a series of geometric transformations on the vertices of the polygons. As the user moves a joy stick, for example, the position of the viewpoint changes, and the objects move independently and react to input. After determining which objects are potentially visible in the display image, the system transforms potentially visible objects to a two-dimensional space, sometimes referred to as the view space or screen space.

In the next step, the system rasterizes or scan converts the polygons into an array of pixel data. Conventional architectures often store pixel data in a large frame buffer. The buffer stores color intensity values for each element in the array. Additional processing of the polygons or the pixel data is usually required to determine how the objects occlude each other in the scene. A process called anti-aliasing is typically performed to remove artifacts such as jagged edges from the display image. For instance, if an object has a complex and detailed surface, the system may perform anti-aliasing to ensure that the detail is accurately represented. Because of the need to generate the entire image in only fractions of a second, however, it is extremely difficult and expensive to support anti-aliasing or other lighting and shading operations in a real-time system.

The final step is to transfer the rendered display image to a display device. Though other display technology is available, the predominant display technology today for high-resolution graphics is raster graphics. A raster display device includes an array of individual points or picture elements (i.e., pixels), arranged in rows and columns, to produce the image. In a cathode ray tube (CRT), these pixels correspond to a phosphor array provided on the glass faceplate of the CRT. The emission of light from each phosphor in the array is independently controlled by an electron beam that "scans" the array sequentially, one row at a time, in response to stored information representative of each pixel in the image.

In the context of a real-time system, there are a couple of different ways to characterize the rate of display generation. One rate refers to the rate at which the graphics rendering pipeline updates the rendered image in the frame buffer. This is sometimes referred to as the computational rate because it describes the rate at which a new image is computed. Another rate is the rate at which the display device is refreshed. To avoid flickering of the image, the CRT has to be refreshed at least 60 times a second. It is not necessary that the computational rate equal the refresh rate. However, to ensure that new image data can be generated while a current image or frame is being scanned to the display device, conventional architectures often include two separate frame buffers.

From the overview above, it should be apparent that real-time graphics rendering systems designed according to a traditional frame buffer architecture are expensive. The cost is driven by the memory size and memory bandwidth required in a traditional frame buffer architecture. To the extent that the architecture includes parallel processing hardware, the cost is even higher because parallel processing hardware and the specialized memory that it cooperates with adds significantly to the cost of the system. In frame buffer architectures, the memory bandwidth requirements force system designers to use either high cost specialty RAM parts, such as Video RAM or Frame Buffer RAM.

Alternatively, very wide bus DRAM arrays have to be employed, placing a high demand on the pin count of the computational elements of the system. Because of the high cost of these components, the development of a 3-D graphics rendering accelerator with real-time performance and realistic visual effects has been an elusive goal.

In the image processing field, image compression techniques are widely used to store and transfer still images and video. However, image compression has many disadvantages in the context of a graphics pipeline using a conventional frame buffer architecture. First, graphics systems often write pixel data in a highly random manner to the frame buffer. Assuming that image compression could be incorporated into such a system, the amount of overhead would be substantial because of the random nature in which pixel data arrives at various locations across the frame buffer. Second, in a real-time system, an entire frame is generated and then discarded. Thus, it is a significant disadvantage to incur the overhead of compressing and then immediately decompressing the image to generate a display image, only to discard the display image after every frame. Third, conventional architectures often use a Z-buffer to perform hidden surface removal. The Z-buffer is not amenable to compression, and thus, it is difficult to achieve compression, even assuming that the pipeline could incur the overhead without sacrificing real-time performance.

SUMMARY OF THE INVENTION

The invention provides a method for still image compression. This method is particularly suited for representing textures and rendered images in compressed form in graphics rendering applications. However, it is useful as an image compression technique for other applications as well.

One aspect of the invention is a still image compression method in which an image is divided into blocks and the blocks have a corresponding quantization index (QIndex) that reflects the level of quantization applied to the block. The QIndex is an index into a table of QFactors. The method performs an invertable transform on a block to generate coefficients for spatial frequency components in the block. It then quantizes coefficients in the block by dividing them by the QFactor in the table corresponding to the QIndex for the block. The QIndex enables the compression ratio of an image to vary across blocks and within each block.

Another aspect of the invention is a still image compression method that allows each block to be randomly and independently decompressable. A control structure associated with the image stores a pointer to each of the blocks in an image. This control structure allows each block to be accessed independently. This feature is particularly useful for graphics rendering applications where textures are compressed with this method because it allows blocks to be accessed randomly and decompressed for texture mapping operations.

The above methods may be used in compressing and decompressing still images. They may be implemented in software, such as program stored on a computer readable medium, or in hardware, such as a digital logic circuit.

BRIEF DESCRIPTION OF THE DRAWINGS

FIG. 23 is a diagram illustrating zigzag ordering of DCT coefficients in the lossy compression and decompression methods shown in FIGS. 22 and 23.

FIG. 26 is a table illustrating the modes of operation of one implementation of the invention.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of today's windowing environments for personal computers, the system can support improved 3-D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
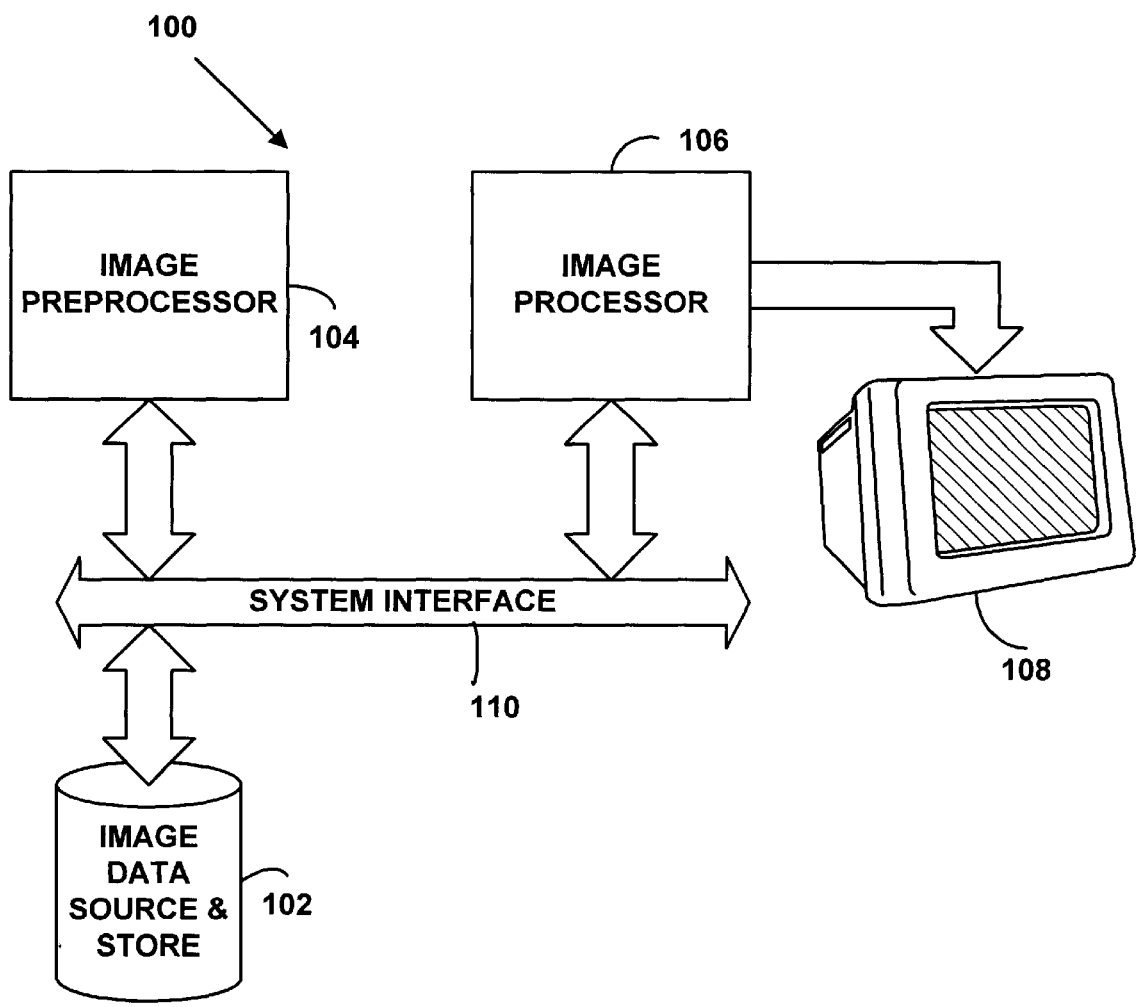
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized sprites, or gsprites, can be rendered into and manipulated independently. The system will generally use an independent gsprite for each non-interpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail—to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High-end systems utilize eight bits for each of three-color components, and often also include an eight bit alpha value. Low-end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement anti-aliasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "ping-pong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real-time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
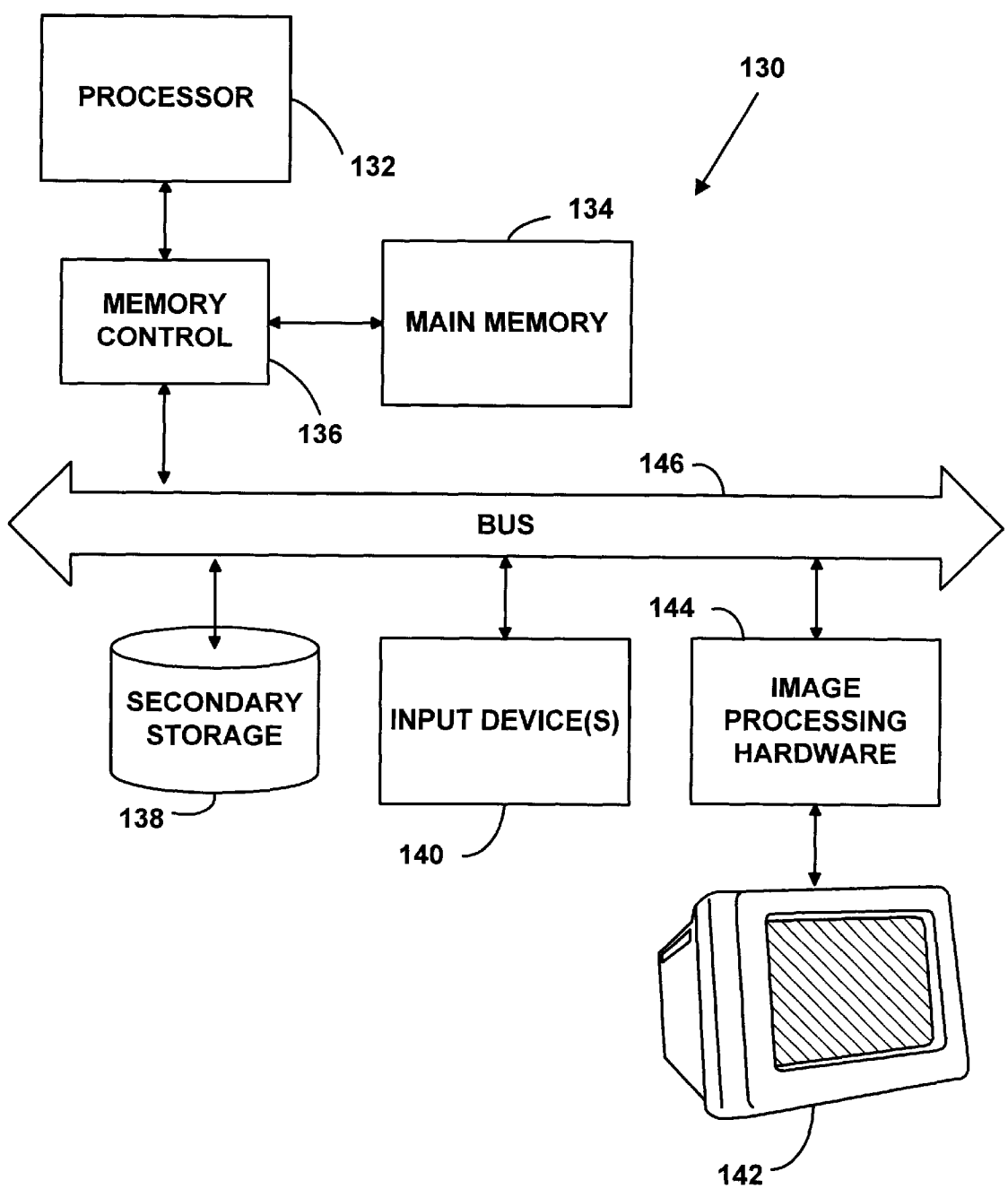
FIG. 2 is a block diagram of the system environment for an embodiment of the invention.

FIG. 2 is a block diagram of a computer system 130 in which the image processing system can be implemented.

The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high-speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus. The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on a board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement the image processing system, or aspects of it, on alternative platforms.

Figure 3:
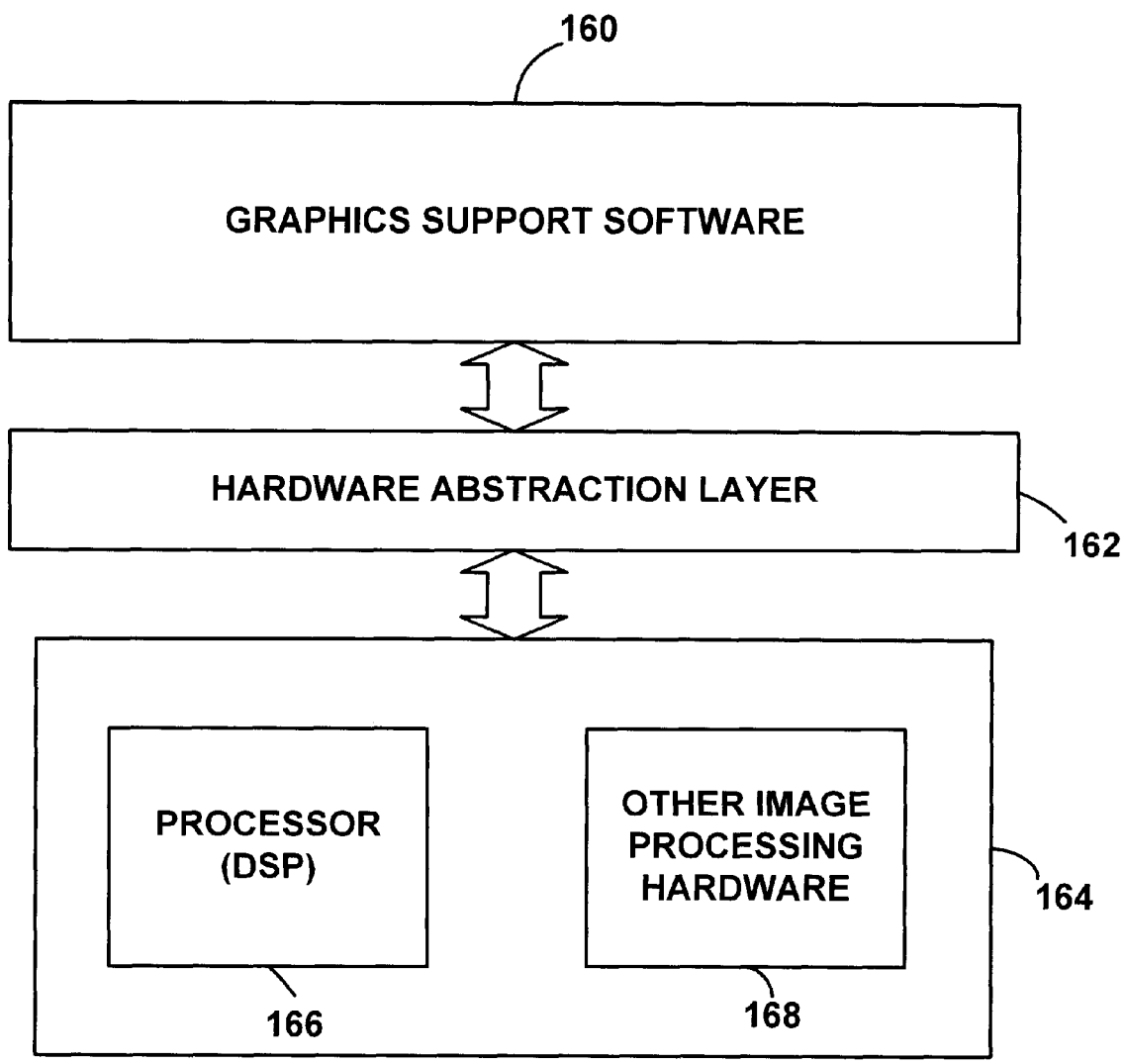
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes functions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
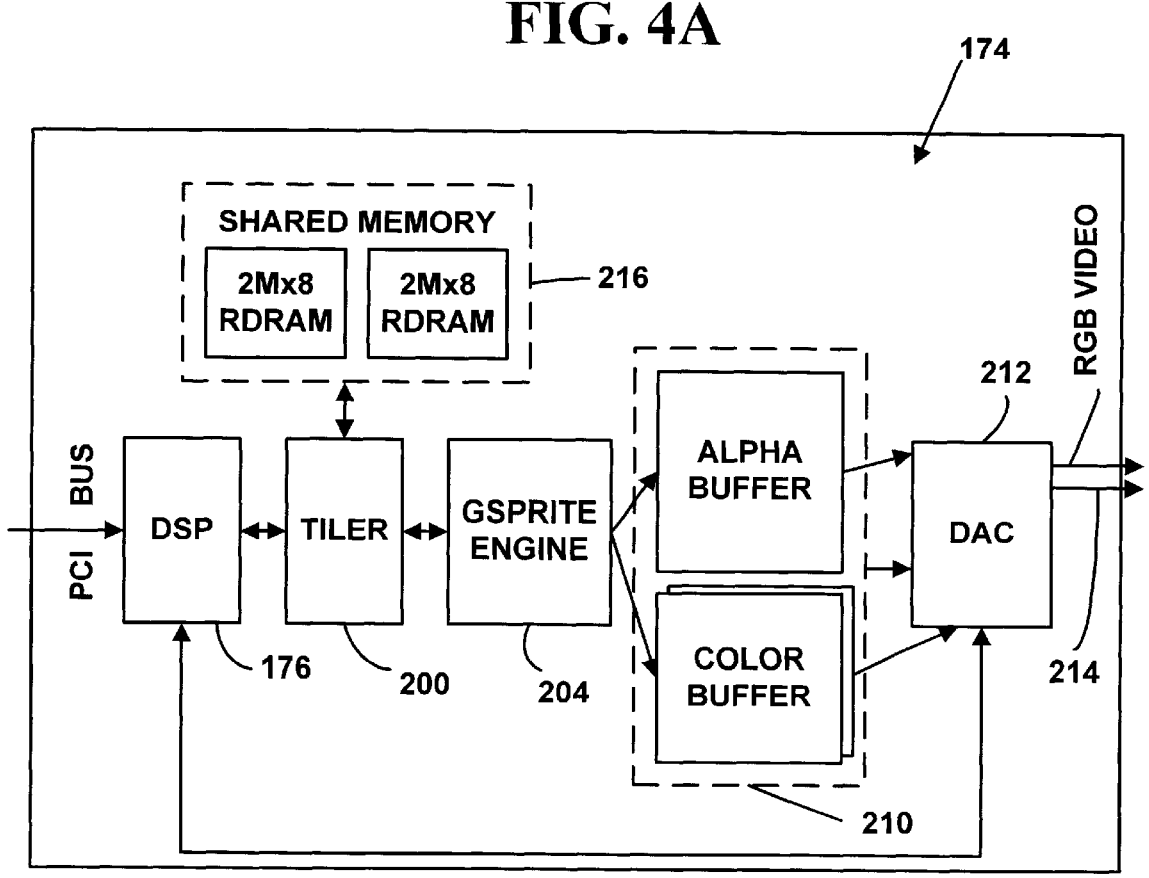
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and front-end graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
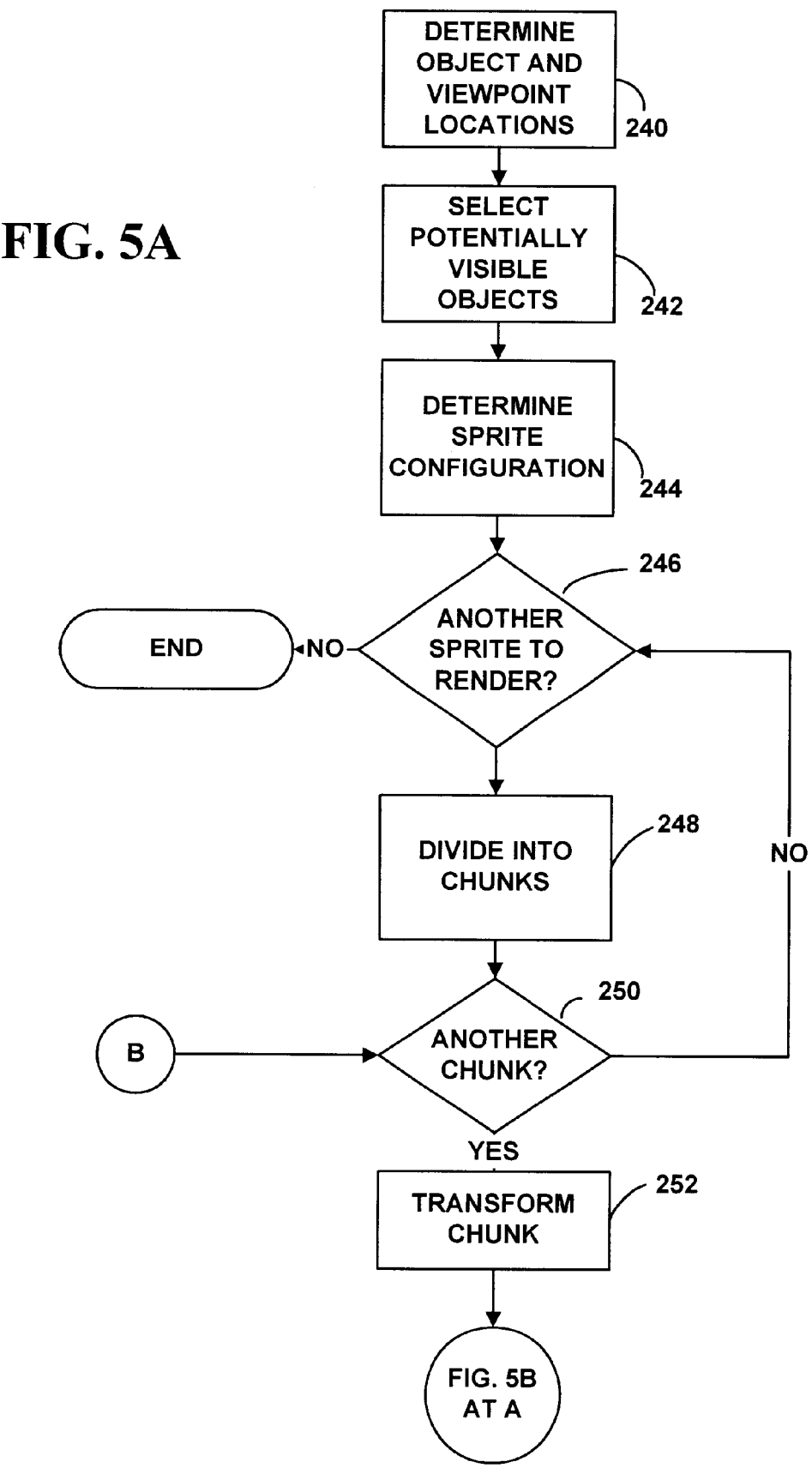
FIGS. 5A and 5B are flow diagrams illustrating an overview of the rendering process in an embodiment.
Figure 5B:
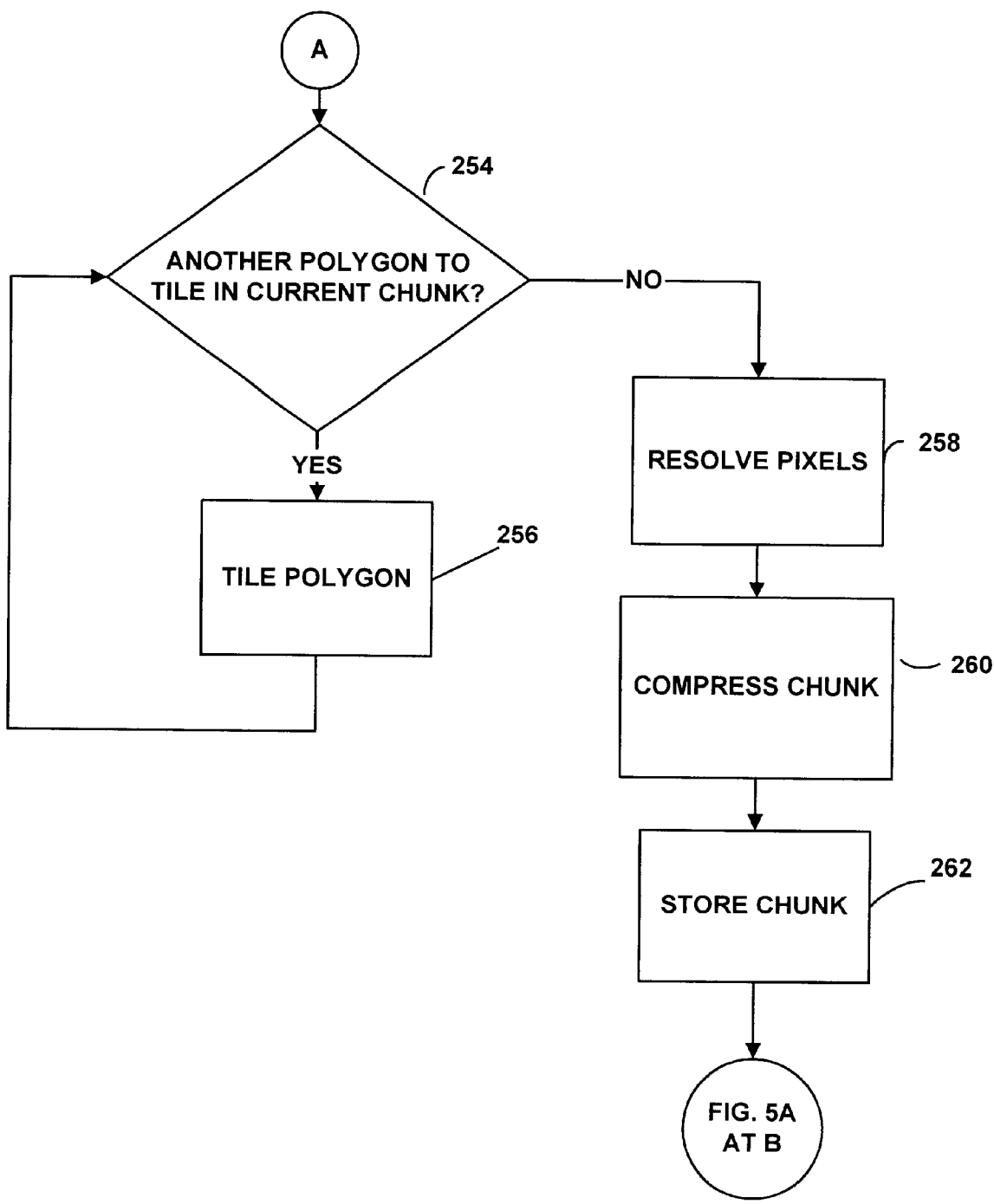

FIGS. 5A and 5B are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or self-occluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem.

After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is to determine how to divide the object geometry among the chunks (250). The image preprocessor determines how the geometric primitives (e.g. polygons) should be divided among the chunks by transforming the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Decision step (254) (FIG. 5B) and the step (256) following it represents the process of tiling the polygons within the chunk. While the image processor has included polygons that overlap the boundaries of the current chunk, it only produces pixels that lie within the chunk. The produced pixels include information for antialiasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
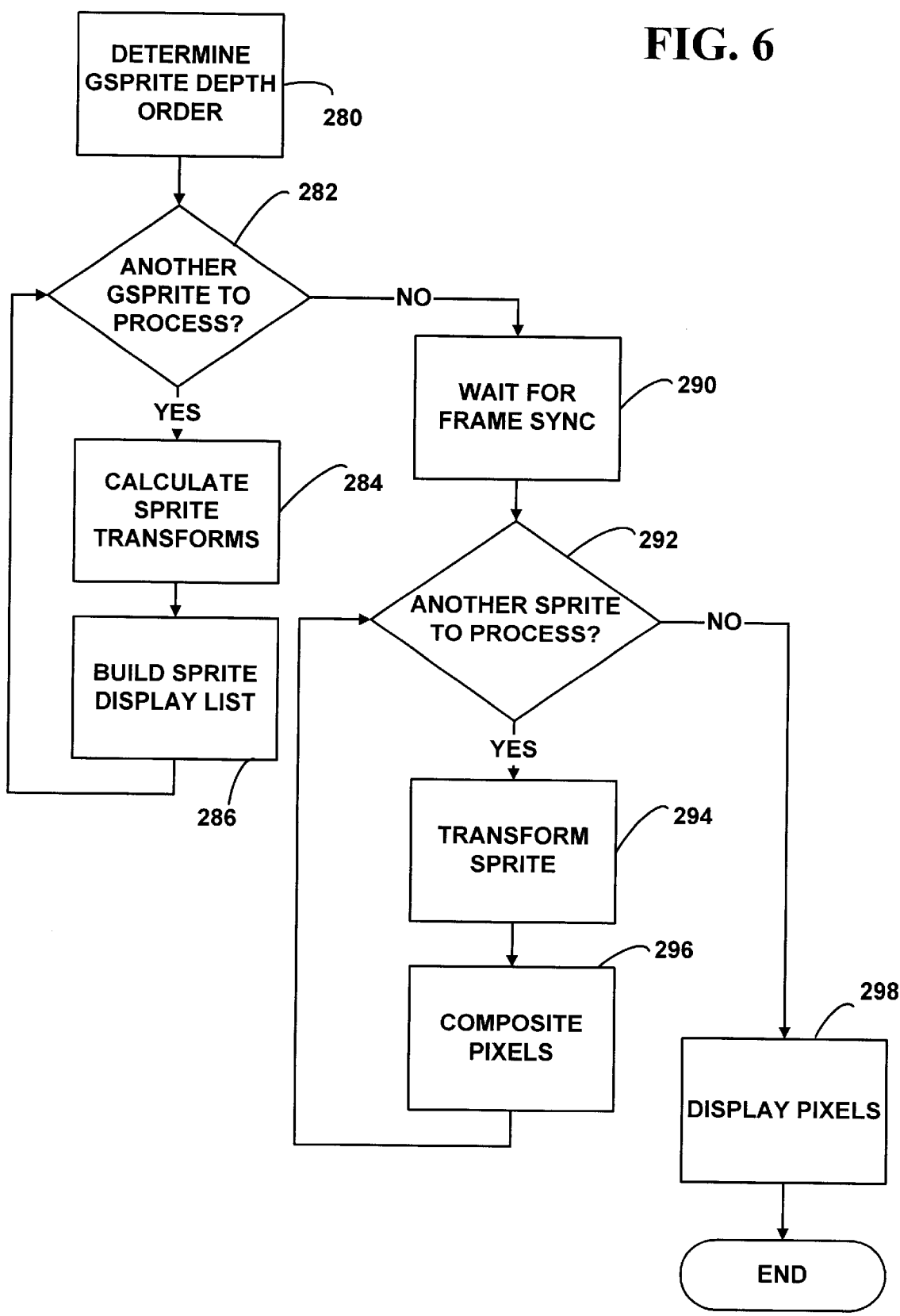
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and builds the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
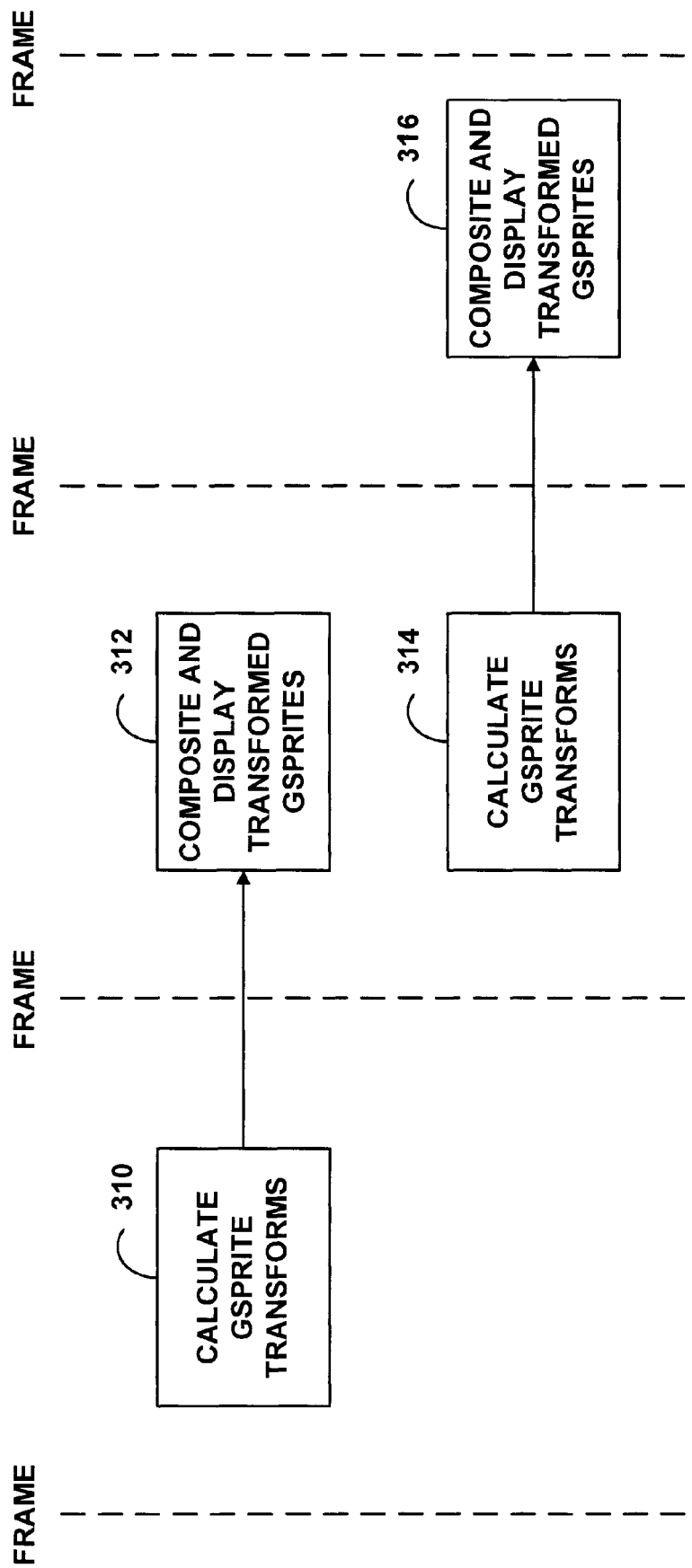
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
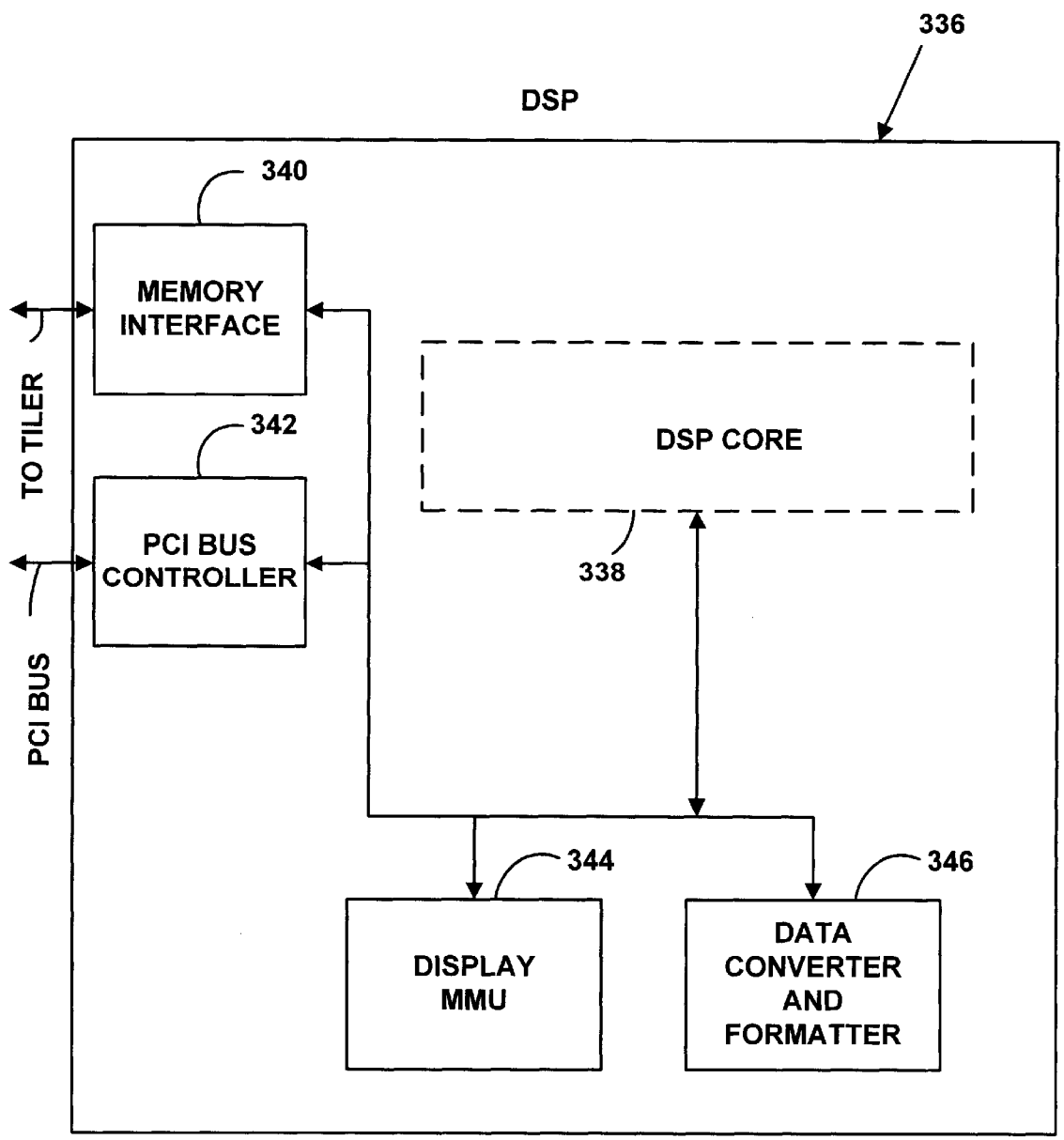
FIG. 8 is a block diagram of a Digital Signal Processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front-end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz. It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations.

Among its formatting tasks, the data formatter and converter 346 formats triangle command data for the tiler. R G B (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (MMU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

Figure 9A:
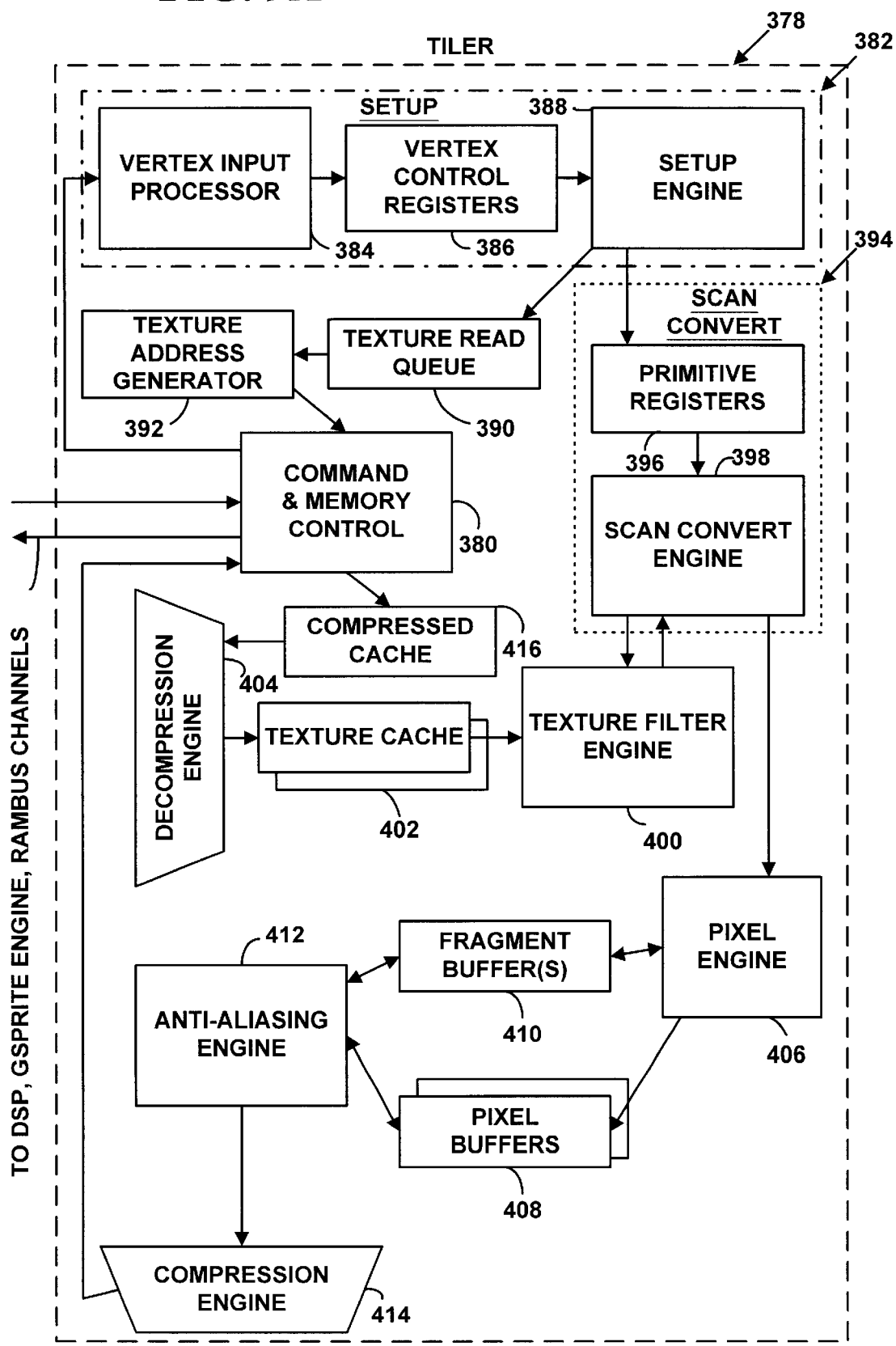
FIGS. 9A–C are block diagrams illustrating alternative embodiments of a tiler.

FIG. 9A is a block diagram of the tiler 200 on the image processing board 174. The tiler is responsible for 2-D and 3-D graphics acceleration, and for shared memory control. As shown in the block diagram of the image processing board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

Figure 4B:
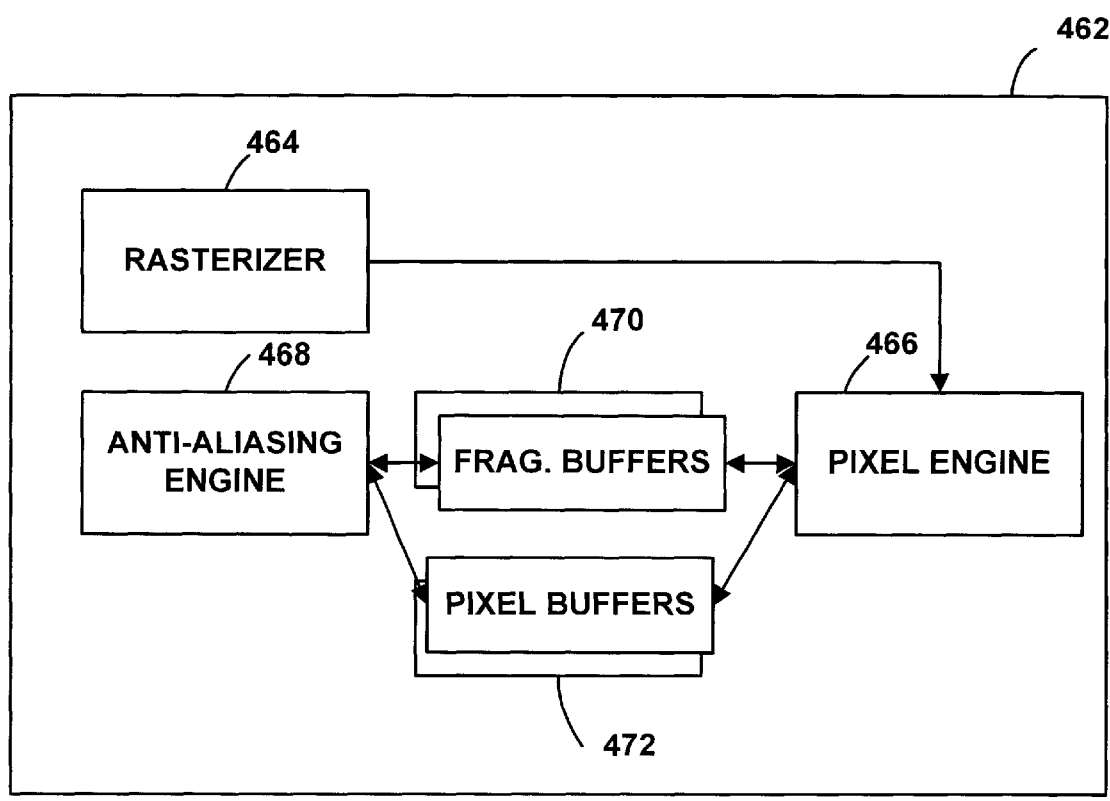
FIG. 4B is a block diagram illustrating portions of an image processor for rendering geometric primitives in an embodiment.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
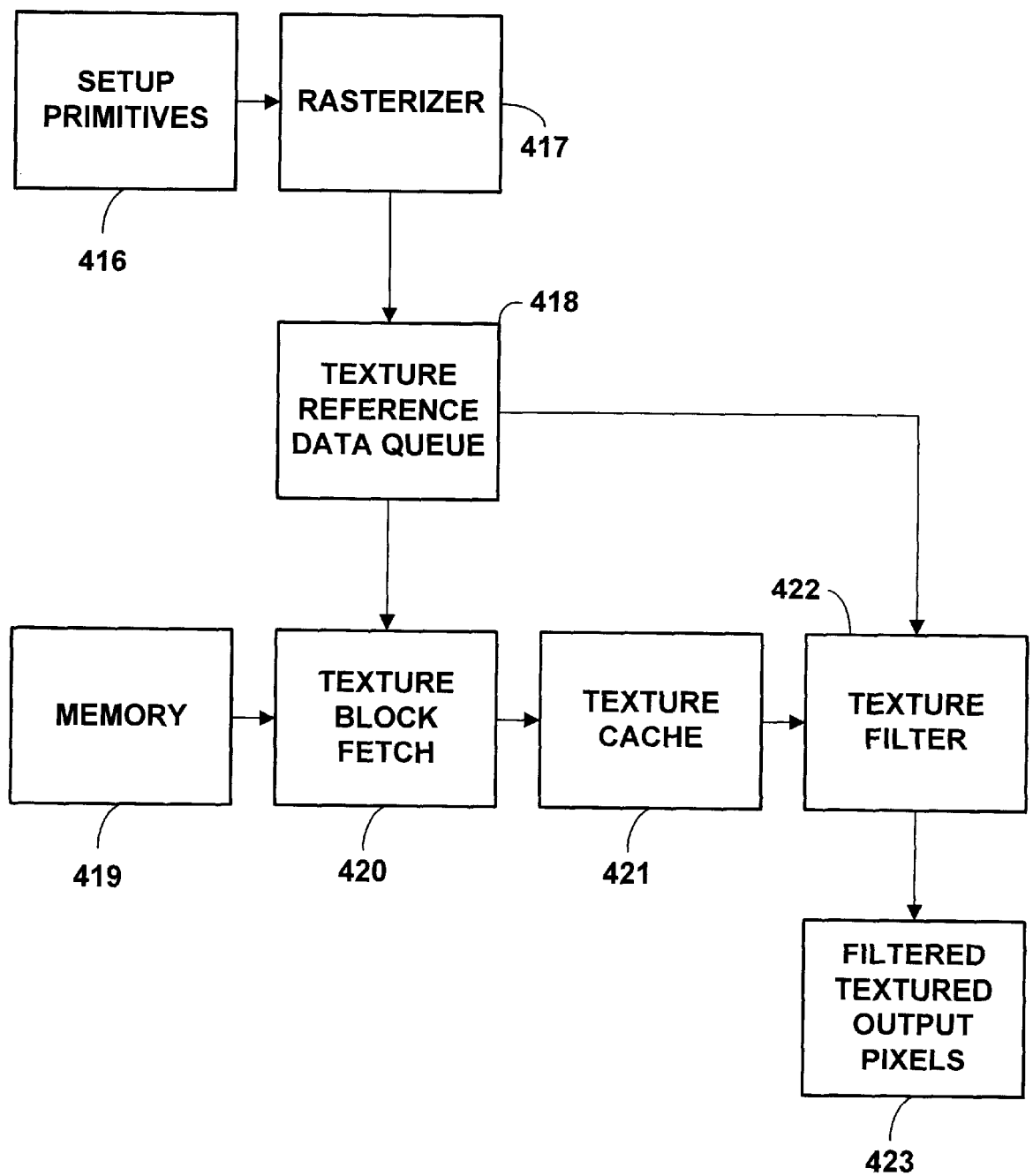
FIG. 10 is a block diagram illustrating a system for accessing texture data from memory.
Figure 11:
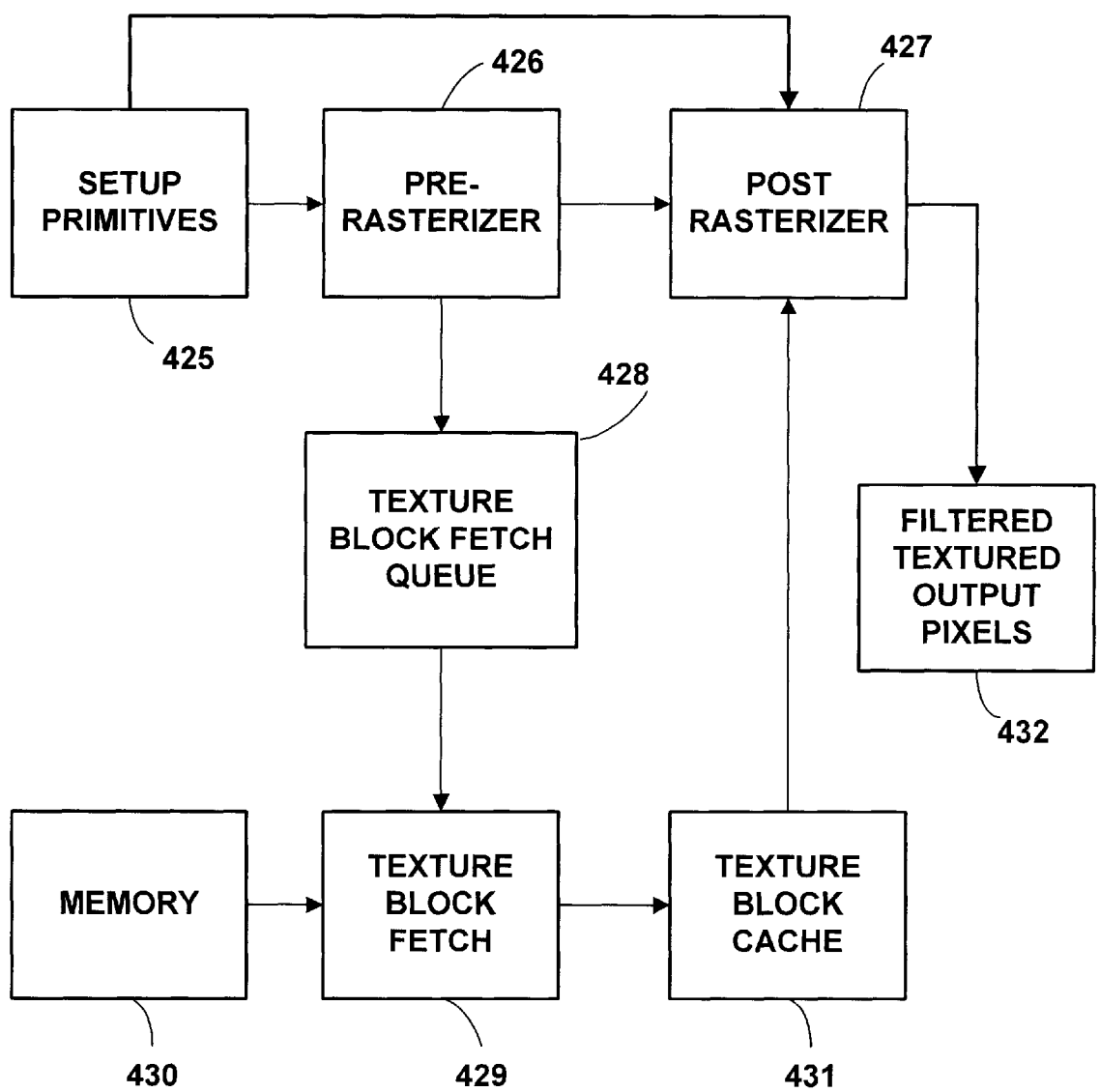
FIG. 11 is a block diagram illustrating a system for accessing texture data from memory.

FIGS. 10 and 11 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z); a coverage mask; color and translucency data; the coordinates of the center for the texture request (S, T); and texture filter data. The depth and coverage data is only needed in the texture reference data queue if high-quality anti-aliasing of pixels is desired. Alternatively, hidden surface removal and antialiasing can be performed in the rasterizer 417. If hidden surface removal and anti-aliasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using at least recently used (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
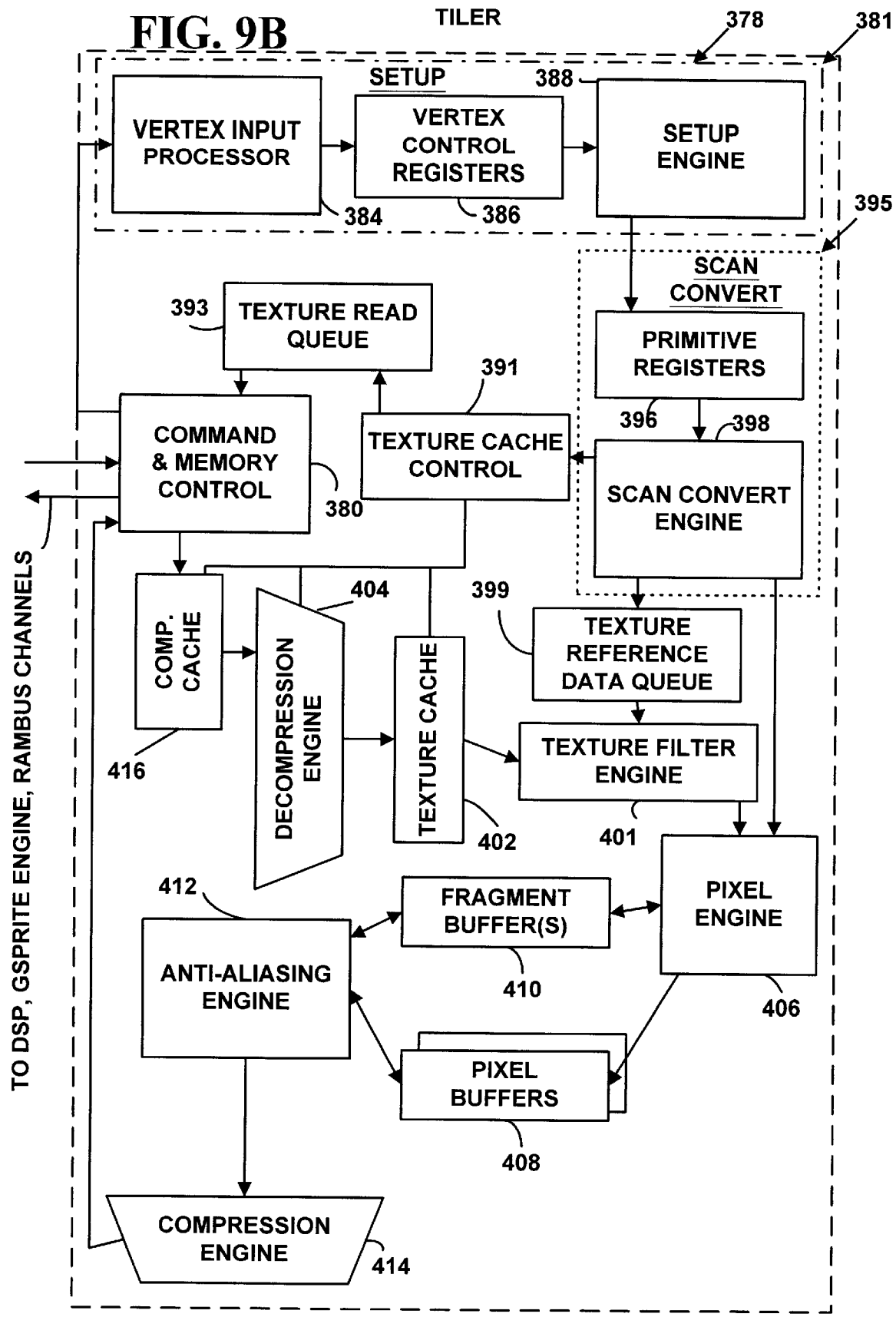

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
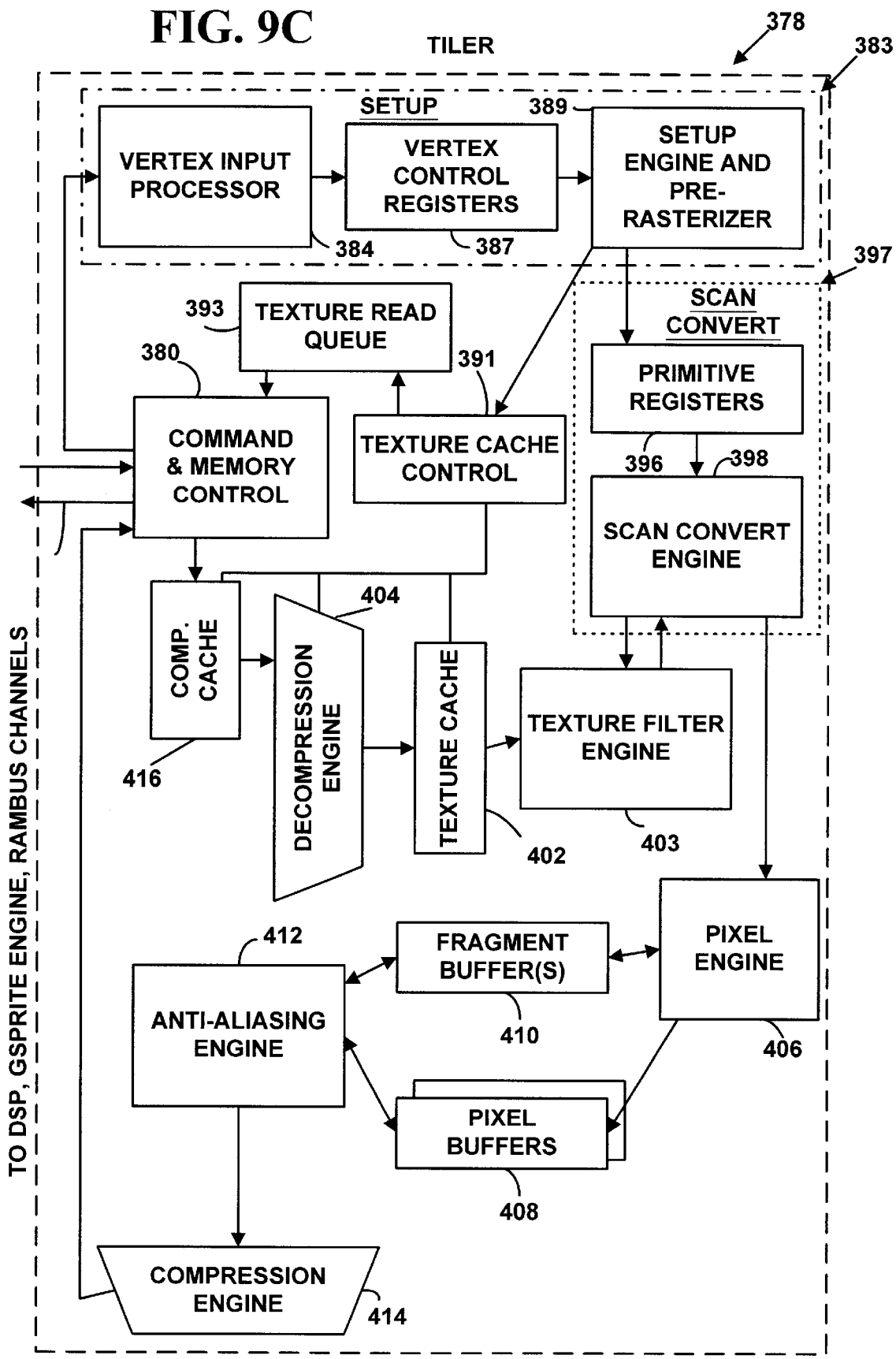

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the pre-rasterizer can quickly convert the primitives to initiate texture data requests. The set-up engine and pre-rasterizer 383 send requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory. The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine 403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIGS. 11 and 9C); and (2) a single rasterizer followed by a pixel FIFO (FIGS. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing—the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already full and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped of entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
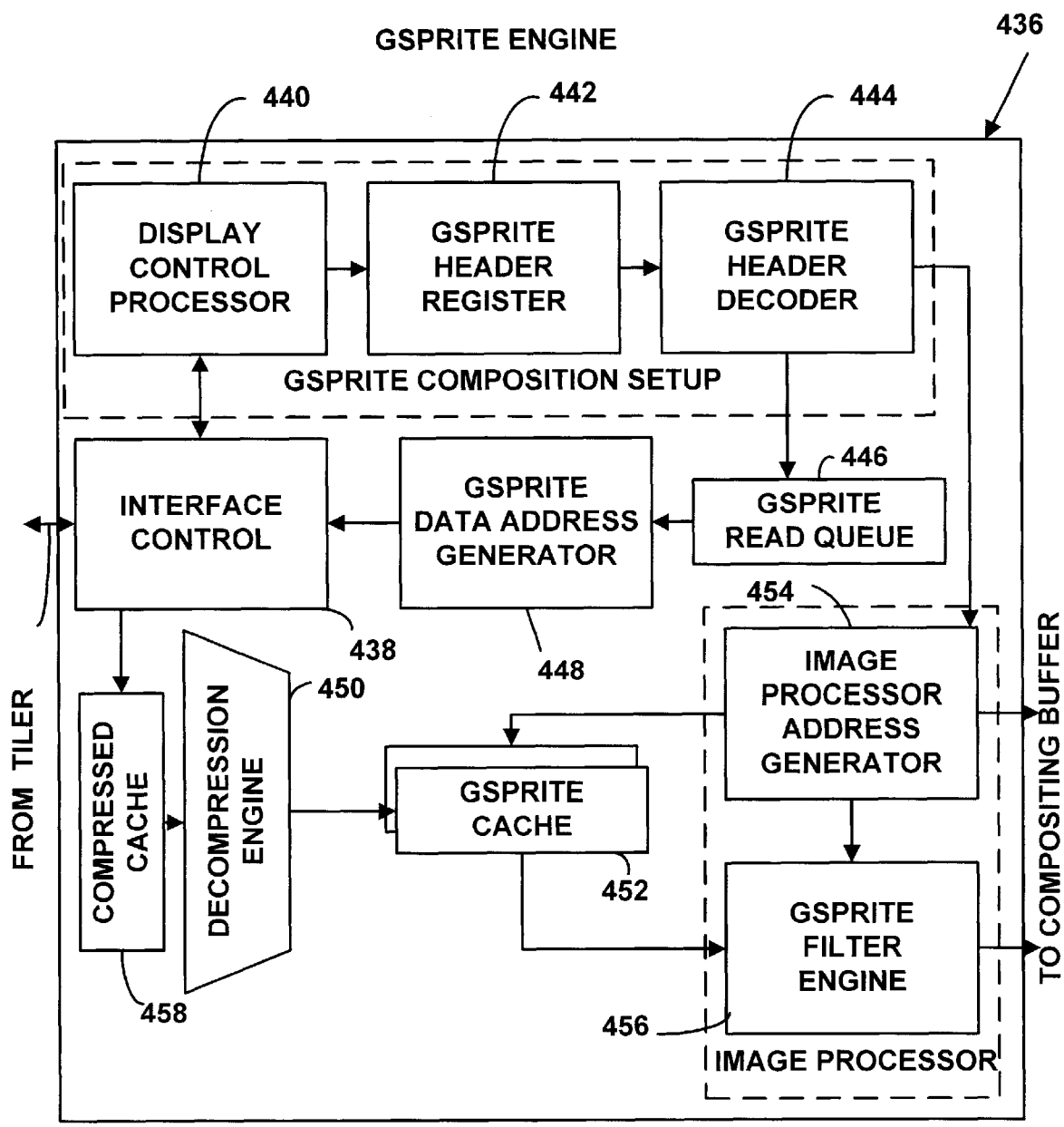
FIGS. 12A–B are block diagrams illustrating alternative implementations of a gsprite engine in an embodiment.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks (in this case, the 8×8 compression blocks) required to render the gsprite in each band.

The gsprite header decoder 444 determines which blocks from each gsprite are visible in the 32-scanline band and generates block read requests which are transferred to the gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G B) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bilinear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
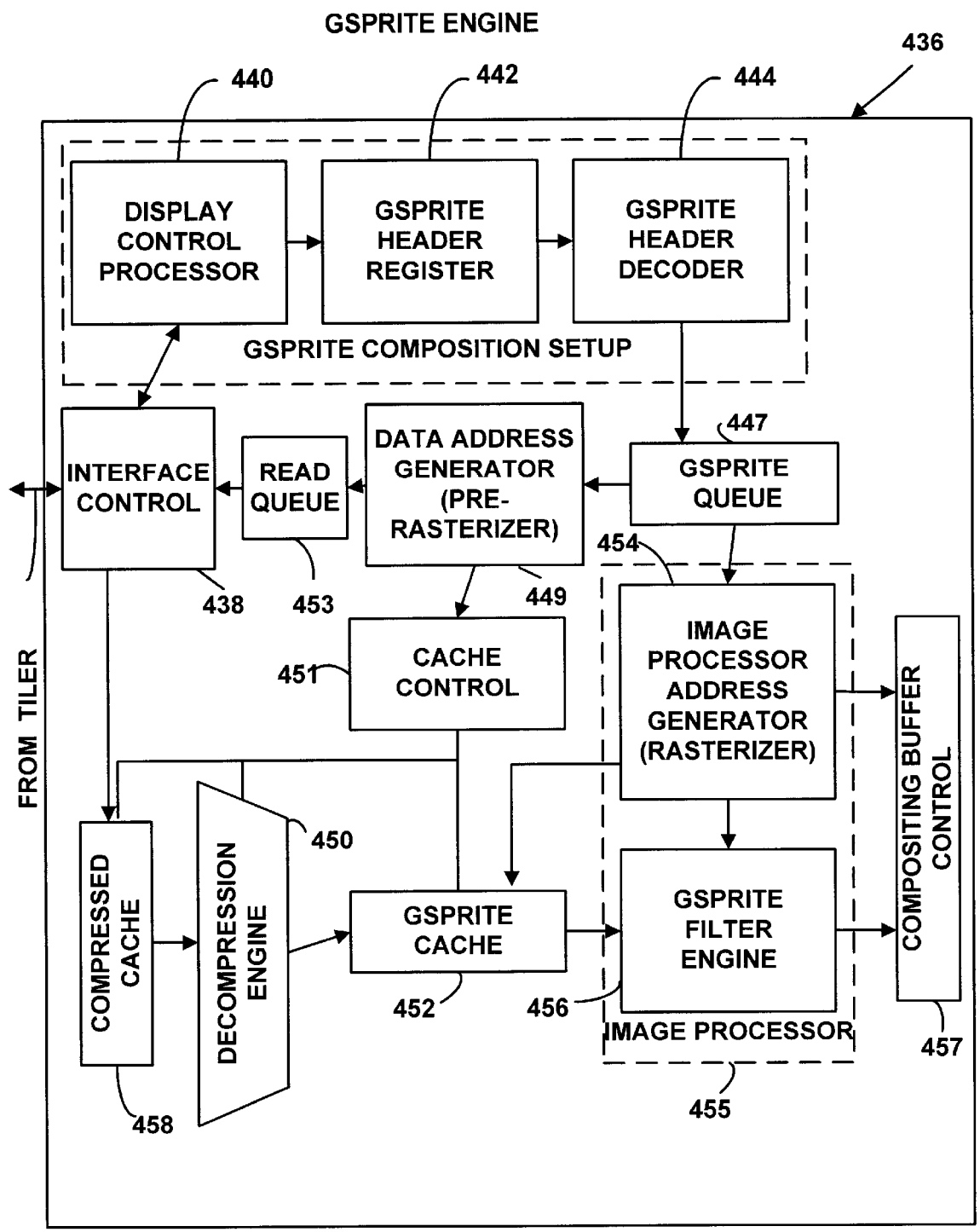

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data. The dual rasterizer approach used in this implementation is described above in connection with FIGS. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2 by 2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
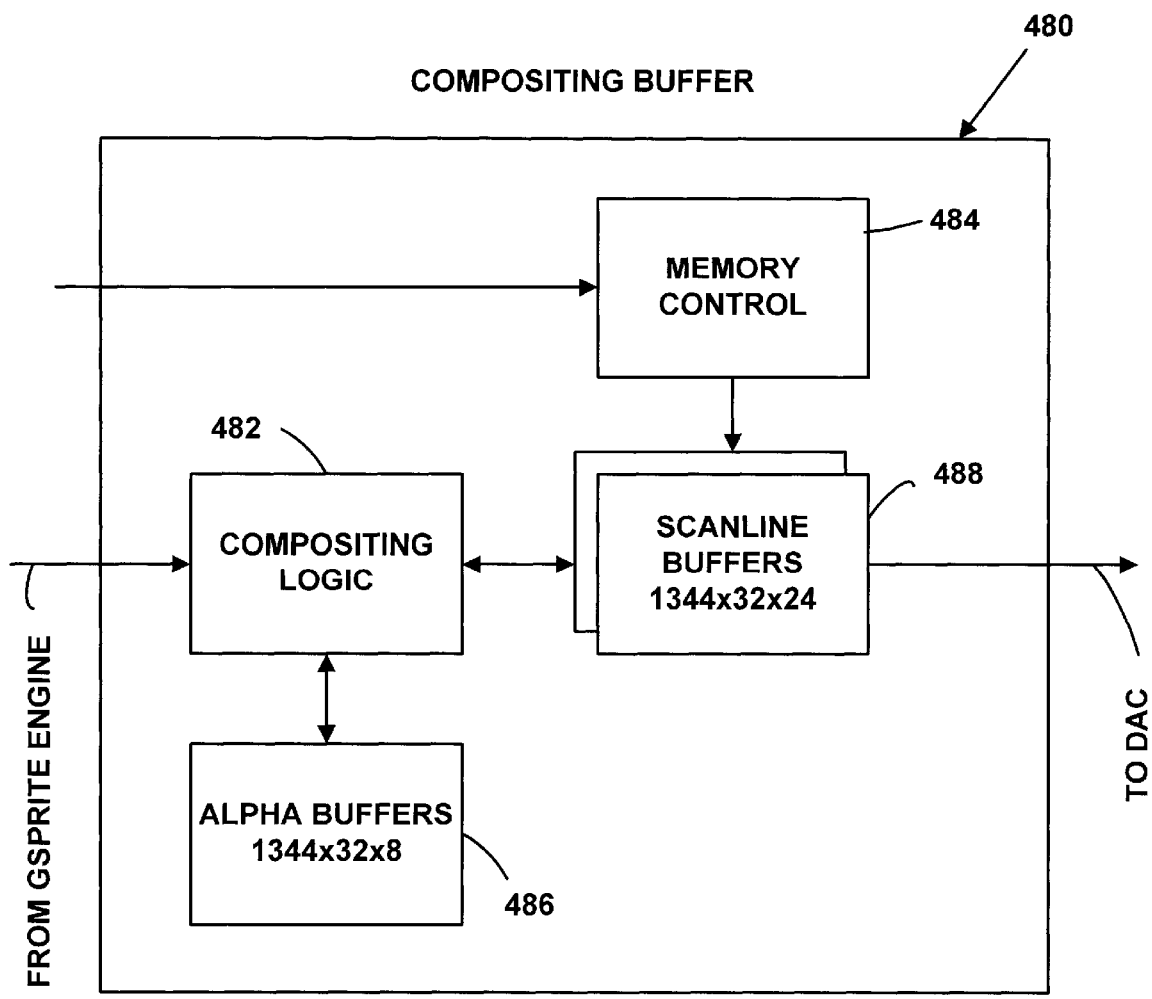
FIG. 13 is a block diagram of a compositing buffer in an embodiment.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344×32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
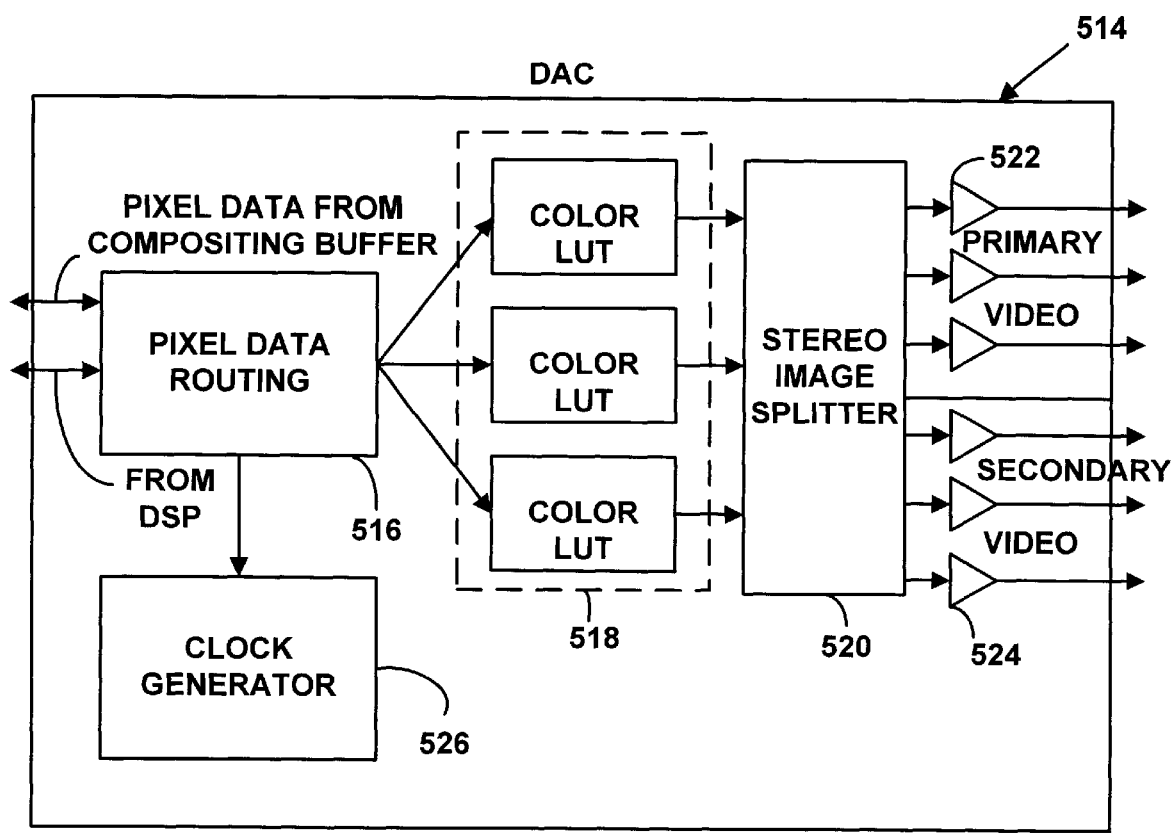
FIG. 14 is a block diagram of a digital-to-analog converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Having described the structure and operation of the image processing system above, we now describe various components and features of the system in more detail. We begin with an introduction to the data structures that can be used in the system to implement concepts introduced above.

Geometry Processing

In one embodiment of the image processing system, there is a fundamental primitive type to describe all geometry, including triangle strips, triangle fans, polylines and points. Within each primitive there may be several sub-primitives of the same primitive type (e.g. a collection of triangle strips). A primitive has a header and a series of vertices. The header describes the following:

Primitive Type: triangle, line or point
  Per-vertex information: Indicates what data is specified at each vertex, and may include color values, normal vectors, texture coordinates, and Z-values.
  Control information: Flags to control front/back culling and automatic computation of normal vectors.

A vertex includes position information, and the following optional information. The presence of this optional information is indicated in the header word of the primitive.
  Color information: R, G, B colors specified as either floating point or integer.
  Normal vectors: Surface normals used for lighting calculations.
  Texture coordinates: u and v indices into the current texture map.

Z-values: These will normally exist, except for 2-D primitives, or for applications that choose to pre-sort geometry by depth.

Edge normals: These are used in some anti-aliasing calculations.

In addition, a vertex has two control bits that specify:

Strip/Fan: Indicates whether this vertex is to be considered a strip vertex or a fan vertex.

Start/Continuation: Specifies whether this vertex is the start of a new sub-primitive.

The appearance of the primitive can be influenced by the graphics attributes such as transformation matrix, lighting models, and texture. These state variables are described in the following section.

The image processing board 174 maintains a limited number of state tables 16 including attributes that affect rendering. Functions are provided for loading and selecting graphics state as described below:

Load State: Defines the complete state for a given state table.

Select State: Selects one of the state tables as the currently active one.

Set State Variable: Overwrites a specific state variable in the currently selected state table.

The following graphics attributes can be included in the state table:

Matrix: 4×4 Modeling/Viewing/Projection transformation matrix, along with flags to assist in performance optimization.

Material properties: This includes emissive color, diffuse color, ambient color and specular color.

Lighting models: Ambient, directional, positional and spot lights are supported. Lighting parameters include ambient intensity, diffuse intensity, specular intensity, position, direction, attenuation factor (constant, linear and quadratic), spotlight exponent and spotlight cutoff angle.

Shading mode: Gouraud and flat shading are supported. In addition, there may be a shading language that facilitates user-definable shaders.

Texture control: This includes an on/off flag, texture gsprite (textures maps are stored as gsprites), texture mapping mode (clamp/wrap), texture application mode (blend, decal, modulate), and texture filtering mode.

Fog mode: This includes an enable flag, fog type (linear, exponential, exponential squared), and parameters for computing fog blending factor (fog density, near distance and far distance).

Chunking

Unlike conventional graphics systems which use a large frame buffer and Z-buffer in RAM to store color, depth, and other information for every pixel, our system divides objects in a scene among image regions called "chunks" and separately renders object geometries to these chunks. In one embodiment, objects are rendered to gsprites. The gsprites are sub-divided into chunks, and the chunks are rendered separately. While our description refers to several specific embodiments, it should be understood that chunking can be applied in a variety of ways without departing from the scope of the invention.

Figure 15A:
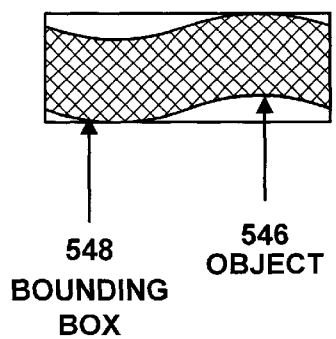
FIGS. 15A–C are diagrams of an example illustrating one aspect of chunking.
Figure 15B:
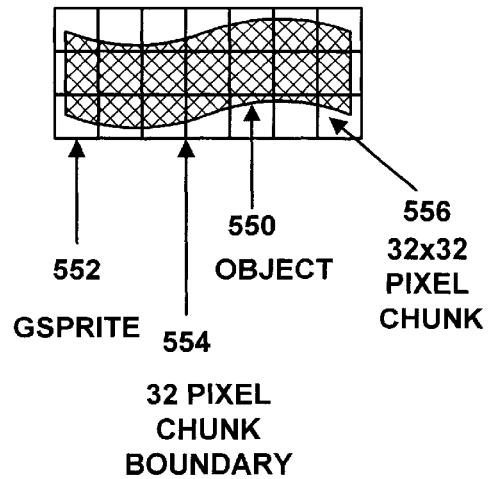

A few examples will help illustrate the concept of chunking. As shown in FIG. 15A an object 546 in a graphics scene is enclosed by a box called a bounding box 548. Turning to FIG. 15B, an object 550 in the graphics scene enclosed by a bounding box can be rendered to an image region called a gsprite 552. The bounding box may be rotated, scaled, expanded or otherwise transformed (e.g. affine transformed) to create a gsprite in screen space. Once the bounding box has been generated, if the bounding box does not fall on a 32 pixel boundary (i.e. the chunk boundary) 554, the bounding box is expanded in both the X and Y directions around the object to become an integer multiple of the 32 pixel chunk size. As can be seen from the object 550 in FIG. 15B, a bounding box drawn around the object 546 that was shown in FIG. 15A, is expanded to 32×32 pixel boundaries in FIG. 15B. The gsprite is then subdivided into 32×32 pixel "chunks" 556 before rendering. However, other smaller or larger chunk sizes and alternatively shaped chunks could also be used. However, rectangular and most preferably square shaped chunks are illustrated.

Figure 15C:
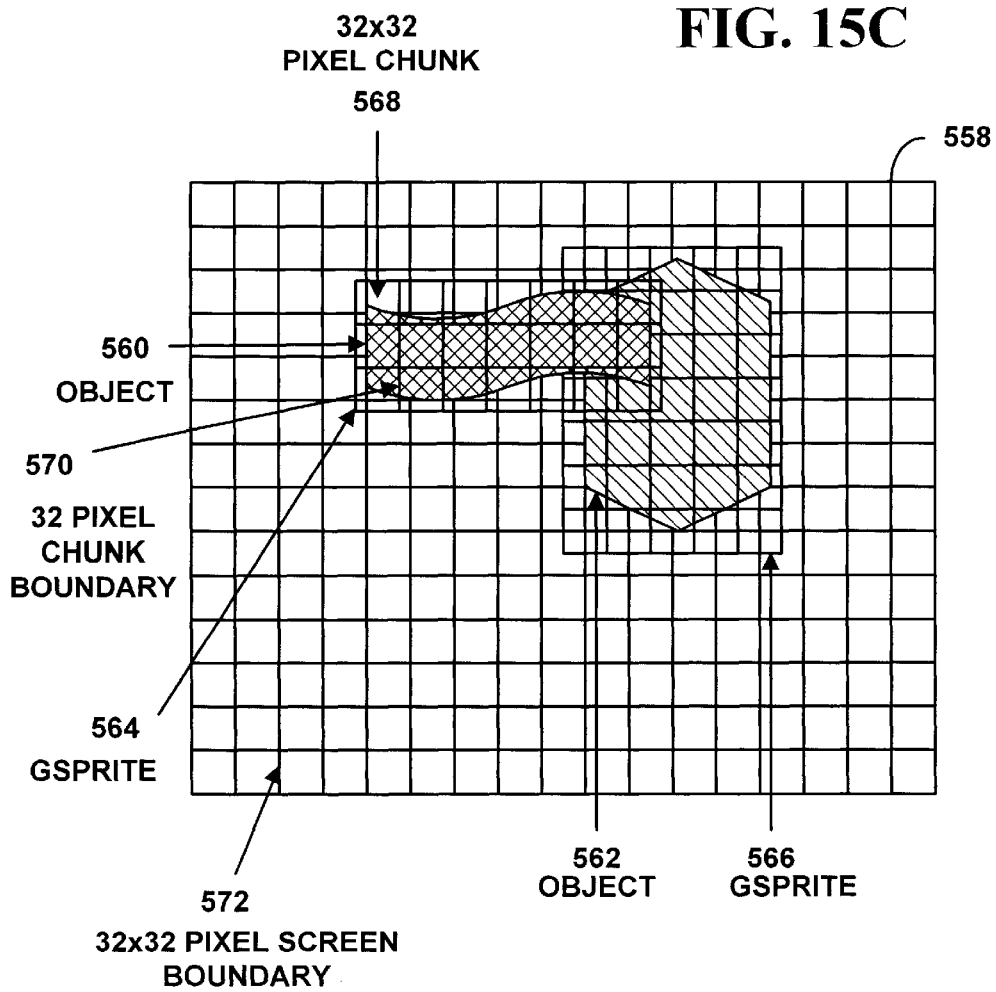

As is shown in FIG. 15C, a graphics scene 558 will contain a number of overlapping objects (560, 562). These objects are enclosed in bounding boxes and are assigned to gsprites (564, 566). The bounding boxes shown in FIG. 15C have already been expanded (and rotated, scaled, and otherwise transformed) to 32 pixel multiples to allow 32×32 chunks 568 to be generated. However, as can also be seen from FIG. 15C, the gsprites and their corresponding 32×32 pixel chunks boundaries 570 typically will not line up exactly on 32 pixel screen boundaries 572 so additional gsprite manipulation is required during chunking so the gsprite can be translated into screen space.

One approach to creating gsprites which will be rendered using chunking is to combine a number of objects to create a larger composite gsprite instead of creating and rendering a number of smaller individual gsprites that contain the geometries of the individual objects. This combination of gsprites saves processing time during rendering and is often desirable if the objects combined do not change very often within a graphics scene. Another approach to create gsprites is to target components of an object with complex geometries, and then sub-divide these complex geometry components into a number of gsprites. This sub-division may require extra processing time, but is used to improve the output resolution of a particular complex object that changes frequently. A combination of both of these techniques may also be used on some objects.

Consider for example a character in a video game whose arms are covered by a number of spikes of different sizes, and the arms move frequently. The body and head and other parts of the character may be combined to form a larger composite gsprite since these parts of the object don't change frequently. However, the character's arms, which are covered with spikes and represent complex geometries and change frequently, are sub-divided into a number of gsprites to improve the output resolution. Both the combination and the sub-division are used in this case. Since it is not easy or practical to draw such a character, for the purposes of illustration, a much simpler object, a "coffee cup" is used instead to illustrate the combination and sub-division.

Figure 16A:
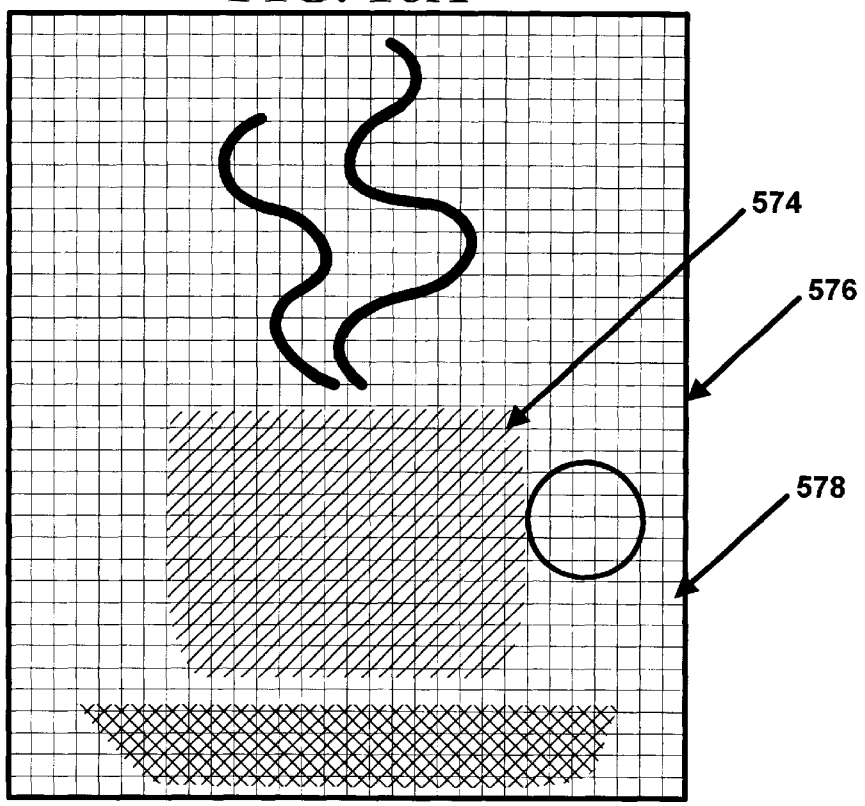
FIGS. 16A–B are diagrams illustrating aspects of chunking in an embodiment.

FIG. 16A shows a "coffee cup." This "coffee cup" is actually composed of a number of separate objects. For example, the "coffee cup" can be looked at to actually consist of a cup container, a cup handle, a saucer, and fumes coming out of the cup. One approach would be to combine these individual objects into a large gsprite (i.e. a "coffee cup") as is shown in FIG. 16A. Another approach would be to sub-divide the "coffee-cup" into a number of smaller objects (e.g. cup container, cup handle, saucer, and fumes) and create smaller individual gsprites as is shown in FIG.

Figure 16B:
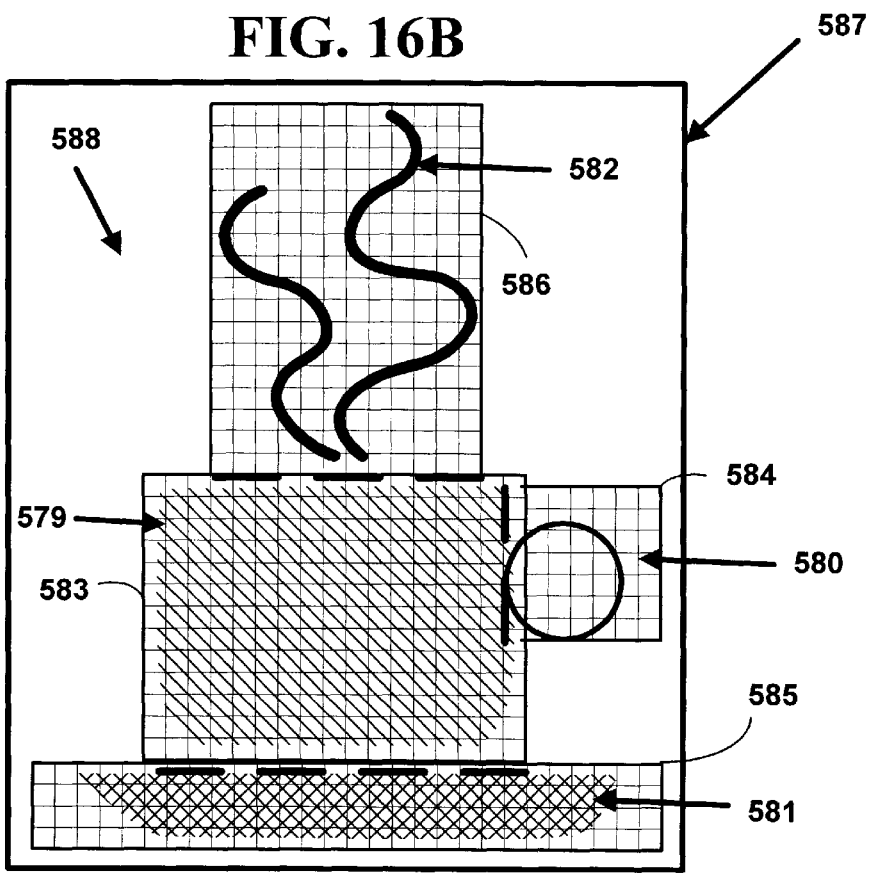

16B. FIG. 16B also illustrates how an object with complex geometries might be sub-divided.

Treating the "coffee cup" 574 as one simple object as is shown in FIG. 16A, the individual components (e.g. cup container, cup handle, saucer, fumes) of the object can be combined to create one large gsprite. In this case, a bounding box 576 would be drawn around the object to transform the object to screen space and create one large gsprite. The bounding box may be rotated, scaled, expanded or otherwise manipulated to create a gsprite which falls on 32×32 pixel boundaries in screen space. The gsprite is then divided into a number of 32×32 pixels chunks 578.

One way to divide a gsprite into chunks is to loop through all the geometry contained in the objects, and place the geometries into chunks. Another approach loops through the chunks recording all geometries which touch the chunk being considered. The illustrated embodiment uses the second approach, however the first and other approaches can also be used. As can be seen from FIG. 16A, a number of chunks will be empty (i.e. not be touched by any object geometries). These chunks can be ignored during rendering as will be explained below.

Now, treating the "coffee cup" as a complex object, the object is sub-divided into smaller object components which are processed to create a number of smaller gsprites as is shown in FIG. 16B. For example, the "coffee cup" object includes the cup container without the handle 579, the cup handle 580, the saucer 581 and the fumes 582 sub-objects. Each of these sub-objects would be enclosed by bounding boxes shown by 583–586 respectively to create four individual gsprites. The "coffee cup" including the four individual gsprites would also be enclosed by a enclosing bounding box as is shown by 587. Each of these bounding boxes may be rotated, scaled, expanded or otherwise transformed (e.g. affine transformed) to create a gsprite which falls on 32×32 pixel boundaries in screen space. Each individual gsprite is then divided into a number of 32×32 pixels chunks. The enclosing bounding box 587 is also divided into chunks and contains areas of empty chunks 588 which are ignored during rendering. However, chunks of the enclosing bounding box are not illustrated in FIG. 16B.

As a result of chunking, the graphics image is not rendered as a single frame, but is rendered as a sequence of chunks that are later aggregated to a frame or view space. Only objects within a single gsprite that intersect the 32×32 pixel chunk of the image currently being drawn are rendered. Chunking permits the frame and Z-buffer to be a small physical size in memory (i.e. occupy significantly less memory than in the traditional graphics systems described above), and achieve a high degree of utilization of the memory that is occupied, as well as increasing memory bandwidth. The small chunk size also allows more sophisticated rendering techniques to be used, techniques that could not be applied efficiently on large frame and Z-buffers.

Rendering of chunks is performed on the tiler. However, rendering could also be performed on other hardware components or using software. VLSI memory on the tiler chip is used to store the small chunks (32×32 pixel) of the frame currently being rendered. The on-chip VLSI memory is much faster and has a much larger memory bandwidth than external RAM. However, because of the chunking process, a large amount of memory to store the whole frame buffer and Z-buffer for the rendering process is no longer required. The internal memory within the tiler is used only to process the current chunk, and then it is re-used over and over for each subsequent chunk that is processed. As a result, the available internal memory is well utilized during the graphics rendering.

Using internal VLSI memory also eliminates pin driver delays that normally occur due to off chip communications as well as overhead associated with performing READ and WRITE operations to the large external memory required for conventional frame and Z-buffers. In addition, the small chunk size allows more sophisticated anti-aliasing (e.g. fragment buffers) and texturing schemes to be performed on the chunk than could be performed on a full frame and Z-buffer stored in a large amount of external memory because an entire 32×32 pixel chunk can be completely rendered in the illustrated embodiment before the next chunk is computed. The small chunk size also lends itself well to image compression techniques that will be described in more detail below.

After all intersecting polygons have been drawn into the chunk and the fragments resolved, the pixel data including color and opacity are compressed in the tiler chip and then moved to external memory.

Figure 17A:
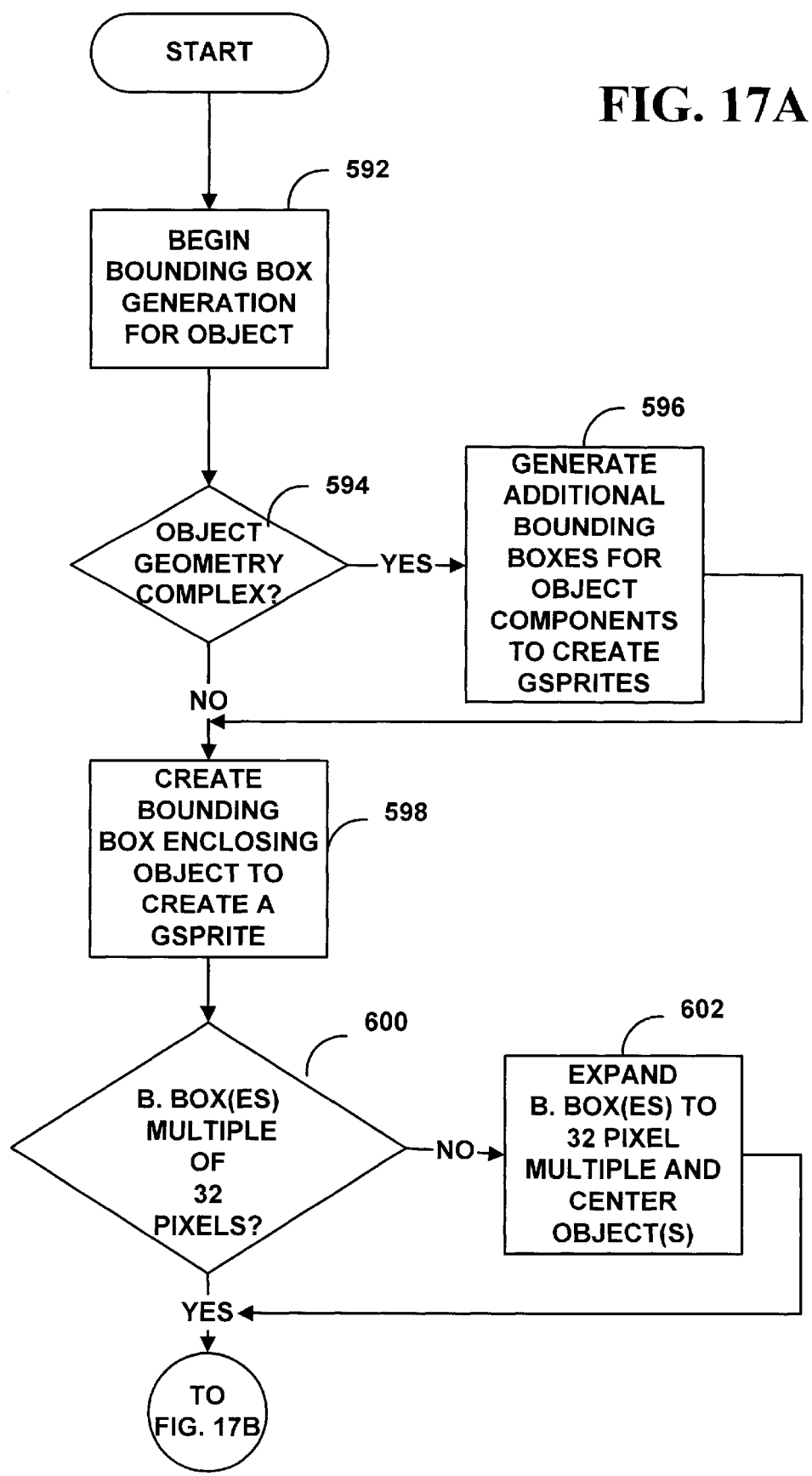
FIGS. 17A–B are flow diagrams illustrating aspects of chunking in an embodiment.
Figure 17B:
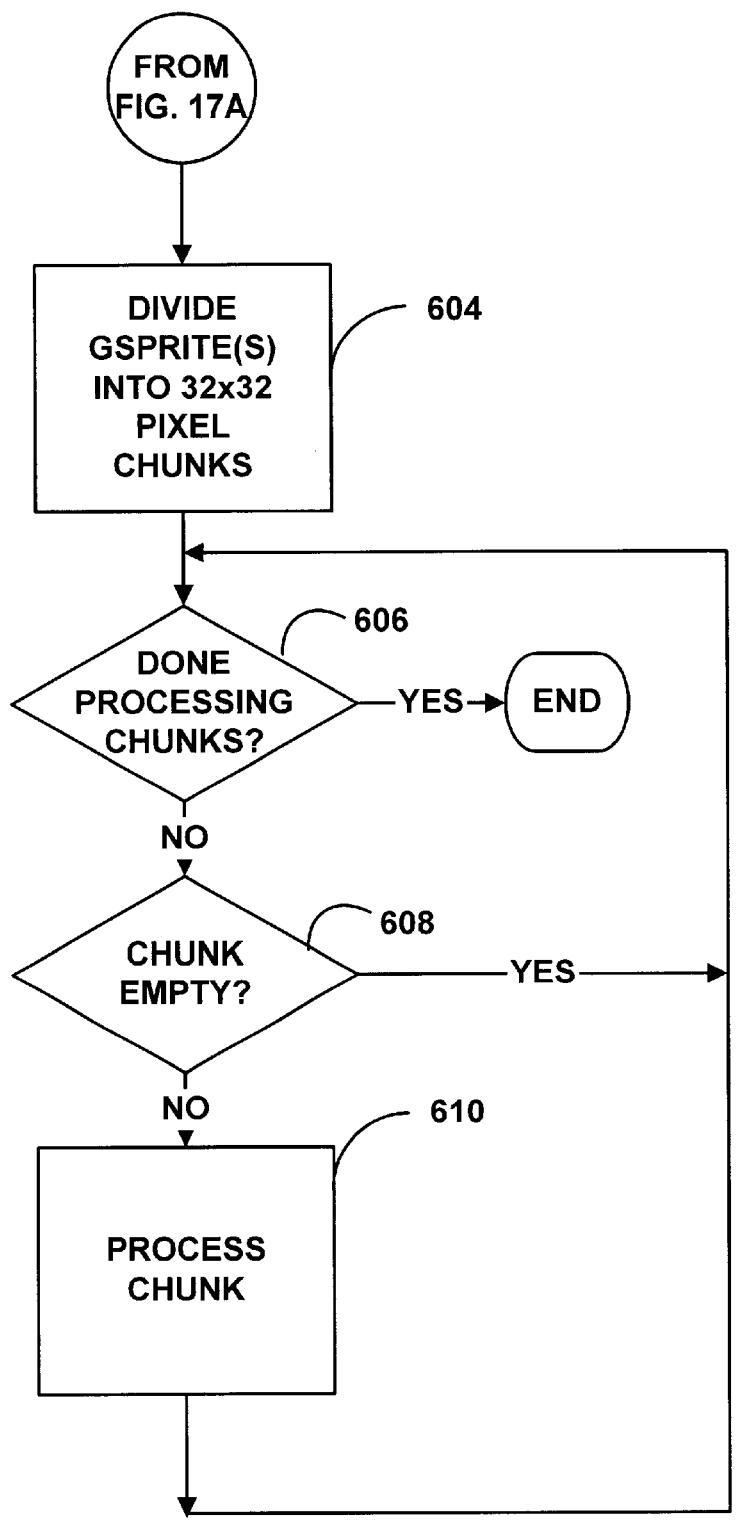

The flowcharts in FIGS. 17A and 17B show a high level overview of how a graphics scene is partitioned into chunks. First, one or more bounding boxes are generated for each object. (592) (FIG. 17A). If the object has complex geometry (e.g. finely tessellated, etc.) (594), then a number of bounding boxes are generated to enclose each of the object's complex components (to create a plurality of gsprites) (596). If the object geometry is not complex, then a single bounding box can be used to enclose the object and create a gsprite (598). However, if the object is complex, then the single bounding box will also enclose the plurality of bounding boxes that were created to enclose the object's complex components. If the bounding box or boxes are not an integer multiple of 32 pixels (600), then the bounding box(es) is/are expanded symmetrically in the X or Y directions (or both directions) to become an integer multiple of 32 pixels. The object (and object components if the geometry is complex) is/are then centered in the bounding box (602). This is illustrated by the gsprites shown in FIGS. 15B and 15C. The symmetric expansion is preferable, though not required, as it provides the best balance of processing between chunks in a single gsprite.

Returning again to FIG. 17, the gsprites are then divided into 32×32 pixel chunks (604) (FIG. 17B). As is apparent, these chunks are not at fixed locations in the view space, but are at addressable and variable locations depending upon the location of the chunked object. After dividing the gsprites into chunks, the chunks are processed. If the rendering of chunks is complete (606), the process ends. If the rendering of chunks is not complete, processing of the next chunk is started, after first examining to see if it is empty (608). If the chunk is empty, then it is not processed, and the next chunk is examined. If the chunk is not empty, then rendering (610) of the chunk continues in the tiler until all objects impinging on the chunk have been processed. This process continues until all chunks in each gsprite and all gsprites have been processed.

Gsprite sizes may be expressed as a percentage of the total screen area. Background gsprites will be quite large, but other components of the scene are usually quite a bit smaller than the total screen area. The performance of any chunking scheme used is sensitive to the screen space size of the primitives in the gsprites. As a result, it is necessary to properly regulate (e.g. queue) the object data input stream that is used to create the gsprites. Proper regulation of the object data input stream allows object processing to be completed at a higher bandwidth, and increases system throughput.

Our system uses a command stream cache to cache the object data input stream. The command stream cache can be used to cache the entire contents of a gsprite, and then iterate over every chunk and its associated geometries in the gsprite stored in the cache.

The cache can be also used for selective caching. For example, defining a threshold so that geometric primitives are automatically cached if they touch a certain number of chunks. If a cache is available, then virtual chunking can be done. In virtual chunking, a chunk bucket is created which corresponds to regions of N×M chunks with each region being a virtual chunk. Virtual chunking allows for adaptive sizing of the virtual chunks appropriate to the contents and the size of the geometry being processed.

Another use for the cache is modified scene graph caching. Instead of caching and referring to static portions of the scene, caching is done and dynamic portions of the scene are referred to through indirection. For example, suppose a gsprite contained a cuckoo clock with fairly complex geometries. The clock itself is quite complex, but the only moving parts are a bird, two doors, and two clock hands. Further, each of these geometries is rigid and unchanging. Thus, the rendering of the clock involves six static trees and six transformations (i.e. one for the clock, bird, 2 doors, and 2 clock hands). If the cache is large enough, the entire scene graph is transformed into a command stream. On rendering, the current transformations are patched over the cached command stream, and the resulting command stream is launched against all of the chunks in the gsprite. The patched portions of the command stream are the same size across all renderings. A more flexible approach is to insert a call command in the cached static scene graph. On rendering, the dynamic portions are written and cached to memory of varying sizes. Addresses of these dynamic portions are then patched into the associated call command in the static command stream. This approach is more flexible since the size of the dynamic command can vary from rendering to rendering. Thus, the effect of this approach is a memory-cached callback approach. In the case of the cuckoo clock, it would mean writing six transformations, and possibly a callback for the bird geometry so that it could be empty if the doors are closed. This approach is extremely compact with respect to bus bandwidth and lends itself to quick, directed traversal of the scene graph.

Even though the cache memory is limited, some geometries or attributes may remain cached across many renderings. For example, in a car racing game, caching a car body geometry would result in a significant overall savings across renderings. Likewise, common attribute states (or sub-states) could be reused across many gsprites or rendering of a single gsprite. As was just described, using a cache within a chunking scheme can result in some significant time savings. However, adequate chunking performance might also achieved without the command stream cache by generating a command stream on the fly for each touched chunk in the gsprite.

In the implementation of the tiler shown in FIGS. 9A–9C, chunks are used sequentially to render an entire frame on one processor, rather than using multiple simultaneous chunks on parallel processors to share the computational load. Although less preferred, a combination of serial and parallel processing of chunks could also be used. Using a completely parallel processing implementation of chunks, an object moving across the screen would necessarily require constant chunking operations as it moved across the screen. However, in the illustrated embodiment of the invention, because of the serial processing of chunks, an object can be fixed at the chunk boundaries in a gsprite and thus NOT require chunking as the object moved across the screen. The parallel processing rendering of chunks also does not allow sophisticated anti-aliasing and texturing schemes to be applied to individual chunks as is the case for serial rendering of chunks. The chunk size and sequential rendering is very valuable for image compression techniques since an entire 32×32 pixel chunk is rendered before the next chunk is computed, and thus can be compressed immediately.

The purpose of image compression is to represent images with less data in order to save storage costs and/or transmission time and costs. The less data required to represent an image the better, provided the image can be reconstructed in an adequate manner. The most effective compression is achieved by approximating the original image rather than reproducing it exactly. The greater the compression, the more of an approximation ("lossy compression") the final image is going to be.

The process of chunking is itself a compression technique. Objects are approximated with one or more gsprites which in turn are created from number of 32×32 pixel chunks. The actual object is approximated with gsprites and reconstructed from rendered gsprites. The reconstruction of the original object depends on how effectively the object was approximated by dividing it into gsprites and then chunking it (e.g. using the complex object geometry division techniques described above).

The individual 32×32 chunks are also compressed using image compression techniques. A compressed 32×32 pixel chunk takes up less space in the small amount of internal memory available. The 32×32 pixel chunks can be broken down into sixteen 8×8 pixel chunks which is the size commonly used in image compression techniques that employ discrete cosine transformations (DCT).

In one implementation, the compression and decompression engines on the tiler and the decompression engine on the gsprite engine support both lossy and lossless forms of compression/decompression. The lossy form includes a lossless color transform from RGB to YUV, a DCT, uniform or perceptual quantization, and entropy coding (Run length and Huffman coding). The lossless form includes a color transform from RGB to YUV, a prediction stage, and entropy coding as performed in the lossy form.

In order to dramatically reduce memory requirements to process graphics images using chunking, a small Z-buffer (e.g., about 4 kilobytes (kb) is used in the illustrated embodiment. Specifically, the z-buffer in this implementation is slightly less than 4 kb (1024×26), but the number of bits of precision can vary. However, a Z-buffer of other larger or smaller sizes could also be used. Using a small 4 kb Z-buffer allows only 1024 pixels to be Z-buffer rendered at any one time. In order to render scenes (e.g. scenes composed of gsprites) of arbitrary size using a 4 kb Z-buffer, the scene is broken up into chunks of 32×32 pixels in size (there are usually several gsprites in a scene, but each gsprite is broken into chunks). In this scheme, the image pre-processor sends the appropriate geometry to each chunk in a gsprite to be Z-buffer rendered.

Figure 18A:
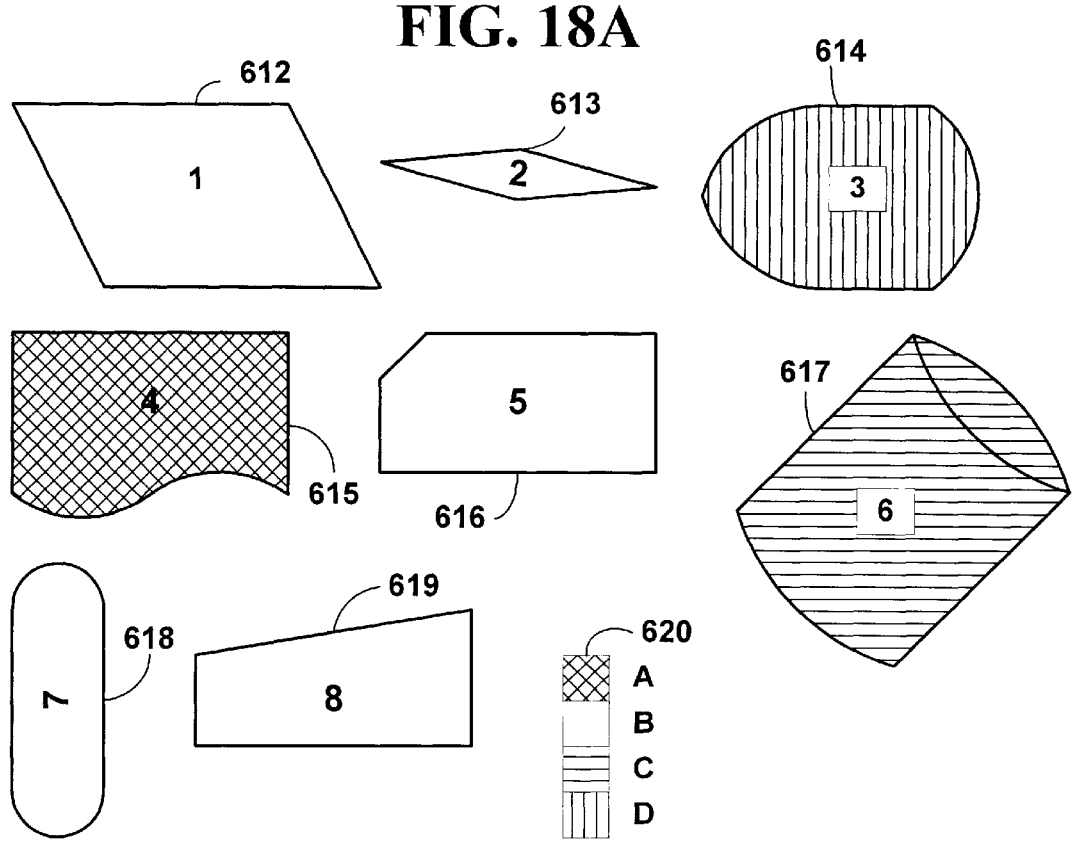
FIGS. 18A–B are diagrams illustrating aspects of chunking in an embodiment.
Figure 18B:
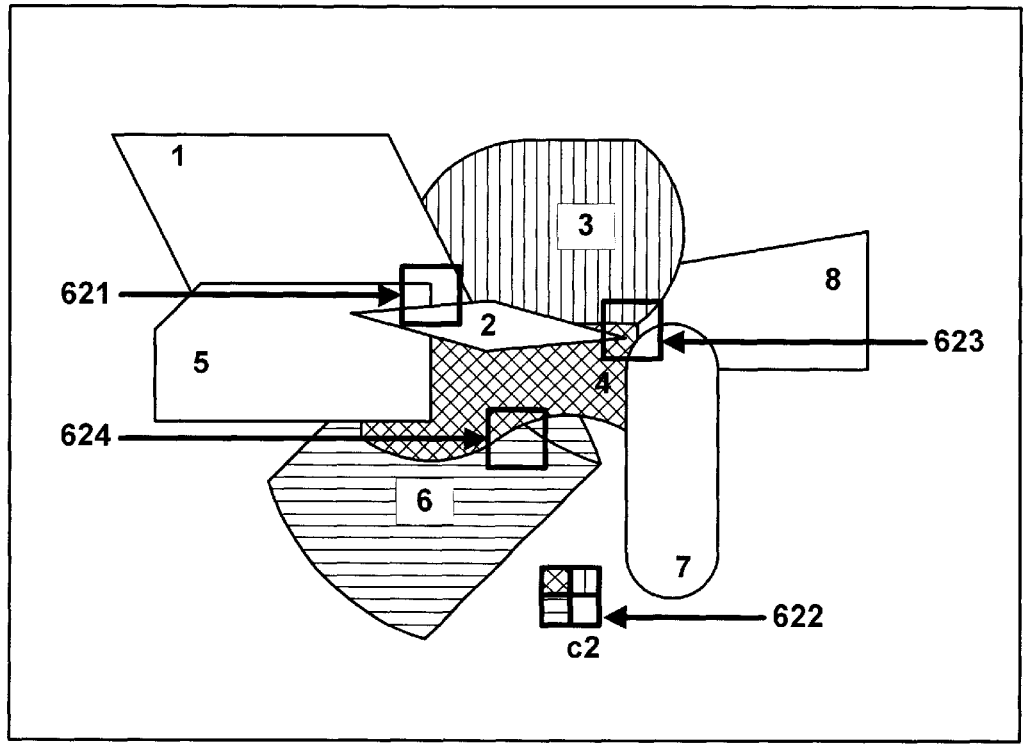
Figure 19A:
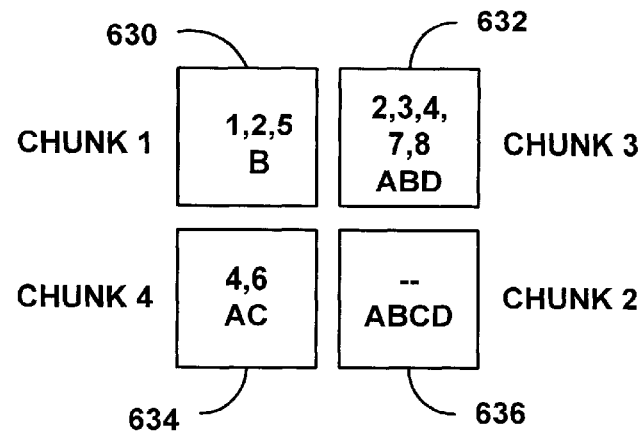
FIGS. 19A–B are diagrams illustrating aspects chunking in an embodiment.
Figure 19B:
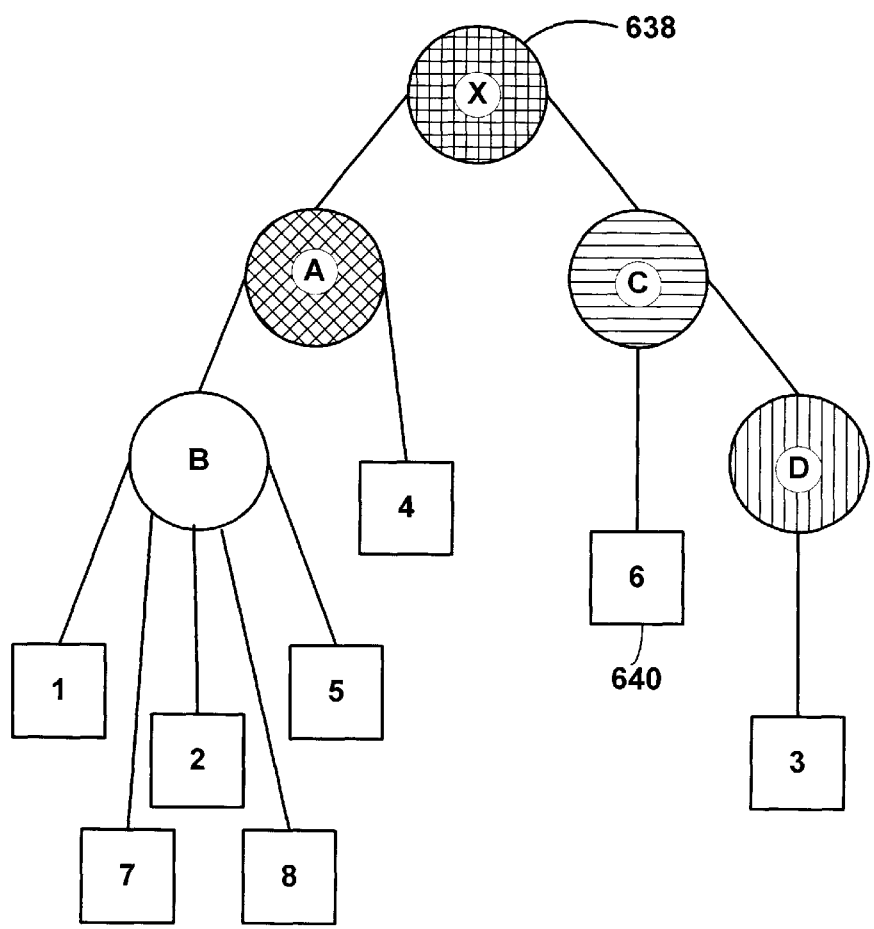

As an example of how chunking works, consider the eight objects and their associated geometries shown in FIG. 18A. For simplicity the eight objects 612–619 are defined by a single attribute 620 (e.g. color) which can have one of four values A–D. The eight objects are then overlapped in a graphics scene as is shown in FIG. 18B. Ignoring individual gsprites and their creation, but concentrating instead on four isolated chunks for the purposes of illustration, the four isolated chunks 621–624 are shown in FIG. 18B. The four isolated chunks 621–624 (FIG. 18B) are touched by geometries 1–8, and attributes A–D as is illustrated in FIG. 19A. Chunk 1 630 (FIG. 19A) is touched by geometries 1, 2, and 5 and attribute B, chunk 2 639 is touched by no geometries and attributes A–D, chunk 3 632 is touched by geometries 2, 4, 7, and 8, and attributes A, B, D, and chunk 4 634 is touched by geometries 4 and 6 and attributes A, C. An example of a partial scene graph built by image preprocessing (using the chunks shown in FIGS. 18B and 19A) is shown in FIG. 19B. The attributes (e.g. color, etc. shown by A–D, X) of each chunk are shown as circles 638, and the geometry (e.g. of the various shapes, shown by 1–8) is shown as squares 640. The letter X denotes the default value for an attribute. The intermediate nodes contain attribute operations to apply to the primitive geometry. The leaf nodes in the scene graph contain primitive geometry which are to be applied to the chunks, and may also contain bounding volumes around the geometry the chunks describe (leaf nodes with bounding volumes will be described below).

One approach for a chunking scheme is to iterate over every chunk and send the full geometry each time. Another more optimal approach is to send only geometry that is visible in the current chunk (note that the optimal case also skips geometry that is obscured or otherwise invisible). The actual method used in our system to chunk a gsprite in 32×32 pixel block falls between these two extremes and is called Bucket-Chunking. However, other schemes which fall at or between the two extremes may also be used to create chunks for a chunking scheme.

The Bucket Chunking scheme consists of two passes. The first pass traverses the scene graph while maintaining the current transform to view space with the goal of building up a descriptive command stream for each chunk in the view space. The view space is broken up into N×M chunk buckets, which in the end will each contain a list of the geometries that fall across the corresponding chunk. When a geometry-primitive node is encountered, the current transform is applied to the bounding volume to yield a 2-D "footprint" on the view space. For each chunk touched by the footprint, the geometry (and accumulated attribute state) is added to the corresponding bucket. At the completion of this first pass, each bucket will contain the necessary data to render the corresponding chunk. Note that this chunking scheme is sensitive to the quality of the calculated footprint—a loose bound on the object will yield a larger footprint, and hence will hit chunks not touched by the enclosed geometry. A tight bound on the object will yield a smaller footprint, and will hit most chunks touched by the enclosed geometry.

As an example of the first pass, consider a sub-set of four chunks which contain overlapping objects described by geometries 1–8, and attributes A–D, X shown in FIG. 19A. One approach for traversing the scene graph in pass one is to maintain the current state for each chunk, and then skip the geometry that does not fall inside a given chunk. This ensures that the attribute context for every geometry in every chunk is up to date. Using this approach on the scene graph in FIG. 19B gives the following command streams in the chunk buckets after pass one:

Chunk 1 Bucket: X, A, B, 1, 2, 5, A, X, C, D, C, X
Chunk 2 Bucket: X, A, B, A, X, C, D, C, X
Chunk 3 Bucket: X, A, B, 2, 7, 8, A, 4, X, D, 3, C, X
Chunk 4 Bucket: X, A, B, A, 4, X, C, 6, D, C, X Another approach is to retain the current attribute state, and send the state prior to sending each accepted geometry. This results in the following command streams in the chunk buckets:

Chunk 1 Bucket: B, 1, B, 2, B, 5
Chunk 2 Bucket: <empty>
Chunk 3 Bucket: B, 2, B, 7, B, 8, A, 4, D, 3
Chunk 4 Bucket: A, 4, C, 6

The second approach is an improvement over the first approach. Note that the attribute B is specified a second and third unnecessary time before geometries 2 and 5. This behavior is also manifested in chunk 3 for B for geometries 7 and 8. In reality, the situation is worse than portrayed here, because a dump of the current attribute state means that each and every attribute will be re-specified for each geometry. In other words, even if the texture transformation matrix is invariant for the whole scene graph, it will still be sent prior to each and every geometry in every chunk.

Therefore, this particular approach addresses attribute maintenance for overriding attributes and for composing attributes instead. Diffuse color is an overriding attribute. As is defined by the image pre-processor (e.g. image pre-processing software e.g. running on the image preprocessor 24, etc.) which produces the scene graph, attributes applied to red(blue(cube)) will result in a red cube. This is in contrast to other image pre-processor graphics interfaces that bind the closest attribute to the object. Binding the closest attribute to the object for red(blue(cube)) would result in a blue cube.

Using the outermost attribute as an overriding attribute greatly simplifies attribute maintenance for attributes. During scene graph traversal, once you hit an attribute node, you can ignore all nodes of that attribute type below it in the scene graph, since the top most attribute overrides them all.

A local transformation is a composing attribute. Thus, the current value is defined by the previous value and the new value. The composing attribute requires some sort of stack as the scene graph is traversed to store previous values.

The Bucket Chunking scheme uses the following structures:

The attribute node, which contains the current value.
The traversal context. This is a structure that contains, for every overriding attribute, a pointer to the current attribute value.
A grid of buckets, each of which contains a command-stream buffer and a bucket context structure of the same type as the global traversal context.
A list of default attribute values, each of which can be referred to by the traversal context.

For initialization, the context is placed in the default state, so that all attributes refer to the default context. Default values are loaded lazily, rather than dumped en masse prior to sending the rendering commands for each chunk.

Initialize Attribute Maintenance:
    for each attribute: attr
        for each bucket: bucket
            bucket.context(attr)←nil//Clear context for each bucket
        end
        context[attr]←default[attr]//Initialize to default values end The following dictates how to process a given attribute node:

Process Attribute:
if context[attr]≠default[attr]
    ProcessGeom()//Attr already set, ignore subsequent value.
else context[attr]←SetAttr (attr,value)//Set to new value.
ProcessGeom()
context[attr]←SetAttr (attr,default[attr])
endif The process for handling geometry nodes synchronizes the current traversal state with the attribute states of each bucket:

Process Geometry:
   geomcommand ←ConvertGeometry (geom)//Convert to Command Stream.
   for each touched bucket: bucket
     for each attribute: attr
       if (bucket.context(attr)≠context(attr)
         bucket.context (attr)←context (attr)
         append (bucket, context(attr))
       endif
     end
     append (bucket, geomcommand)
   end Composing attributes work in a similar manner to the overriding ones, with the exception that a stack is maintained during traversal. This is accomplished by using the nodes for the storage of the stack values. This method requires the following structures:

The current attribute node, which contains the composition of the previous values with the new value.

The traversal context. This is a structure that contains, for every composing attribute, a pointer to the current attribute node.

A list of default attribute values, each of which can be referred to by the traversal context.

A grid of buckets, each of which contains a command-stream buffer and a bucket context structure of the same type as the global traversal context.

The initialization for composing attributes looks the same as for overriding attributes:

Initialize Attribute Maintenance:
   for each attribute: attr
     for each bucket: bucket
       bucket.context(attr)←nil//Clear context for each bucket end
       context[attr]←default[attr]//Initialize to default values end Processing a composing attribute node involves the composition of the new value with all values prior to the current node in the traversal. Note that in order to implement a stack of values, the prior value must be saved and restored.

Process Attribute:
   node.ComposedValue←Compose (context[attr], node.Value)
   SavePtr←context[attr]//Save previous composed value.
   context[attr]←node
   ProcessGeom()
   context[attr]←SavePtr//Restore the previous composed value.

The geometry-handler is identical to the overriding attribute case:

Process Geometry:
   geomcommand←ConvertGeometry (geom)//Convert to Command Stream.
   for each touched bucket: bucket
     for each attribute: attr
       if (bucket.context(attr)≠context(attr)
         bucket.context(attr)←context(attr)
         append (bucket, context(attr))
       endif
     end
     append (bucket, geomCommand)
   end The second pass of the Bucket Chunking scheme iterates over the grid of buckets and spits out the corresponding command stream. For every non-empty bucket, the corresponding chunk is rendered from the information stored in that bucket. Note that there may be empty buckets in the scene, which means that not every chunk in the gsprite must be rendered. For most active gsprites, which will consist of an opaque object on a transparent background, a good number of chunks should be empty.

The approach to maintaining attribute state described above is particularly well suited for rendering geometry in a chunked fashion. Chunking causes sets of geometry to be rendered in a different order than was originally specified. For instance, in rendering a chunk, the rendering system skips geometric sets that do not intersect with the chunk. Therefore, at the lower level of chunked geometric rendering, at most two levels of state should be maintained: 1) a global state in a format compatible with the tiler or alternative rendering hardware to allow rendering of the geometry; and 2) small state overlays within a set of geometry that apply only to that set of geometry. With this approach, each set of geometry can be rendered independently of any other, and rendering a set of geometry can be considered side-effect free.

An alternative approach to chunking uses hierarchical bounding volumes in the scene graph. If a footprint for a hierarchical bounding volume falls entirely within a chunk, then there is no need to descend any deeper into the scene graph from that point; all geometry under that node can be placed in the chunk bucket. Another variation on this bounding volume approach is to stop descent when the footprint falls over no more than N chunks, where N is some arbitrary number of minimum chunks. This approach effectively loosens the bounding volumes in exchange for more abbreviated first pass times.

A number of other chunking schemes can also be used instead of Bucket Chunking. For example, an accelerated front end loading scheme and/or an image space recursive scheme could also be used as a chunking scheme. These two alternative chunking schemes are described below.

In another embodiment for chunking using accelerated front end loading, overhead associated with breaking a gsprite into chunks can be eliminated if it is exactly known which chunks fall into which part of the scene graph. A set of active bounding boxes and primitives that are relevant to the chunk are maintained, and only this set is sent for testing.

There are three structures used in the display scheme as well as a bitmap used to construct these structures. The three structures are an active set, insert vector, and a delete vector. Every bounding box and geometry primitive has a unique index in the hierarchical bounding volume (HBV) tree, and the chunks being rendered are ordered in the tree. Although this scheme is actually independent of chunk ordering, a scan is done from left-to-right, top-to-bottom (LRTB). Since the choices made interact with ordering of the gsprite chunks, space filling curves other than LRTB can also be used.

The active set is a set of bounding boxes and primitives to send the current chunk. This set contains every bounding box touching a chunk and every primitive touching the current chunk not enclosed by a bounding box in the set. The data structure used for this set allows fast insertion, deletion, as well as fast enumeration. Given the fact that there will be only so many top level bounding boxes of interest to a gsprite, the data structure is implemented as a simple bitmask. The incidence bitmap is a single 32×32 table of bits that corresponds to a gsprite size of 1024×1024 pixels.

The insert vector and delete vector are vectors each containing a list of bounding boxes and primitives to be inserted or deleted from the active set. Each of these vectors is indexed by the chunk ordinal. The incidence bitmap is a N×M bitmap that represents a gsprite, each pixel of the incidence bitmap represents one chunk of the gsprite. If max(N, M) is greater than 32, then the bitmap must be broken up into 32×32 pixel chunks.

To construct the insert and delete vectors, the top of the HBV tree is then traversed. For each object encountered, an incidence bitmap is constructed. The incidence bitmap is then scanned to determine where it should be included in the insert and delete vectors. Once a bounding box lies totally inside one chunk, its contents do not have to be opened or its contents tested for incidence. Since a bounding box may straddle a chunk boundary (or a chunk corner), bounding boxes are no longer opened when they are smaller then 2×2 pixels on the incidence map.

To compute the incidence map for a single bounding box or primitive, the view is set so that each pixel corresponds to a gsprite chunk. The bounding box is then rendered, and the incidence mask is retrieved through the feedback channel as well as the level-of-detail which describes how many pixels are covered by the bounding box.

The incidence bitmap is then scanned to determine what entries belong in the insert and delete vectors. One method is to scan the incidence bitmap in chunk order and insert or delete whenever an edge transition occurs. This is not a very practical method if the gap between insert and delete is small. Another method is to insert on the first pixel touched and delete on the last pixel touched. A third method is to look at a sliding window and delete if the primitive falls out of the sliding window. Pseudocode for constructing the insert and delete vectors is shown below.

```
Push(TOPBOX, &BoxStack)
DO
    pop(Bbox, &BoxStack) //pop a bounding box off the box stack
    renderBbox(Bbox, &IncidenceMap, &pixelcoverage)
    //render the bounding box using the incidence map and pixel
    coverage map
    IF pixelcoverage>4 and not primitive THEN
        push(children_of_Bbox, &Boxstack)
    ELSE
        scanIncidenceMap(IncidenceMap, &InsertVector,
            &DeleteVector) // add entries to the insert and delete
            vectors
    FI
    IF empty(BoxStack) THEN BREAK FI
OD
/
```

To display a gsprite, the display scheme steps through the gsprite chunks in order. At each transition the insert and delete vectors are used to determine which bounding boxes and primitives are to be updated in the active set. The active set is then sent down to the hardware in the manner of the hierarchical occlusion scheme. The pseudocode for the display scheme is shown below.

```
Initialize ActiveSet to EMPTY
DO {i=each chunk}
    insertListIntoSet (InsertVec[i], ActiveSet)
    deleteListFromSet (DeleteVec[i], ActiveSet)
    occlusionTestRender(ActiveSet)
OD
```

In yet another embodiment for chunking using image space recursion, the chunking scheme used is based on the observation that off-chunk culling can avoid a lot of redundant tests by carefully choosing a traversal order, and culling geometry progressively during traversal. For example, projected sub-geometry culled away for being entirely to the right of a chunk C should not be considered by chunks to the left of C. This is an image-space recursive subdivision scheme which makes improvements on the recursive HSR (Height-Space Recursive) scheme know in the art.

A chunk is progressively subdivided into N×M chunk subregions. At each step, sub-geometry not overlapping the subregion is culled away. If the region is in a single chunk, Z-buffered rendering with occlusion tests is invoked. Otherwise, if the region is not a single chunk, divide the region along X or Y (whichever is larger) into two regions and recursively process them. Pseudocode to accomplish this chunking scheme is shown below.

```
Render (geoset, reg)=
    let geoset'=subset(geoset, reg) in
        if single_chunk(reg)
            then Z-buffer_render(geoset', reg)
        else
            let reg1, reg2,=split(reg) in
            render(geoset', reg1)
            render(geoset', reg2)
```

Since each subregion has only one edge that its parent did not have, the subset function should only test against one edge instead of four. If the entire gsprite region is culled before invoking the scheme recursively, this property can be utilized. The rendering scheme shown above can be improved by: (a) replacing the abstract region type by four integers specifying minimum and maximum chunk coordinates; (b) making the region split operation explicit; and (c) doing the geometry subsetting just before making the recursive calls. The improved rendering scheme is shown below.

```
render=(geoset, xmin, xmax, ymin, ymax)=
    if xmin==xmax && ymin==ymax
        then Z-buffer_render(geoset, xmin, ymin)
    else if xmax−xmin>ymax−ymin
        then
            let xmid=xmin+floor((xmax−xmin)/2),
            gs1, gs2=xsplit(geoset, xmid) in
            render(gs1, xmin, xmid, ymin, ymax);
        render(gs2, xmid+1, xmax, ymin, ymax)
    else
        let ymid=ymin+floor ((ymax−ymin)/2),
        gs1, gs2=ysplit(geoset,ymid) in
        render(gs1, xmin, xmax, ymin, ymid);
        render(gs2, xmin, xmax, ymid+1, ymax);
```

To partition objects for chunking, the representation of the geometry (geoset) shown above is important. The geoset is represented by a collection of triples of the form <geometry, transform, bzim>, where bzim is a gsprite coordinate 3-D bounding region. The partitioning functions are implemented by testing each bzim against the new edge. If fully inside one or the other, the triple is placed in geometry set 1 (gs1) or geometry set 2 (gs2) accordingly. If overlapping, decompose the geometry into new triples, composing transforms, and applying the region edge test recursively, until the geometry or bzim falls within a defined stopping criteria, at which point the triple is placed into both gs1 and gs2.

Pseudocode to accomplish this partitioning geometry is shown below.

```
xsplit(empty, xmid, gs1, gs2)=gs1, gs2
xsplit(insert(<g, xf, bzim>, rest), xmid, gs1, gs2)=
if xmax(bzim)<(xmid+1)*CHUNK_WIDTH
   then xsplit(rest, xmid, insert (<g, xf, bzim>, gs1), gs2)
else if xmin(bzim)>=(xmid+1)*CHUNK_WIDTH
   then xsplit(rest, xmid, gs1, insert(<g, xf, bzim>, gs2))
else if stop_splitting(<g, xf, bzim>)
   then xsplit(rest, xmid, insert(<g, xf, bzim>, gs1),
       insert(<g, xf, bzim, gs2))
else
   let gs1'gs2'=xsplit(decompose(<g, xf, bzim>), xmid,
       gs1, gs2) in
       xsplit(rest, xmid, gs1', gs2')
```

The geosets are sorted by minz(bizm) at each stage to avoid redundant sorting in Z-buffer_render.

As has been shown above, a number of different schemes can be used for the chunking process. In one preferred embodiment, the DSP is programmed to perform the chunking scheme. The chunking scheme can also be performed by the host processor. Any of the chunking schemes described above could also be implemented in software, or a combination of hardware and software.

Image Compression

As was described above, the chunk size and sequential rendering is very valuable for image compression techniques since an entire 32×32 pixel chunk is completely rendered before the next chunk is computed, and thus can be compressed immediately. The tiler supports a lossy and lossless form of compression to compress chunks. Both the lossy and lossless form of compression compress chunks in independent blocks of 8×8 pixels, so each compressed 32×32 pixel chunk would consist of 16 such compressed blocks.

Compression of images allows much smaller memory size requirements and vastly reduced memory bandwidth requirements. The design uses a combination of caching, pre-fetch strategies, as well as chunking to reduce the latencies and overhead due to compression and block access. Since the entire image is computed in a 32×32 pixel buffer, gsprite image compression is achieved with minimal overhead. The overall conceptual design of the compression architecture is shown in FIG. 20.

The transformation engine 660 (FIG. 20) calculates model and viewing transformations, clipping, lighting, etc. and passes this information to the tiler 662. As the tiler processes transformation information, it reads texture data from texture memory 664. The texture data is stored in a compressed format, so as the texture blocks are needed, they are decompressed by the tiler decompression engine 666 and cached in an on-chip texture cache on the tiler. As the tiler resolves pixel data it transfers the resolved data to the tiler compression engine 668 which compresses the resolved data and stores the compressed data in gsprite memory 670. When the gsprite engine 672 needs the compressed gsprite data, it uses the gsprite decompression engine 674 to decompress the gsprite data from gsprite memory 664 and cache the data on an on-chip gsprite cache. In the actual hardware, the texture memory 664 and gsprite memory 670 are identical (i.e. the compressed data is stored in one memory shared by the various engines). Common shared memory is not required as long as the compression and decompression methods used are compatible. The gsprite data can also be taken from a data base or some other image source 676 and saved in the texture memory 664 and the gsprite memory 670.

Figure 20:
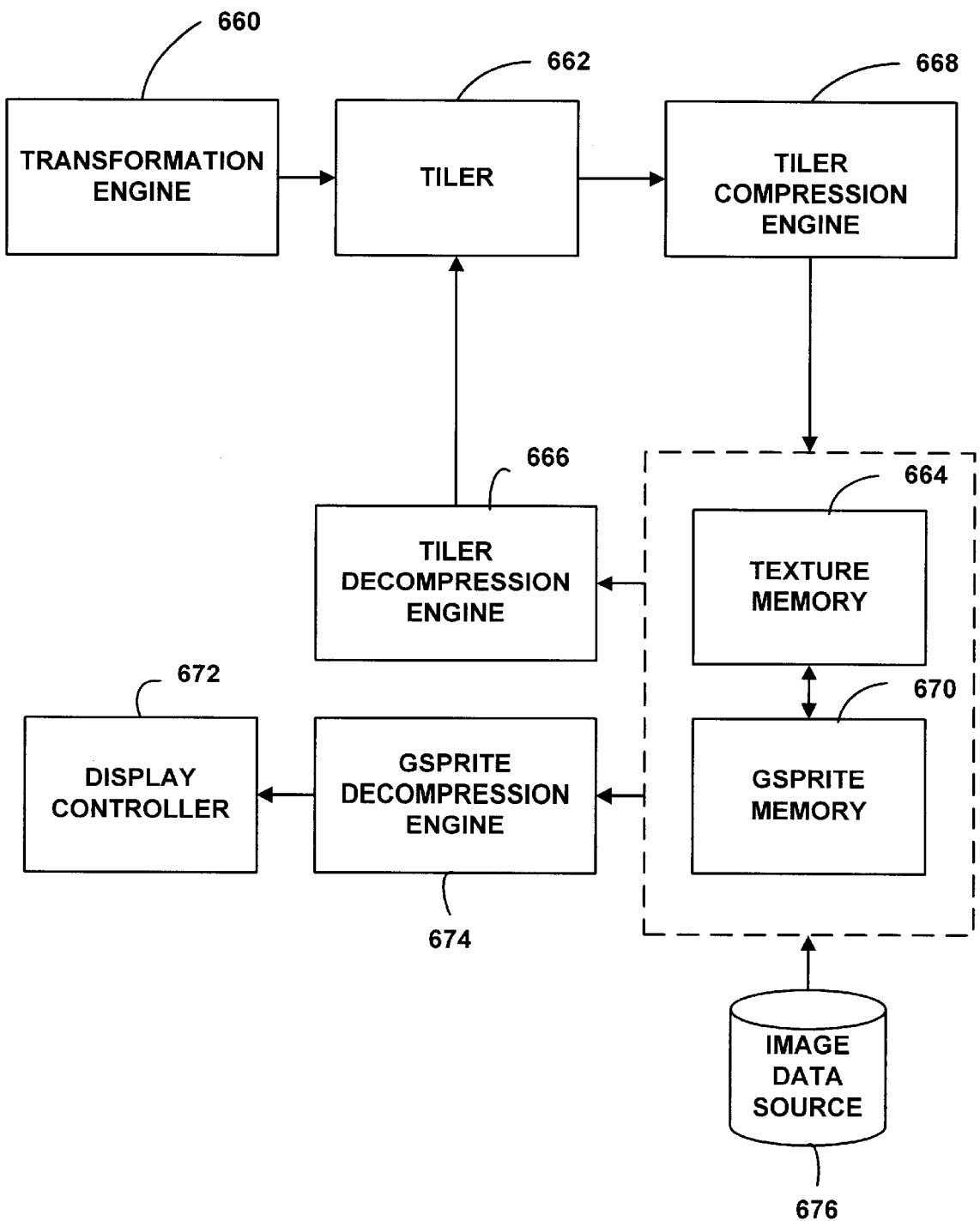
FIG. 20 is a block diagram illustrating image compression in an embodiment.

The architecture in FIG. 20 performs still image compression on textures and gsprites to reduce the memory size and bandwidth required for graphics rendering operations. The compression method implemented in this architecture includes both a lossy and lossless mode. The lossy mode employs a Discrete Cosine Transform (DCT) and quantization followed by entropy coding to compress pixel blocks. The lossless mode includes a prediction stage and entropy coding.

The compression method compresses and decompresses blocks of an image (8×8 pixels) individually and independently. Like the JPEG standard, the compression method performs still image compression on 8×8 pixel blocks. However, this compression method supports better random and localized access to individual blocks than JPEG provides. In one implementation of this method for a chunking architecture, a chunk control block stores pointers to each of the blocks within a chunk. To access a pixel, the decompression method locates the pixel by computing the pointer to the block that contains it and then fetches and decompresses this single block. This method minimizes processing required to access a pixel without sacrificing compression ratio. Moreover, the method reduces memory bandwidth required to access a pixel since only a single block has to be fetched.

To access a single pixel in JPEG, each block preceding the block containing a desired pixel must be partially decompressed. JPEG has no support for selectively decoding a single block containing the desired pixel. In particular, the DC coefficients for each pixel block in JPEG depend on the DC coefficients of other blocks, which also prevents random, localized access to individual blocks. In this compression method, the DC coefficients are stored independently for each block. The DC coefficients are not quantized.

Both the lossy and lossless modes of compression compress alpha components as well as color components (RGB or YUV). In contrast, the well-known JPEG standard does not support compression/decompression of an alpha channel.

Another advantage of the compression method is that it provides the ability to vary the compression ratio to trade off memory bandwidth and capacity for image quality. As explained further below, this method supports uniform and perceptual quantization to vary the compression ratio. It also supports LOD filtering, which reduces the magnitude of selected high frequency components. These methods for varying the compression ratio can be controlled within an image. For example in one implementation described further below, the compression ratio can vary from one sub-region (e.g. 32×32 chunk) to the next, from one block to the next, and per frequency component. Varying compression ratio per chunk or block enables parts of an image to be compressed at a higher ratio than other parts. In addition, it supports rate control in which compression ratio can be increased as an image is being compressed based on memory usage.

The compression engine can select to store a block in compressed or uncompressed form. This is particularly important in cases where the actual size of a compressed block is larger than its uncompressed size. In addition, the compression engine can switch between lossy and lossless compression on a block by block basis. Yet another advantage of this method is that it can be implemented with low complexity. A number of features contribute to the low complexity of the compression method. First, the color space conversion for both the lossy and lossless methods have low complexity because of the specific selection of constants and multipliers to minimize complexity. Second, the quantization in the lossy method is implemented with low 10 complexity.

One implementation of the lossy method uses quantization indicies (QIndices) which map to quantization factors (QFactors) in a table to support quantization with low complexity. The QIndex is small relative to the number of bits to store QFactors and can be manipulated easily to vary the compression ratio per block or per frequency component. In addition, the quantization factors are selected for low complexity (e.g. can be implemented with few shifts and adds). The advantages associated with low complexity improve both hardware and software implementations: in hardware, the implementation requires fewer gates and occupies less chip area; and in software, the implementation is faster and has fewer operations.

Another advantage to this compression method is that it can be implemented with low latency. One implementation of the decompression engine employs an offset to component data (Y,U,V, Alpha) in a block so that it can decompress color and alpha components in the block in parallel.

While a number of advantages are outlined here, additional advantages are noted below or are apparent from the description of the implementation. The compression methods are described in the context of the compression architecture of FIG. 20, but it is important to note that these methods can apply to other architectures as well including both software and hardware systems, compression and decompression of textures, compression and decompression of sprites, etc. The compression and decompression methods described below are implemented in the compression and decompression engines in (FIGS. 9A–C) of the tiler. Similarly, the decompression method is implemented in the decompression engine of the gsprite engine (FIGS. 12A and 12B). However, these methods can be implemented in other architectures as well.

One implementation of the compression method supports both lossy and lossless compression. The lossy form of image compression has two stages: a lossy first stage, and a lossless second stage. The lossy form of compression begins with an optional color space conversion from red, green, blue (R, G, B) intensity values to luminance (Y) and chrominance (U and V, also referred to as Cr and Cb) values. The lossy stage includes a direct cosine transform (DCT) and a quantization that reduces the accuracy of certain frequency components.

The second stage is a lossless form of compression comprising Huffman coding and run length encoding (RLE). Alternative coding methods such as arithmetic coding can be used in place of Huffman coding.

Decompression for the lossy method includes a decoding stage, a dequantization of the compressed data, an inverse DCT, and an optional color space conversion from YUV to RGB.

The lossless form of compression includes an optional lossless color space conversion from RGB to YUV, a prediction stage, and a lossless encoding stage. This encoding stage can be identical to the entropy coding stage in the lossy form of compression. Decompression for this lossless method comprises a decoding stage, an inverse prediction step on each color component, and an optional color space conversion from YUV to RGB.

Implementation of Lossy Compression/Decompression

Figure 21:
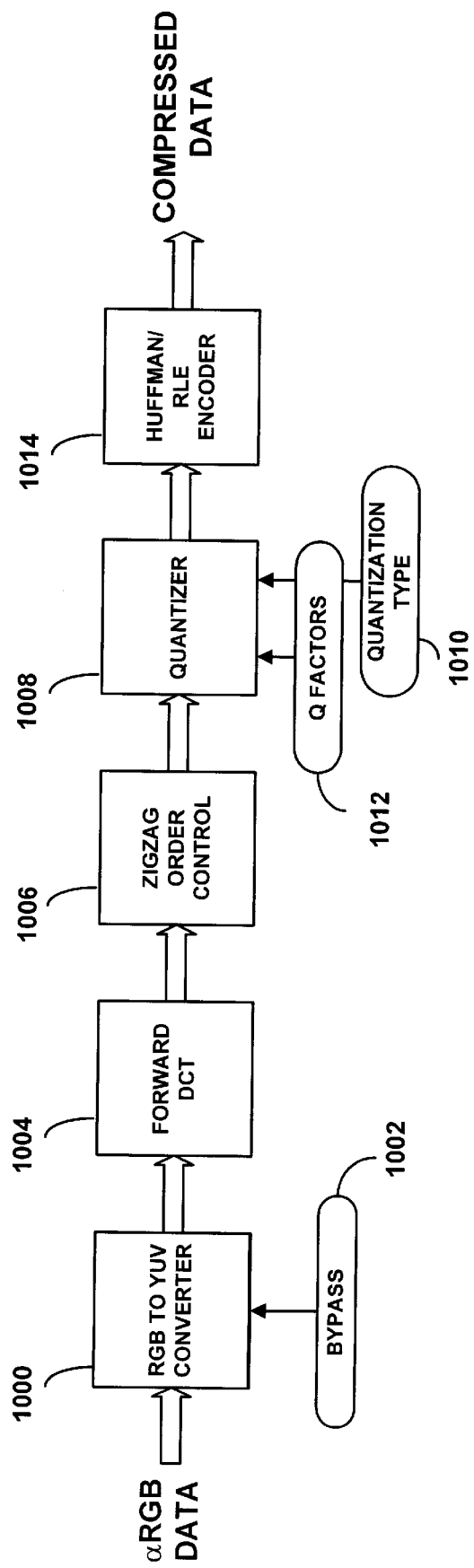
FIG. 21 is a diagram illustrating an implementation of a lossy compression method.

FIG. 21 illustrates an implementation of the lossy compression method. As shown, this method occurs in four or five steps, depending on whether the color space conversion is bypassed. The compression method includes the following 4 or five steps:

1. Convert the RGB data input to a YUV-like luminance-chrominance system (optional). (1000). The compression engine bypasses the color space converter 1000 if a Bypass Color Space Control flag (1002) is set in the chunk control block.
2. Perform a forward, two-dimensional discrete cosine transform (DCT) individually on each color component (1004).
3. Order the two-dimensional DCT coefficients in approximately a monotonically increasing frequency order (1006). The zigzag control manages the output of the DCT block and stores the DCT coefficients in the order shown in FIG. 23.
4. Quantize the DCT coefficients: The quantizer 1008 divides DCT coefficients by either a uniform divisor or a frequency-dependent divisor. As detailed below, the quantization type is set in the chunk control block (1010). The chunk control block selects default quantization factors, which can be modified on a per block basis (1012). Default QIndices for each of the color and alpha components (YUV and alpha) select a corresponding QFactor from a QFactor table. In perceptual quantization, the QFactors are modified for selected frequency components by modifying the QIndex for those selected frequency components. The default QFactor applied to a given block can vary based on the compression type selected for the block. A per block control parameter designating compression type can alter the default QIndex, and thus, modify the corresponding QFactor for the block.
5. Encode the resulting coefficients using Huffman encoding with fixed code tables. The RLE/Huffman encoder 1014 encodes the coefficients as they are output from the quantizer 1008.

Figure 22:
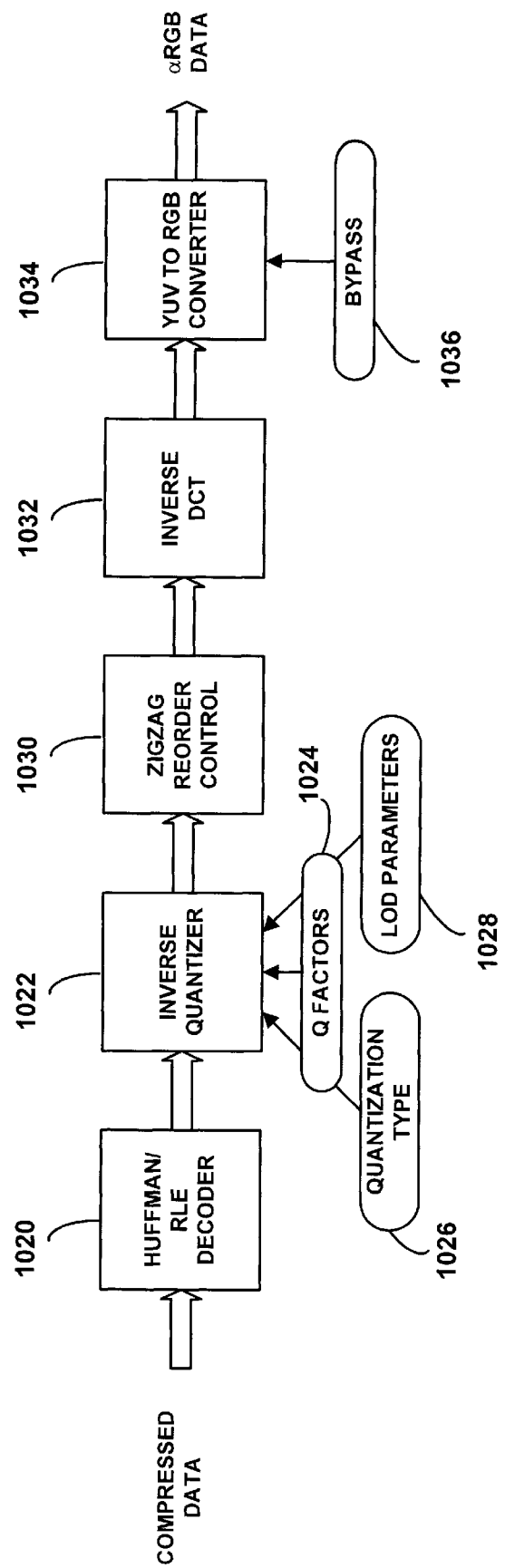
FIG. 22 is a diagram illustrating an implementation of a lossy decompression method.

FIG. 22 is a block diagram illustrating an implementation of the lossy decompression method. This implementation includes the following four or five steps:

1. Decode the compressed data input using Huffman decoding with fixed code tables in the RLE/Huffman decoder 1020.
2. Dequantize the compressed data: Multiply by the uniform multiplier or the frequency-dependent multiplier used in the quantization step of compression. The inverse quantizer 1022 multiplies coefficients by QFactors (1024) selected from the QFactor table based on the quantization type (1026) and LOD filtering parameters (1028).
3. Reorder the linear array of data into the proper two-dimensional order for DCT coefficients. The zigzag reorder control 1030 manages the output of the inverse quantizer 1022 and transfers the coefficients to the DCT block 1032 in proper order.
4. Perform an inverse, two-dimensional DCT individually on each color component (1032).
5. Convert the colors in the YUV-like luminance-chrominance system to RGB colors, if the compression process included the corresponding optional step (1034). If the Bypass Color Conversion control is set, the decompression engine bypasses the YUV to RGB color space converter 1034.

Color Space Conversion

The color space converter 1000 transforms the RGB colors to a brightness-color system with brightness coordinate Y and color coordinates U and V. This luminance-chrominance system is not a standard color space. This conversion is lossless while requiring only two bits more than the input to the color space converter. It is also less complex than standard luminance-chrominance spaces. The lossless, reversible conversion applies to each pixel independently and does not change the value of alpha.

RGB to YUV (for Compression)

The conversion from integer RGB values to integer YUV values uses this transformation:

$Y=(4R+4G+4B)/3-512$ $U=R-G$ $V=(4B-2R-2G)/3$

YUV to RGB (for Decompression)

The conversion from integer YUV values to integer RGB values uses this transformation:

$R=(((Y+512)-V)/2+U+1)/2$ $G=(((Y+512)-V)/2-U+1)/2$ $B=((Y+512)/2+V+1)/2$

In this implementation of the color space conversion, the R, G, and B are 8-bit unsigned integers, which in the decompression engine are clamped to the interval (0, max), where max is: 1) the alpha value of the pixel when the colors are premultiplied by alpha and the data do not represent a sprite for lens flare; or 2) 255, otherwise. The Y, U, and V components are 10-bit signed integers.

This color space conversion is lossless and is implemented with minimal precision. While the color space conversion does not have to be lossless in the lossy form of compression, it is advantageous to be lossless since a lossy conversion degrades image quality, especially in multi-pass rendering operations where a block can be compressed and decompressed multiple times.

When the Bypass Color Space Conversion control specifies no conversion, the correspondence between RGB and YUV components is:

$Y=R$ $U=G$ $V=B$

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in Figures A.1.1 and A.1.2 in *Discrete Cosine Transform*. Rao, K. R., and P. Yip. San Diego: Academic Press, Inc., 1990. Other conventional DCTs may be used as well.

In both the forward and reverse DCTs, one specific implementation uses 16-bit registers, each with a sign bit, 13 integral bits, and 2 fractional bits. The DCT constants are unsigned and have two integral and eleven fractional bits.

Zigzag Ordering

The two-dimensional DCT produces a two-dimensional array of coefficients for the frequency domain representation of each color component. Zigzag ordering rearranges the coefficients so that low DCT frequencies tend to occur at low positions of a linear array. In this order, the probability of a coefficient being zero is approximately a monotonically increasing function of the position in the linear array (as given by the linear index). This ordering simplifies perceptual quantization and LOD filtering and also significantly improves the performance of the run-length encoding (RLE).

FIG. 23 is a diagram showing the relationship between the two-dimensional coefficient array (as a function of row i and column j)(1040) and the zigzag ordering, illustrated with arrows, that maps the array into a linear sequence (as a function of linear index 0 . . . 63). Element 0 of the linear array is the DC component; the other elements (1–63) are the AC components.

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (zigzag index=0), but instead passes it along unaltered.

The quantization process begins with the specification of the quantization factor for an image or portion of an image. In this implementation, a quantization factor is specified for a 32×32 pixel chunk. A quantization index (QIndex) specifies a corresponding quantization factor (QFactor) to use for the chunk. The following table shows the relationship between QIndex and QFactor for one implementation of a QFactor table

| Quantization Factor | | | |
| --- | --- | --- | --- |
| QIndex | QFactor | QIndex | QFactor |
| 0 | 2 | 8 | 32 |
| 1 | 3 | 9 | 48 |
| 2 | 4 | 10 | 64 |
| 3 | 6 | 11 | 96 |
| 4 | 8 | 12 | 128 |
| 5 | 12 | 13 | 192 |
| 6 | 16 | 14 | 256 |
| 7 | 24 | 15 | 4096 |

Each color plane (RGB and alpha) has a different value for the chunk QIndex in this implementation. A QIndex of 15 selects a QFactor of 4096, which always produces zeros during quantization and inverse quantization. During inverse quantization, a QIndex of 15 has the effect of a QFactor of zero (multiply by zero). The quantizer 1008 divides each the appropriate coefficient QFactor and rounds it back to an integer. The inverse quantizer 1022 multiplies each coefficient by the appropriate QFactor Quantization and inverse quantization do not change the DC frequency component.

Note that the QFactors are either a power of two (2, 4, 8, 16, 32, 64, 128, 256, 4096) or the addition of two sequential powers of 2 (3, 8, 12, 24, 48, 96, 192) in this table. This selection of QFactors decreases the complexity of the quantizer and inverse quantizer because they can be implemented with at most two shifts and one add. Relative to JPEG, the QFactor table and QIndex lowers complexity and facilitates varying compression ratios within an image. In this implementation, the relationship between the coefficient QFactors within a block is controlled by the uniform/perceptual bit and the LOD parameters, and QIndices can be more easily altered to indirectly modify the QFactor rather than modifying the QFactor directly. The QIndex is also smaller (fewer bits) and easier to store per chunk or per block than a QFactor. The compression ratio can be varied per image, per chunk, per block and per frequency component by modifying the QIndex, instead of setting individual QFactors in a quantization matrix.

If LOD filtering is active during inverse quantization, the coefficient QIndex can vary from coefficient to coefficient (from zigzag index to zigzag index).

Block Quantization Factor

Each block has an associated block compression type parameter which can modify the chunk QIndex for a particular block. This way the QIndex, and thus the QFactor, can vary from block to block (8×8 pixels). The block QIndex results from modifying the chunk QIndex on a per block basis. One implementation for modifying the chunk QIndex to compute a block QIndex is:

Block QIndex=Chunk QIndex+(Block Compression Type−3)

Where Block Compression Type is a control parameter associated with a particular block.

This expression increments the chunk QIndex by zero, one, two, three, or four. Because the largest possible QIndex value is 15, any incremented value greater than 15 is set to 15.

The QIndex, and thus the QFactor, can also vary from coefficient to coefficient (from zigzag index to zigzag index) if the quantization type is perceptual or LOD filtering is performed.

For uniform quantization, all coefficient QIndices are equal to the block QIndex, so the corresponding QFactor either multiplies (inverse quantization) or divides (quantization) each coefficient in the block by the same QFactor.

Perceptual Quantization

For perceptual quantization, the coefficient QIndex depends on the value (0 . . . 63) of the zigzag index in the linear array. Perceptual quantization is based on the principal that the human eye is more sensitive to some frequency components. Therefore in perceptual quantization, some coefficients are reduced more than others by dividing them by a larger QFactor. This is implemented in the quantizer and inverse quantizer by modifying the QIndex for some coefficients. The following table gives the resulting coefficient QIndex as a function of the zigzag index value.

| Coefficient QIndex | Zigzag Index |
|---|---|
| Block QIndex | index <12 |
| Block QIndex + 1 | 12 ≦ index <28 |
| Block QIndex + 2 | 28 ≦ index <52 |
| Block QIndex + 3 | 52 ≦ index |

Because the largest possible QIndex value is 15, any incremented value greater than 15 is set to 15. Note that the specific manner in which the QIndex is modified can vary. Also the choices for the zigzag index intervals can vary as well.

If LOD filtering is active during inverse quantization, the coefficient QIndex can also vary from coefficient to coefficient (from zigzag index to zigzag index). The variation within a block due to perceptual quantization can be combined with the variation within a block due to LOD filtering.

LOD Filtering

LOD filtering occurs during inverse quantization. It further reduces the values of high frequency coefficients, so that aliasing is minimized when reducing the size of an image using simple pixel sampling after decompression.

Two LOD filtering parameters control LOD filtering by specifying zigzag indexes at which to modify the QFactor. The following table shows the mapping from LOD parameter to zigzag index. Note that a zigzag index of 64 (corresponding to an LOD parameter of 15) does not exist. A zigzag index value of 64 indicates no LOD filtering (no change to the QFactor).

| LOD Parameter | Zigzag Index | LOD Parameter | Zigzag Index |
|---|---|---|---|
| 0 | 0 | 8 | 36 |
| 1 | 1 | 9 | 43 |
| 2 | 3 | 10 | 49 |
| 3 | 6 | 11 | 54 |
| 4 | 10 | 12 | 58 |
| 5 | 15 | 13 | 61 |
| 6 | 21 | 14 | 63 |
| 7 | 28 | 15 | 64 |

The two LOD parameters determine an zigzag index interval. The final QFactor is the value from either uniform or perceptual inverse quantization modified according to the position of the zigzag index relative to the interval. Note that this is only one example mapping of LOD parameters to Zigzag indices. The following table provides the proper calculation for this implementation.

| Final QIndex | Zigzag Index |
|---|---|
| Coefficient QIndex | index < zigzag index from LOD parameter 0 |
| Coefficient QIndex - 2 (QFactor (uniform or perceptual)/2) | zigzag index from LOD parameter 0 ≦ index < zigzag index from LOD parameter 1 |
| Coefficient QIndex = 15 (multiply by zero) | zigzag index from LOD parameter 1 ≦ index |

The LOD filtering therefore either:
1. Leaves the uniform or perceptual QFactor value unchanged,
2. Halves the uniform or perceptual QFactor value, 3. Sets the final QFactor value to zero.

Because the smallest possible QIndex value is zero, any decremented value less than zero is set to 15.

Note that the LOD filtering parameters are not an inherent part of the compressed data and that decompressors using this method are not required to do LOD filtering. Also, the above method for modifying the QIndices to support LOD filtering can vary. For example, the specific expressions for modifying the QIndex and the Zigzag index intervals can vary. This is only one implementation.

Entropy Coding

Huffman/RLE coding processes the linear array of quantized DCT coefficients by:

1. Independently encoding non-zero quantized coefficients in the lossy case and prediction results in the lossless case with the fewest possible bits (because the DCT coefficients are uncorrelated).
2. Encoding continuous sequential runs of zero values of quantized coefficients in the lossy case or prediction results in the lossless case. This step encodes zeros because zero is the most probable non-DC DCT coefficient. Zigzag ordering increases compression because the probabilty of zero increases with increasing frequency in the lossy case.

One suitable approach for the Huffman/RLE coding process is the Huffman/RLE coding process used for the AC coefficients in the JPEG still image compression standard. However, Huffman and run length encoding are well known and any of a variety of conventional implementations of Huffman and run length encoding can be used in the alternative.

To enable random access of blocks, this implementation illustrated here does not encode the DC frequency coefficient (index=0), but instead passes it on unaltered.

The Huffman/RLE encoder computes a series of variable-length code words, each of which describes:

1. The length, from zero to 15, of a run of zeros that precedes the next non-zero coefficient.
2. The number of additional bits required to specify the sign and mantissa of the next coefficient following the run of zeros.

The sign and mantissa of the non-zero coefficient follows the code word. One reserved code word signifies that the remaining coefficients in a block are all zeros.

Encoding

The Huffman/RLE encoder codes all blocks using the typical Huffman tables for AC coefficients from Annex K, section K.3.2 of ISO International Standard 10918-1. This includes Table K.5 for the luminance (Y) AC coefficients and Table K.6 for the chrominance (U and V) AC coefficients.

Decoding

The Huffman/RLE decoder decodes all blocks using the same fixed tables as the encoding process. Therefore, it is not necessary to store or to convey the Huffman tables with the data.

Lossless Compression\Decompression

Figure 24:
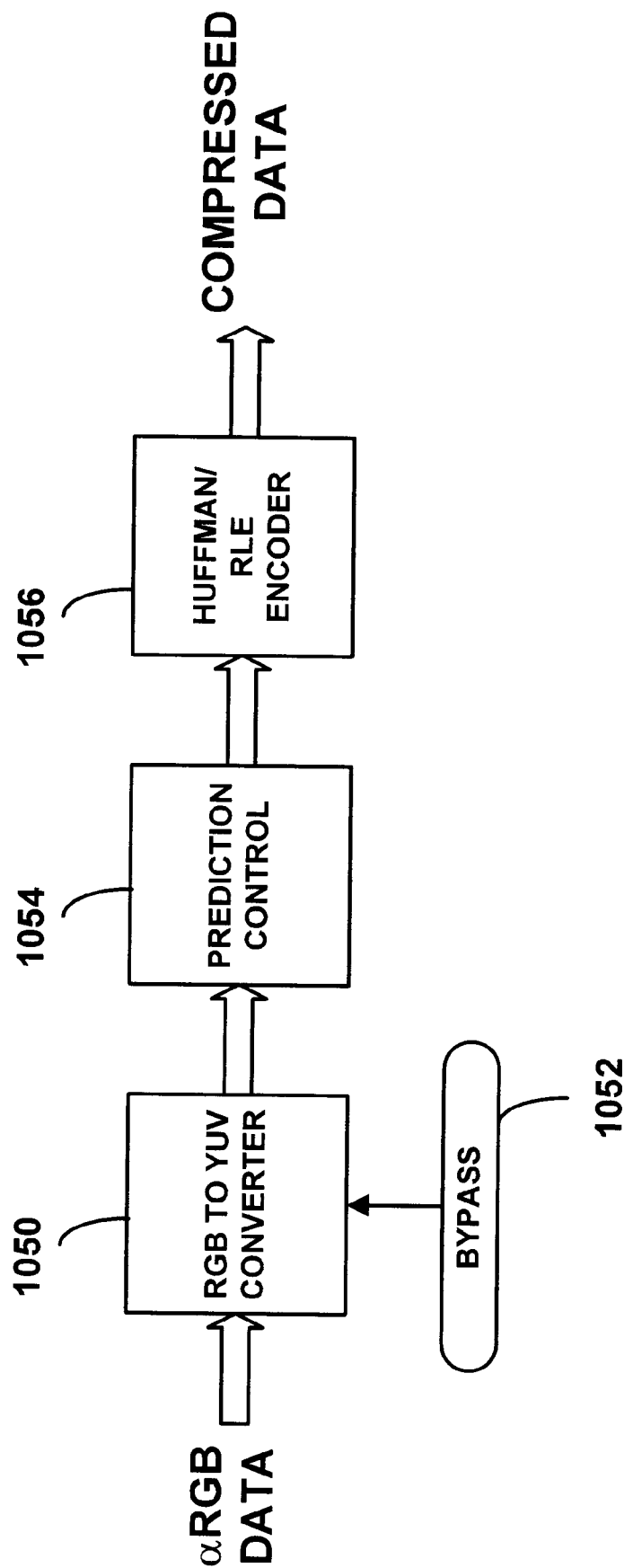
FIG. 24 is a diagram illustrating an implementation of a lossless compression method.

FIG. 24 is a block diagram illustrating an implementation of the lossless compression method. The lossless compression occurs in two or three steps:

1. Convert incoming RGB data to a YUV-like luminance-chrominance system (optional) (1050). The decompression engine bypasses the color space converter 1050 if the Bypass Color Conversion (1052) is set for the chunk.
2. Perform a differential prediction calculation on each color component (1054). The prediction control 1054 performs prediction on the YUV and alpha components using the expressions set forth below.
3. Encode the resulting coefficients using Huffman encoding with fixed code tables (1056). The encoder 1056 for the lossless method uses the same approach as the encoder 1014 for the lossy method.

Figure 25:
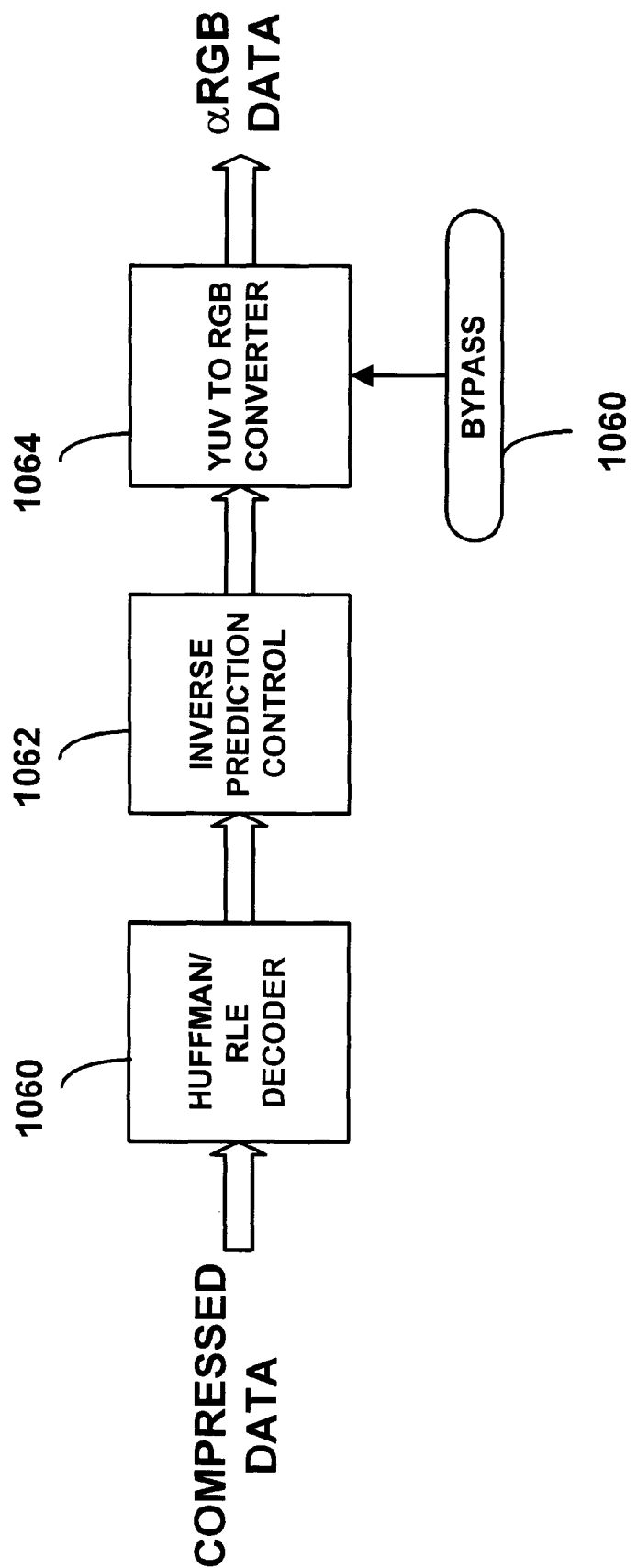
FIG. 25 is a diagram illustrating an implementation of a lossless decompression method.

FIG. 25 is a block diagram illustrating an implementation of the lossless decompression method. The decompression engine performs this method in two or three steps:

1. Decode the incoming compressed data using Huffman decoding with fixed code tables (1060). As in the compression method, the decoder 1060 for the lossless method uses the same method as the decoder 1020 in the lossy method.
2. Perform an inverse, differential prediction (reconstruction) on each color component (1062). The inverse prediction control 1062 reconstructs each color and alpha component using the expressions set forth below.
3. Convert the colors in the YUV-like luminance-chrominance system to RGB colors if the compression process included this corresponding optional step (1064). The decompression engine bypasses the color space converter 1064 when the Bypass Color Space Conversion control is set (1066).

Color Space Conversion

The color space converter 1064 reversibly transforms the RGB colors to a brightness-color system with brightness coordinate Y and color coordinates U and V. This is a unique color space that improves the degree of compression even more than the YUV system above. The numbers entering the predictor have smaller magnitude and hence the numbers entering the Huffman/RLE encoder are smaller. Smaller numbers are more compressable in the entropy coder. The color space conversion applies to each pixel independently and does not change the value of alpha.

RGB to YUV (for Compression)

The conversion from integer RGB values to integer YUV values uses this transformation:

Y=G

U=R−G

V=B−G

YUV to RGB (for Decompression)

The conversion from integer YUV values to integer RGB values uses this transformation:

R=Y+U

G=Y

B=Y+V

In this implementation, R, G, and B are 8-bit unsigned integers. Y, U, and V are 9-bit signed integers. Thus, the color space converter achieves lossless conversion to YUV space with minimal precision. Since there are no multipliers or divisors, this color space conversion can be implemented with low complexity.

When the Bypass Color Space Conversion flag specifies no conversion, the correspondence between RGB and YUV is:

Y=R

U=G
V=B

Alpha information is not altered during the color space conversion.

Prediction

The prediction stage occurs after the color space transform. Prediction is a losslessly invertible step that reduces the entropy of most source images, particularly images with lots of blank space and horizontal lines. In this implementation, the predictor operates independently on each block color plane.

In the prediction stage of compression and the inverse prediction stage of decompression:
1. p(x, y) are the pixel values input to the compressor and output from the decompression engine; and
2. d(x, y) are the difference values input to the entropy coder in the next stage of the compression engine and output from the entropy decoder in the decompression engine.

Prediction is computed as follows:

d(x, y)=p(x, y) for x=0, y=0
d(x, y)=p(x, y)−p(x, y−1) for x=0, y>0
d(x, y)=p(x, y)−p(x−1,y) for x>0

Inverse prediction in the decompression engine is computed as follows:

p(x, y)=d(x, y) for x=0, y=0
p(x, y)=p(x, y−1)+d(x, y) for x=0, y>0
p(x, y)=p(x−1,y)+d(x, y) for x>0

The Huffman/RLE coding and decoding use the same method in both the lossy and lossless form of compression and decompression in this implementation.

Like the lossy method, the lossless method operates on pixel blocks (8×8 pixels in this case) independently. This enables random access to blocks compressed using the lossless method.

Compression Related Control Parameters

Having described the compression and decompression methods in detail, we now describe a specific implementation of the control parameters governing compression and decompression in the chunking architecture described above. In practice, a gsprite computed by the image pre-processor (e.g., host PC or the DSP, FIG. 8) will likely have constant compression properties for all chunks and blocks. An externally computed gsprite (including textures) can have compression varying on a per-chunk and a per-block basis.

Per Gsprite Parameters

In this implementation, The Level of Detail (LOD) filtering parameters apply to a whole sprite. Each parameter specifies an zigzag index. Together, they specify an interval of frequencies for filtering during lossy, inverse compression. The inverse quantizer 1022 modifies the multiplier applied to selected frequencies if LOD filtering is enabled.

Per Chunk Parameters

The following controls and parameters apply to all blocks in a chunk in this implementation. Some parameters may not apply to a block that does not use the applicable type of compression.

Bypass Color Space Conversion

The Bypass Color Space Conversion control indicates whether to include or bypass the RGB-to-YUV and YUV-to-RGB color space converters for the chunk.

| Value | Meaning |
| --- | --- |
| 0 | Include conversion |
| 1 | Bypass conversion |

Chunk QIndex Values

The Chunk QIndex Values are four parameters that specify, for each color component (including alpha), the index default value of the quantization factor to use in the quantization step for the chunk. The color components are either RGB or YUV depending on whether Bypass Color Space Conversion is enabled. The compression type control can specify how to modify the chunk QFactors for each color plane on a per-block basis.

Quantization Type

The Quantization Type control indicates whether to use uniform quantization or perceptual quantization in the quantization step for the chunk.

| Value | Meaning |
| --- | --- |
| 0 | Use uniform quantization |
| 1 | Use perceptual quantization |

Uncompressed Pixel Format

The Uncompressed Pixel Format parameter specifies the storage format for uncompressed data for the chunk.

| Value | Meaning |
| --- | --- |
| 00 | 32-bit format |
| 01 | 16-bit format |
| 10 | 8-bit format |
| 11 | Reserved |

The 16 bit format is either 1555 (alpha and YUV or RGB) or 8+8 (alpha+color index) depending on the how the Has Color Plane parameters are set as specified in FIG. 26.

Has Color Plane

Has Color Plane are four controls that indicate if the chunk has the specified color plane.

| Value | Meaning |
| --- | --- |
| 0 | Chunk doesn't contain specified color |
| 1 | Chunk contains specified color |

Per Block Parameters

The Compression Type parameter applies to individual blocks within a chunk and can vary from block-to-block within a chunk.

Compression Type

The compression types of 100 through 111 modify the chunk QIndices.

| Value | Meaning |
|---|---|
| 000 | Reserved |
| 001 | Non-planar (packed RGBA), uncompressed |
| 010 | Lossless compression |
| 011 | Lossy compression, default QFactors |
| 100 | Lossy compression, increment default QIndices by 1 |
| 101 | Lossy compression, increment default QIndices by 2 |
| 110 | Lossy compression, increment default QIndices by 3 |
| 111 | Lossy compression, increment default QIndices by 4 |

Note that the compression type control enables the compression engine to switch between lossy and lossless compression on a block by block basis.

Modes of Operation

The table illustrated in FIG. 26 shows the combinations of controls and parameters supported in one implementation. All digits are binary bits, and an entry of "X" indicates that either "0" or "1" can occur.

Compressed Block Format
A block stored in memory may be compressed in the following format:
  Byte 0: Offset to V data
  Byte 1 to N: Y data
  Byte N+1 to M: U data
  Byte M+1 to O: V data
  Byte O+1 to P: A data The offset provides a way to look ahead to a section of memory storing compressed color component data for one of the components (YUV or alpha) after previous sections storing one or more other components. This enables the decompression engine to access and decompress the color components in parallel instead of serially.

For example, the offset to the V data (which is M+1) allows the decompression engine to begin decompressing the V and Y component data simultaneously. Decompression latency can be lower because of this parallelism.

The compressed blocks for the same gsprite are stored sequentially, to allow transfer lengths to be calculated by pointer differencing.

It is important to note that these controls and parameters are described with reference to a specific implementation, and the specific choice of parameters and the decision as to where to store them will vary with the implementation. In general, QIndices for blocks may be specified at the image, chunk, or block level. QIndices can be modified per image, per chunk, per block or per coefficient within a block. In the implementation described above, a chunk size is 32×32 pixels, but the dimensions of a chunk can vary. A block is the elementary unit of compression or decompression and in this case is 8×8 pixels. The size of a block can vary with implementation. While the compression techniques are described in the context of specific hardware implementations (e.g. the tiler and gsprite engine), they can be extended to other architectures as well, including both hardware and software implementations.

Implementation in the Tiler and Gsprite Engine

The specific compression methods described above compress images in independent blocks of 8×8 pixels. These methods are applied to image chunks in the chunking architecture described above. In the context of this chunking architecture, each compressed 32×32 pixel chunk consists of 16 such blocks. To facilitate compression of a 32×32 pixel chunk, the anti-aliasing engine 412 in the tiler resolves pixel data into 8×8 pixel blocks. The 8×8 pixel blocks are buffered in staging buffers such that a fragment resolve subsystem can resolve pixel fragments for a block as the compression engine compresses another block or blocks.

Both the tiler and gsprite engine include decompression engines and texture/gsprite fetch control to fetch and decompress pixel blocks. The decompression engines implement the lossy and lossless decompression methods to decompress image data from the tiler or external sources.

As introduced above, the tiler (FIGS. 9A–9C) renders gsprites one chunk at a time. These chunks are comprised of pixel blocks (in this case, 16 8×8 pixel blocks). For texture mapping, shadowing, and some multi-pass rendering operations, the tiler fetches gsprite or texture blocks from memory and generates pixel values. To compose a frame for the view space (e.g. screen space), the gsprite engine (FIGS. 12A–B) fetches gsprite blocks, transforms pixels to screen space, and composites pixels in a compositing buffer.

There are a number of control parameters that govern processing of gsprites, chunks, and blocks. A gsprite display list, computed in the DSP, stores a list of gsprites comprising a display image. This display list includes pointers to gsprites, and more specifically, gsprite header blocks. The gsprite header block stores a number of attributes of a gsprite including gsprite width, height, and an affine transform defined in terms of a screen space parallelogram. The gsprite header block also includes a list of its member chunks. In one implementation, this list is in the form of pointers to chunk control blocks.

Chunk control blocks include per chunk and per block parameters. The per chunk parameters include a YUV color converter bypass flag, chunk QFactors, a perceptual quantization flag, pixel format, and whether the pixel data resides in memory managed in Memory Allocation Units (MAU) or in linear memory. An MAU is a piece of shared memory used to allocate chunk memory. MAU managed memory includes a list of MAUs (124 bytes each for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format in this implementation is an 8×8×4 array of pixels that encode 32 bit pixels (8 bits for RGB and Alpha).

The steps for retrieving a pixel given (X,Y) coordinates in a gsprite using the above control parameters include:
1) Divide Y and X by 32 to derive the chunk row and column, respectively.
2) Form the chunk number by: (chunk row)*(width of sprite in chunks)+chunk column.
3) Form the Chunk Control Block offset by: (chunk number)*(size of chunk header block))
4) Form the Block offset within the Chunk Control Block by: (Y<4:3>*4+X<4:3>)*3.
5) Send the Block pointer to the Decompressed cache logic, receive a Block.
6) Form the pixel offset within the Block by (Y<2:0>*8)+ X<2:0>

Here, a chunk offset is used to select a chunk. A block offset is then used to select a block pointer. The block pointer selects a block containing the pixel, and the pixel offset selects the pixel.

To access the block for a given pixel among compressed blocks of pixel data, the cache controls on the tiler and gsprite engine perform the following steps:

1) Form the MAU address by looking up the Block pointer value in the Chunk Control Block, and dividing by the size of the MAU.
2) Look up the number of MAUs allocated in the Chunk Control Block for this block.
3) Look up the next Block pointer address in the Chunk Control Block.
4) Form the length of the compressed block by: MAUs allocated*MAU size+2's complement of ((Block pointer) mod MAU size)+(next Block pointer) mod (MAU size)
5) Send the block address and the length of the compressed block to the Compressed Cache logic.

The compressed cache will read the first MAU, and if the length of the transfer has not been satisfied, then the pointer contained in the MAU will be used to access the start of the next MAU. This process continues, until the transfer length has been met.

To support MIP map texture operations, the tiler supports another level of indexing. One method for indexing a MIP map level includes the following steps:

1) For a given sprite, form a table of mip chunk level offsets by:

mipChunkOffset[0]=0 \\Offset for level of detail 0
For each level of mip map:
mipChunkOffset[level+1]=width of sprite/($2^{level}$)
*height of sprite/($2^{level}$)+mipChunkOffset[level]

2) Use the LOD parameter to get the mip chunk offset.

At this point, the mip chunk offset, width of sprite/($2^{level}$), and height of sprite/($2^{level}$) can be used to find any desired chunk within the chosen level of detail for the current gsprite.

Pixel Resolving

Figure 27:
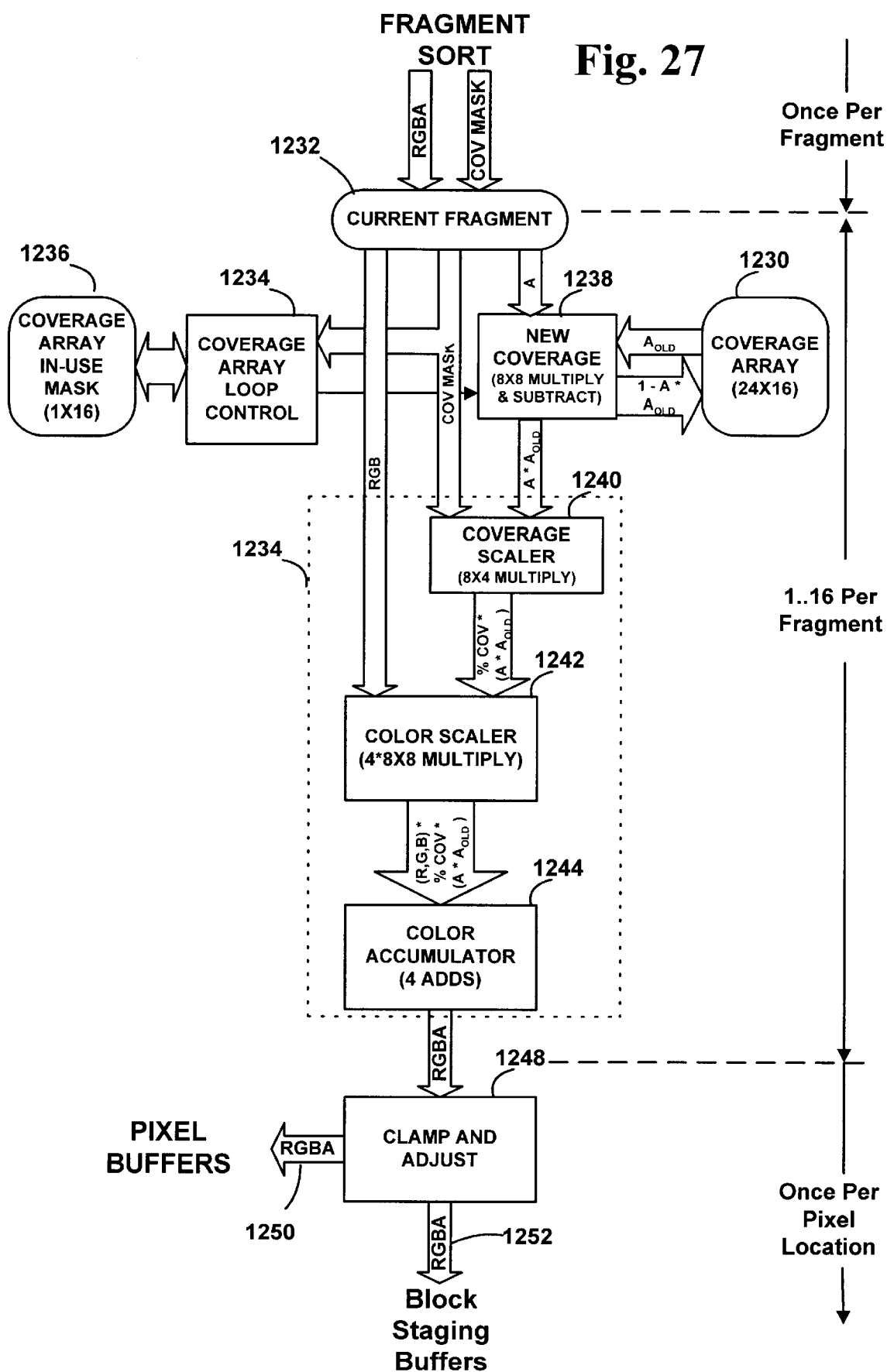
FIG. 27 is a diagram illustrating a fragment resolve subsystem in one implementation of the invention.

FIG. 27 is a block diagram illustrating an implementation of the hardware optimized fragment resolve sub-system in the anti-aliasing engine of the tiler. Though not necessarily critical to the invention, it is helpful to understand the pixel resolve process because the tiler compresses resolved pixel data as part of the rendering process. We therefore describe pixel resolving in the context of a specific implementation of a fragment resolve sub-system.

The input to this sub-system is a stream of depth sorted fragment records. As shown, a fragment record includes RGB color values, an alpha value A, and a coverage mask (Cov mask). This particular fragment resolve sub-system processes fragment records in front to back order and accumulates color values for the pixel location as it processes each fragment layer. This sub-system minimizes the hardware necessary to accumulate color values because it keeps track of unique pixel regions having a common alpha. This enables the fragment resolve sub-system to scale and accumulate color once for each unique pixel region rather than separately for each sub-pixel region.

The fragment resolve system initializes an in-use mask 1236, an array of coverage masks 1230, and an array of accumulated alpha values 1230 before resolving a list of fragment records. The elements in the in-use mask 1236 represent pixel regions, each including one or more sub-pixel regions having a common accumulated alpha. The coverage masks give the sub-pixel locations covered by a pixel region. The array of accumulated alpha stores the unique accumulated alpha values for corresponding pixel regions having a common alpha. This particular coverage array 1236 stores the accumulated alpha values and coverage masks.

After initializing the in-use mask, coverage array mask and coverage array alpha, the sub-system begins processing a fragment record, starting with the fragment record closest to the viewpoint. In one implementation of the anti-aliasing engine 412 on the tiler, the anti-aliasing engine sorts the fragment lists in a post-processing stage after the scan convert block 395 and texture filter engine 401 have completed rasterizing a chunk. The anti-aliasing engine reads each fragment in a fragment list, starting with the head, and as it does so places entries in sorted array of indices and depths. Each index in this array points to a fragment buffer location storing the RGB, alpha and coverage data for a pixel fragment in the list. As the anti-aliasing engine reads pixel fragments, it performs an insertion sort such that the array entries comprise a depth sorted array of indices to pixel fragments and corresponding depth values. Once the list is sorted, the fragment resolve subsystem retrieves depth sorted fragments by reading each entry in the sorted array in the order that these entries are stored in the array. This enables the fragment resolve system to retrieve the RGB color values, alpha and coverage masks for the pixel fragments in a list in a depth sorted order.

As it processes each fragment record in the list, the sub-system keeps track of the pixel regions having a common alpha. The sub-system determines whether each fragment record in the list overlaps each pixel region having a common alpha. If so, the sub-system computes the accumulated color for the portion of the current pixel region that overlaps with the current fragment. If there is an overlap with the current pixel region, the sub-system also determines the new pixel region or regions caused by this overlap and keeps track of them.

For a current fragment (1232), the sub-system loops through each element in the in-use mask. The coverage array loop control 1234 maintains the in-use mask (1236) and updates it as necessary as it processes each fragment record. As it loops through the entries in the in-use mask, the coverage array loop control communicates with and controls the operation of the new coverage control 1238. The new coverage control 1238 updates the coverage array mask and alpha 1230 as necessary when the current fragment overlaps the current pixel region.

The new coverage control 1238 reads the stored accumulated alpha (Aold) from the coverage array alpha associated with the current entry in the in-use mask and computes the alpha scale factor (A*Aold) used for scaling color and used to compute alpha for subsequent fragment layers, Anext (1-A*Aold). The new coverage control 1238 transfers the alpha scale factor (A*Aold) to the scale and accumulation control 1246 for use in scaling the color data of the current fragment. The new coverage control 1238 also computes the alpha for subsequent layers, Anext (1-A*Aold), and stores it in along with its corresponding coverage array mask in the coverage array 1230.

For each pixel region with a common accumulated alpha, the fragment resolve sub-system determines whether the current fragment overlaps the current pixel region by finding the intersection of the coverage masks of the fragment and pixel region.

If the current fragment overlaps the current pixel region, the sub-system 1) computes the accumulated color for the overlapped portion of the pixel region 2) updates the in-use element and corresponding coverage array mask and alpha (coverage array alpha) for this in-use element.

The scale and accumulation control 1246 computes the accumulated color for each unique pixel region covered by the current fragment. The scale and accumulation control includes a coverage scaler 1240, a color scaler 1242, and a color accumulator 1244. The coverage scaler 1240 computes a coverage scale factor (number of sub-pixel locations in current pixel region overlapped by current fragment/total sub-pixel locations *A*Aold). The color scaler 1242 then reads the color values (RGB) for the current fragment (1232) and multiplies them by the coverage scale factor from the coverage scaler 1240. Finally, the color accumulator 1244 adds the scaled colors with the accumulated colors to compute updated accumulated color values.

When the current fragment overlaps the current pixel region, the coverage array loop control 1234 updates the in-use mask 1236 so that it includes an entry corresponding to the new pixel region. This may merely overwrite the existing in-use element or create a new one. The coverage array loop control also instructs the new coverage control 1238 to update the coverage array mask 1230 to the coverage of the new pixel region, and to set the accumulated alpha for this new pixel region. The new coverage control 1238 sets a new alpha coverage array entry corresponding to the new pixel region to Anext.

When the current fragment only covers a portion of a pixel region (rather than overlapping it entirely), then the new coverage control 1238 creates two new pixel regions: 1) a portion of the pixel region that the current fragment overlaps; and 2) a portion of the pixel region un-obscured by the current fragment. In this case, the sub-system computes the coverage for the un-obscured portion and sets the alpha for it, which remains the same as the original pixel region. To accomplish this, the coverage array loop control 1234 updates the in-use mask 1236, and instructs the new coverage control 1238 to update the coverage array mask 1230. The coverage array alpha entry corresponding to this second pixel region remains the same as the current pixel region (Aold) because it is unchanged by the current fragment.

Repeating the approach described above, the sub-system loops through each in-use entry for the current fragment, and computes the effect, if any, of the current fragment on each pixel region. It then repeats the process for subsequent fragments in the list until the list is empty.

The clamp and adjust block 1248 performs the clamping of the accumulated color to the proper range (this is needed due to rounding in the Coverage Scaler block which can result in colors or alphas which exceed the 8 bit range) and an adjustment for errors introduced by scaling a value by an 8 bit binary number representing 1. An adjustment for this type of error may be necessary in some circumstances because a value of 1 is actually represented by the hex value "FF." In other words, an alpha range of 0 to 1 is represented by a range of 8 bit numbers from 00 to FF. Therefore, when multiplying a number x by FF, the result must by x. The adjustment ensures that the result of multiplying by FF is properly rounded to x.

The feedback path 1250 to the pixel buffers exists to support a mode where resolved pixel values are stored back into the pixel buffers. This enables multi-pass rendering on resolved pixel data without transfering a chunk of resolved data to the shared memory off the tiler.

If the fragment resolve subsystem is not in the feedback mode, then the clamp and adjust block 1248 transfers the resolved pixel data to block staging buffers via the data path 1252 shown in FIG. 27. These block staging buffers are used to buffer resolved pixel data before it is compressed in 8×8 pixel blocks.

While we have explained detailed embodiments of the invention, it should be understood that a number of variations to these embodiments are possible without departing from the scope of the invention. For example, the compression techniques can be applied to architectures that render geometric primitives to image chunks, architectures that render primitives to image layers (e.g. gsprites), texture mapping architectures, architectures that composite image layers to compute an image, etc. The concepts of still image compression can apply in a variety of contexts as well and are not necessarily limited to graphics rendering environments.

In view of the many possible embodiments to which the principles of our invention may be put, the embodiments described above are illustrative only and should not be taken as limiting the scope of our invention. Rather, we claim as our invention all such embodiments as may come within the scope and spirit of the following claims and equivalents to these claims.

I claim:

1. A method for still image compression comprising:

dividing an image into a plurality of blocks;

storing a QIndex for one or more of the blocks, where the QIndex is an index into a table of QFactors, such that each block has an associated QIndex;

independently compressing the blocks including:

a) performing an invertable transform on a block of the image to generate coefficients for spatial frequency components in the block; and b) quantizing at least two of the coefficients by dividing coefficients by a QFactor in the table corresponding to the QIndex for the block; and repeating the compressing step for subsequent blocks in the image.

2. The method of claim 1 further including:

storing a pointer to each of the blocks in a control structure associated with the image so that each of the blocks is randomly accessible and independently decompressable.

3. The method of claim 2 wherein the quantizing step is not performed on a DC coefficient of each block.

4. The method of claim 1 wherein the compressing step includes:

encoding the quantized coefficients using entropy encoding.

5. The method of claim 4 wherein the entropy coding comprises Huffman and run length encoding.

6. The method of claim 4 wherein the entropy coding comprises arithmetic encoding.

7. The method of claim 1 further including:

varying compression ratio within the image on a block by block basis by modifying the QIndex associated with two or more blocks.

8. The method of claim 1 further including:

varying compression ratio within a block by modifying the QIndex associated with the block for selected coefficients.

9. The method of claim 1 further including:

while compressing the image, to compress one or more blocks using a lossy compression method including steps a) and b), and selecting to compress one or more other blocks in the image using prediction and entropy coding, wherein the lossy compression method and the entropy coding are selected on a block by block basis.

10. The method of claim 1 wherein the invertable transform comprises a discrete cosine transform.

11. A method for still image compression comprising:

dividing an image into a plurality of blocks;

storing a QIndex for one or more of the blocks, where the QIndex is an index into a table of QFactors, such that each block has an associated QIndex;

deriving a QIndex for each block by modifying a chunk QIndex;

independently compressing one block at a time including:

a) performing a discrete cosine transform on a block of the image to generate coefficients for spatial frequency components in the block;

b) quantizing at least two of the coefficients by dividing coefficients, except for a DC coefficient, by a QFactor in the table corresponding to the QIndex for the block; and c) encoding the quantized coefficients using Huffman and run length encoding; and repeating the compressing step for subsequent blocks in the image.

* * * * *

UNITED STATES PATENT AND TRADEMARK OFFICE
CERTIFICATE OF CORRECTION

PATENT NO.    : 6,292,194 B1
DATED         : September 18, 2001
INVENTOR(S)   : William Chambers Powell III It is certified that error appears in the above-identified patent and that said Letters Patent is hereby corrected as shown below:

Column 13,
Line 17, "antialiasing" should read -- anti-aliasing --

Column 15,
Line 26, "Ram" should read -- RAM --
Line 54, "integer" should read -- integers --

Column 19,
Line 27, "antialiasing" should read -- anti-aliasing --

Column 21,
Line 46, "request" should read -- requests --

Column 22,
Line 53, "scan-convert" should read -- scan convert --

Column 25,
Line 1, "of entries is mapped" should read -- entries is mapped --

Column 26,
Line 17, "(R G B)" should read -- (R G B α) --
Line 60, "sprite" should read -- gsprite --

Column 28,
Line 52, "point" should read -- point. --

Column 33,
Line 52, "also achieved" should read -- also be achieved --

Column 34,
Line 46, "(kb)" should read -- (kb)) --
Line 47, "z-buffer" should read -- Z-buffer --

Column 39,
Line 19, "comer" should read -- corner --

UNITED STATES PATENT AND TRADEMARK OFFICE
CERTIFICATE OF CORRECTION

PATENT NO. : 6,292,194 B1
DATED : September 18, 2001
INVENTOR(S) : William Chambers Powell III It is certified that error appears in the above-identified patent and that said Letters Patent is hereby corrected as shown below:

<u>Column 40,</u>
Line 12, "know" should read -- known --

<u>Column 41,</u>
Line 9, "bzim," should read -- bzim>, --

<u>Column 43,</u>
Line 2, "low 10 complexity" should read -- low complexity --

<u>Column 46,</u>
Line 45, "table" should read -- table. --
Line 65, "each the" should read -- each coefficient in a block by the --

<u>Column 47,</u>
Line 1, "QFactor" should read -- QFactor. --

Signed and Sealed this

Seventh Day of October, 2003

JAMES E. ROGAN
*Director of the United States Patent and Trademark Office*